(12) United States Patent
Zhang et al.

(10) Patent No.: US 12,706,790 B2
(45) **Date of Patent: *Aug. 11, 2026**

(54) PHYSICAL LAYER FRAME FORMAT FOR WLAN

(71) Applicant: Marvell Asia Pte Ltd, Singapore (SG)

(72) Inventors: Hongyuan Zhang, Fremont, CA (US); Mingguang Xu, San Jose, CA (US); Yakun Sun, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 190 days.

This patent is subject to a terminal disclaimer.

(21) Appl. No.: 18/636,119

(22) Filed: Apr. 15, 2024

(65) Prior Publication Data

US 2024/0372763 A1 Nov. 7, 2024

Related U.S. Application Data

(63) Continuation of application No. 17/491,525, filed on Sep. 30, 2021, now Pat. No. 11,962,444, which is a (Continued)

(51) Int. Cl.
*H04L 27/26* (2006.01)
*H04L 69/22* (2022.01)
*H04W 84/12* (2009.01)

(52) U.S. Cl.
CPC ...... *H04L 27/2602* (2013.01); *H04L 27/2603* (2021.01); *H04L 27/2613* (2013.01); (Continued)

(58) Field of Classification Search
CPC ............. H04L 27/2602; H04L 27/2603; H04L 27/2613; H04L 69/22; H04L 27/2605; H04L 5/0053; H04W 84/00; H04W 84/12
See application file for complete search history.

(56) References Cited

U.S. PATENT DOCUMENTS 5,878,057 A 3/1999 Maa
6,167,515 A 12/2000 Lin
(Continued)

FOREIGN PATENT DOCUMENTS

CN 1271477 A 10/2000
CN 1571512 A 1/2005
(Continued)

OTHER PUBLICATIONS

"IEEE P802.11n™M/D3.00, Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.
(Continued)

*Primary Examiner* — Mohamed A Kamara

(57) ABSTRACT

A first communication device generates a PHY preamble of a PHY data unit to include a first OFDM symbol corresponding to a legacy signal field, which includes i) a length subfield, and ii) a rate subfield. The length subfield and the rate subfield indicate a duration of the PHY data unit, and the legacy signal field is formatted according to a legacy second communication protocol. The first communication device generates the PHY preamble of a PHY data unit to include a second OFDM symbol corresponding to a duplicate of the legacy signal field, and a plurality of additional OFDM symbols corresponding to a non-legacy signal field. The first communication device sets the length subfield of the legacy signal field to a length value such that a remainder value resulting from dividing the length value by three, indicates that the PHY data unit conforms to the first communication protocol.

26 Claims, 44 Drawing Sheets

Related U.S. Application Data continuation of application No. 16/410,962, filed on May 13, 2019, now Pat. No. 11,165,892, which is a continuation of application No. 15/787,937, filed on Oct. 19, 2017, now Pat. No. 10,291,752, which is a continuation of application No. 14/591,759, filed on Jan. 7, 2015, now Pat. No. 10,194,006, which is a continuation-in-part of application No. 14/523,678, filed on Oct. 24, 2014, now Pat. No. 9,712,358.

(60) Provisional application No. 62/089,032, filed on Dec. 8, 2014, provisional application No. 62/051,537, filed on Sep. 17, 2014, provisional application No. 62/045,363, filed on Sep. 3, 2014, provisional application No. 62/034,509, filed on Aug. 7, 2014, provisional application No. 62/030,426, filed on Jul. 29, 2014, provisional application No. 61/987,778, filed on May 2, 2014, provisional application No. 61/950,727, filed on Mar. 10, 2014, provisional application No. 61/925,332, filed on Jan. 9, 2014, provisional application No. 61/924,467, filed on Jan. 7, 2014, provisional application No. 61/895,591, filed on Oct. 25, 2013.

(52) U.S. Cl.
CPC ............ *H04L 69/22* (2013.01); *H04W 84/12* (2013.01); *H04L 27/2605* (2013.01)

(56) References Cited

U.S. PATENT DOCUMENTS 6,192,498 B1 2/2001 Arato
6,226,771 B1 5/2001 Hilla et al.
6,427,219 B1 7/2002 Yang
6,553,534 B2 4/2003 Yonge, III et al.
6,704,364 B1 3/2004 Lim et al.
6,856,590 B2 2/2005 Okada et al.
6,888,844 B2 5/2005 Mallory et al.
6,891,881 B2 5/2005 Trachewsky et al.
6,910,172 B2 6/2005 Hara et al.
6,934,902 B2 8/2005 Hara et al.
7,046,746 B1 5/2006 Keaney et al.
7,080,348 B2 7/2006 Savage
7,145,955 B1 12/2006 Bohnke et al.
7,203,885 B2 4/2007 Gibart
7,257,758 B1 8/2007 Manula et al.
7,336,667 B2 2/2008 Allen, Jr. et al.
7,388,853 B2 6/2008 Ptasinski et al.
7,406,106 B2 7/2008 Mallory
7,453,285 B2 11/2008 Kiel et al.
7,478,314 B1 1/2009 Cheong et al.
7,558,537 B2 7/2009 Trachewsky et al.
7,577,210 B2 8/2009 Lee
7,599,332 B2 10/2009 Zelst et al.
7,626,576 B2 12/2009 Anandakumar et al.
7,733,939 B2 6/2010 Trachewsky
7,742,390 B2 6/2010 Mujtaba
7,773,565 B2 8/2010 Hansen et al.
7,822,005 B2 10/2010 Ptasinski et al.
7,889,707 B2 2/2011 Niu et al.
7,904,519 B2 3/2011 Czotscher et al.
7,920,599 B1 4/2011 Subramanian et al.
7,961,593 B2 6/2011 Porat et al.
7,974,225 B2 7/2011 Kasher
7,987,405 B2 7/2011 Turner et al.
8,010,865 B2 8/2011 Gu et al.
8,046,663 B2 10/2011 Yoon
8,111,704 B2 2/2012 Singhal et al.
8,144,647 B2 3/2012 Nabar et al.
8,155,138 B2 4/2012 van Nee
8,179,897 B2 5/2012 Allen, Jr. et al.
8,201,065 B1 6/2012 Cheong et al.
8,218,554 B2 7/2012 Allen, Jr. et al.
8,223,072 B2 7/2012 Ponnuswamy
8,225,187 B1 7/2012 Schultz et al.
8,234,551 B2 7/2012 Shen et al.
8,245,108 B2 8/2012 Yoon
8,264,977 B2 9/2012 Sanguineti et al.
8,289,869 B2 10/2012 Sawai
8,310,981 B2 11/2012 Damnjanovic et al.
8,331,419 B2 12/2012 Zhang et al.
8,332,719 B2 12/2012 You et al.
8,339,978 B2 12/2012 Sawai et al.
8,369,301 B2 2/2013 Cai
8,397,126 B2 3/2013 Xu et al.
8,418,024 B2 4/2013 You et al.
8,462,863 B1 6/2013 Zhang et al.
8,494,089 B2 7/2013 Aoki et al.
8,498,362 B2 7/2013 Zhang et al.
8,509,051 B2 8/2013 Ling et al.
8,526,351 B2 9/2013 Fischer et al.
8,527,853 B2 9/2013 Lakkis
8,532,077 B2 9/2013 Stacey et al.
8,539,287 B2 9/2013 Lee et al.
8,542,589 B2 9/2013 Surineni et al.
8,543,884 B2 9/2013 Mansour
8,599,804 B2 12/2013 Erceg et al.
8,619,907 B2 12/2013 Mujtaba et al.
8,627,171 B2 1/2014 Pi
8,681,757 B2 3/2014 Lee et al.
8,718,021 B2 5/2014 Yu et al.
8,724,720 B2 5/2014 Srinivasa et al.
8,737,189 B2 5/2014 Hansen et al.
8,867,653 B2 10/2014 Zhang et al.
8,873,680 B2 10/2014 Zhang
8,885,740 B2 11/2014 Zhang et al.
8,948,283 B2 2/2015 Zhang
8,953,696 B2 2/2015 Stoye
8,982,889 B2 3/2015 Zhang
9,130,727 B2 9/2015 Zhang et al.
9,178,745 B2 11/2015 Zhang et al.
9,184,794 B1 11/2015 Ibrahim et al.
9,184,967 B1 11/2015 Ibrahim et al.
9,209,837 B1 12/2015 Cheong et al.
9,232,435 B2 1/2016 Schliwa-Bertling et al.
9,258,829 B1 2/2016 Ibrahim et al.
9,294,164 B2 3/2016 Zhang et al.
9,294,323 B2 3/2016 Zhang
9,397,785 B1 7/2016 Zhang et al.
9,414,432 B2 8/2016 Zhang
9,419,849 B2 8/2016 Zhang et al.
9,667,460 B2 5/2017 Zhang et al.
9,712,358 B2 7/2017 Zhang et al.
9,716,607 B2 7/2017 Zhang et al.
10,033,563 B2 7/2018 Zhang
10,194,006 B2 1/2019 Zhang et al.
10,218,822 B2 2/2019 Zhang et al.
10,291,752 B2 5/2019 Zhang et al.
11,165,892 B2 11/2021 Zhang et al.
11,962,444 B2 4/2024 Zhang et al.
2002/0003773 A1 1/2002 Okada et al.
2002/0188908 A1 12/2002 Yonge et al.
2003/0031151 A1 2/2003 Sharma et al.
2003/0056043 A1 3/2003 Kostadinov
2003/0142626 A1 7/2003 Umayabashi et al.
2004/0081131 A1 4/2004 Walton et al.
2005/0169261 A1 8/2005 Williams et al.
2006/0034384 A1 2/2006 Lee
2006/0176966 A1 8/2006 Stewart et al.
2006/0182017 A1 8/2006 Hansen et al.
2007/0002878 A1 1/2007 Moorti et al.
2007/0014375 A1 1/2007 Nakao
2007/0047666 A1 3/2007 Trachewsky
2007/0153760 A1 7/2007 Shapira
2007/0153830 A1 7/2007 Xhafa et al.
2007/0183370 A1 8/2007 Wallace et al.
2007/0183523 A1 8/2007 Koo et al.
2008/0056393 A1 3/2008 Niu et al.
2008/0298435 A1 12/2008 Lakkis
2008/0299962 A1 12/2008 Kasher
2009/0034635 A1 2/2009 Elbwart et al.

(56) References Cited

U.S. PATENT DOCUMENTS

| | | | |
|---|---|---|---|
| 2009/0086699 | A1 | 4/2009 | Niu et al. |
| 2009/0103485 | A1 | 4/2009 | Singh et al. |
| 2009/0122771 | A1 | 5/2009 | Cai |
| 2009/0190465 | A1 | 7/2009 | Porat et al. |
| 2009/0196163 | A1 | 8/2009 | Du |
| 2010/0020266 | A1 | 1/2010 | Hadlich et al. |
| 2010/0034323 | A1 | 2/2010 | Stoye |
| 2010/0046358 | A1 | 2/2010 | van Nee |
| 2010/0046542 | A1 | 2/2010 | van Zelst et al. |
| 2010/0046656 | A1 | 2/2010 | van Nee et al. |
| 2010/0074277 | A1 | 3/2010 | Nishibayashi et al. |
| 2010/0091673 | A1 | 4/2010 | Sawai et al. |
| 2010/0091675 | A1 | 4/2010 | Sawai |
| 2010/0103920 | A1 | 4/2010 | Damnjanovic et al. |
| 2010/0111220 | A1 | 5/2010 | Rouquette-Leveil et al. |
| 2010/0202301 | A1 | 8/2010 | Wen et al. |
| 2010/0260159 | A1 | 10/2010 | Zhang et al. |
| 2010/0309834 | A1 | 12/2010 | Fischer et al. |
| 2010/0309848 | A1 | 12/2010 | Erceg et al. |
| 2010/0310002 | A1 | 12/2010 | Lauer et al. |
| 2011/0002219 | A1 | 1/2011 | Kim et al. |
| 2011/0026639 | A1 | 2/2011 | Rouquette-Leveil et al. |
| 2011/0032875 | A1 | 2/2011 | Erceg et al. |
| 2011/0092231 | A1 | 4/2011 | Yoo et al. |
| 2011/0103280 | A1 | 5/2011 | Liu et al. |
| 2011/0110348 | A1 | 5/2011 | Lee et al. |
| 2011/0122846 | A1 | 5/2011 | Yu et al. |
| 2011/0134899 | A1 | 6/2011 | Jones, IV et al. |
| 2011/0142020 | A1 | 6/2011 | Kang et al. |
| 2011/0149927 | A1 | 6/2011 | Stacey et al. |
| 2011/0194655 | A1 | 8/2011 | Sampath et al. |
| 2011/0222490 | A1 | 9/2011 | Fischer et al. |
| 2011/0255620 | A1 | 10/2011 | Jones, IV et al. |
| 2011/0271169 | A1 | 11/2011 | Pi |
| 2011/0280182 | A1 | 11/2011 | Kim et al. |
| 2011/0280232 | A1* | 11/2011 | Wu ...................... H04W 28/06 370/338 |
| 2011/0299382 | A1 | 12/2011 | Van Nee et al. |
| 2011/0305296 | A1 | 12/2011 | Van Nee |
| 2012/0039292 | A1 | 2/2012 | Lee et al. |
| 2012/0039406 | A1 | 2/2012 | Srinivasa et al. |
| 2012/0054587 | A1 | 3/2012 | Van Nee et al. |
| 2012/0122495 | A1 | 5/2012 | Weng et al. |
| 2012/0155447 | A1 | 6/2012 | Vermani et al. |
| 2012/0170563 | A1 | 7/2012 | Abraham et al. |
| 2012/0195391 | A1 | 8/2012 | Zhang et al. |
| 2012/0201213 | A1 | 8/2012 | Banerjea et al. |
| 2012/0201316 | A1 | 8/2012 | Zhang et al. |
| 2012/0263141 | A1 | 10/2012 | Nasrabadi et al. |
| 2012/0294268 | A1 | 11/2012 | Lee et al. |
| 2012/0294294 | A1 | 11/2012 | Zhang |
| 2012/0294392 | A1 | 11/2012 | Zhang |
| 2012/0300874 | A1 | 11/2012 | Zhang |
| 2012/0314653 | A1 | 12/2012 | Liu |
| 2012/0324315 | A1 | 12/2012 | Zhang et al. |
| 2012/0327871 | A1 | 12/2012 | Ghosh et al. |
| 2013/0039313 | A1 | 2/2013 | Hansen et al. |
| 2013/0070869 | A1 | 3/2013 | Motamed et al. |
| 2013/0121244 | A1 | 5/2013 | Vermani et al. |
| 2013/0121348 | A1 | 5/2013 | Zhang et al. |
| 2013/0122822 | A1 | 5/2013 | Srinivasan et al. |
| 2013/0128807 | A1 | 5/2013 | Vermani et al. |
| 2013/0142276 | A1 | 6/2013 | Baik et al. |
| 2013/0182662 | A1 | 7/2013 | Zhang et al. |
| 2013/0202001 | A1 | 8/2013 | Zhang |
| 2013/0216002 | A1 | 8/2013 | Suh et al. |
| 2013/0259017 | A1 | 10/2013 | Zhang et al. |
| 2013/0294317 | A1 | 11/2013 | Malladi et al. |
| 2014/0029681 | A1 | 1/2014 | Zhang et al. |
| 2014/0064194 | A1 | 3/2014 | Schliwa-Bertling et al. |
| 2014/0112168 | A1 | 4/2014 | Chen et al. |
| 2014/0126509 | A1 | 5/2014 | You |
| 2014/0185662 | A1 | 7/2014 | Azizi et al. |
| 2014/0185695 | A1 | 7/2014 | Kenney et al. |
| 2014/0211775 | A1 | 7/2014 | Sampath et al. |
| 2014/0269770 | A1 | 9/2014 | Kenney et al. |
| 2014/0294020 | A1 | 10/2014 | You et al. |
| 2014/0307612 | A1 | 10/2014 | Vermani et al. |
| 2014/0328430 | A1 | 11/2014 | Park et al. |
| 2014/0337690 | A1 | 11/2014 | Zhang |
| 2014/0362935 | A1 | 12/2014 | Porat et al. |
| 2015/0009894 | A1* | 1/2015 | Vermani ............... H04L 1/0007 370/328 |
| 2015/0023449 | A1 | 1/2015 | Porat et al. |
| 2015/0030101 | A1 | 1/2015 | Zhang et al. |
| 2015/0071372 | A1 | 3/2015 | Zhang |
| 2015/0117227 | A1 | 4/2015 | Zhang et al. |
| 2015/0117433 | A1 | 4/2015 | Zhang et al. |
| 2015/0139205 | A1 | 5/2015 | Kenney et al. |
| 2015/0207521 | A1 | 7/2015 | Waters |
| 2015/0295676 | A1 | 10/2015 | Kenney et al. |
| 2015/0381311 | A1 | 12/2015 | Zhang et al. |
| 2015/0381394 | A1 | 12/2015 | Zhang et al. |
| 2016/0080186 | A1 | 3/2016 | Porat |
| 2016/0105535 | A1 | 4/2016 | Kenney et al. |
| 2016/0127948 | A1 | 5/2016 | Azizi et al. |
| 2016/0156750 | A1 | 6/2016 | Zhang et al. |
| 2016/0204968 | A1 | 7/2016 | Zhang |
| 2016/0205565 | A1* | 7/2016 | Liu .......................... H04J 11/00 370/203 |
| 2017/0310514 | A1 | 10/2017 | Zhang et al. |
| 2017/0310515 | A1 | 10/2017 | Zhang et al. |
| 2019/0268449 | A1 | 8/2019 | Zhang et al. |

FOREIGN PATENT DOCUMENTS

| | | | |
|---|---|---|---|
| CN | 1989748 | A | 6/2007 |
| CN | 101282194 | A | 10/2008 |
| CN | 101321034 | A | 12/2008 |
| CN | 101562502 | A | 10/2009 |
| CN | 102959893 | A | 3/2013 |
| EP | 1968225 | A1 | 9/2008 |
| EP | 3061219 | A1 | 8/2016 |
| JP | 2005-304063 | A | 10/2005 |
| JP | 2007-506359 | A | 3/2007 |
| JP | 2012-523774 | A | 10/2012 |
| JP | 2012-235449 | A | 11/2012 |
| JP | 2013-543672 | A | 12/2013 |
| JP | 2013-543677 | A | 12/2013 |
| KR | 10-2012-0023610 | A | 3/2012 |
| KR | 10-2013-0040956 | A | 4/2013 |
| WO | WO-2003/005652 | A1 | 1/2003 |
| WO | WO-2006/025996 | A2 | 3/2006 |
| WO | WO-2007/074777 | A1 | 7/2007 |
| WO | WO-2008/046163 | A1 | 4/2008 |
| WO | WO-2009052420 | A2 | 4/2009 |
| WO | WO-2009/059229 | A1 | 5/2009 |
| WO | WO-2009/084926 | A1 | 7/2009 |
| WO | WO-2009/114612 | A1 | 9/2009 |
| WO | WO-2010/120692 | A1 | 10/2010 |
| WO | WO-2011/087560 | A2 | 7/2011 |
| WO | WO-2011-153335 | A1 | 12/2011 |
| WO | WO-2012/039640 | A1 | 3/2012 |
| WO | WO-2012/040396 | A1 | 3/2012 |
| WO | WO-2012/106635 | A1 | 8/2012 |
| WO | WO-2012/122119 | A1 | 9/2012 |
| WO | WO-2013152111 | A1 | 10/2013 |
| WO | WO-2014/183059 | A1 | 11/2014 |
| WO | WO-2015/061729 | A1 | 4/2015 |

OTHER PUBLICATIONS

"IEEE Std. 802.11n.TM. IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., Oct. 2009.

Abu-Surra et al., "NT-8-Single Carrier PHY," IEEE Draft doc. IEEE 802.11-10/0429r0, vol. 802.11ad, 32 pages (May 2, 2010).

(56) References Cited

OTHER PUBLICATIONS

Chen, "Home Network Basis: Transmission Environments and Wired/Wireless Protocols," Prentice Hall, 26 pages (Jul. 2003).
Cheong, et al., "Methods, Algorithms, Software, Circuits, Receivers and Systems for Decoding Convolutional Code," U.S. Appl. No. 13/871,520, filed Apr. 26, 2013.
Chun et al., "Legacy Support on HEW frame structure," doc: IEEE 11-13/1057r0, *The Institute of Electrical and Electronics Engineers, Inc.*, pp. 1-8 (Sep. 2013).
Communication pursuant to Article 94(3) EPC in European Patent Application No. 14795753.4, dated Mar. 11, 2019 (7 pages).
Communication pursuant to Article 94(3) EPC in European Patent Application No. 15702022.3, dated Mar. 11, 2019 (7 pages).
De Vegt, "Potential Compromise for 802.11ah Use Case Document," Institute of Electrical and Electronics Engineers, doc. No. IEEE 802.11-11/0457r0, pp. 1-27 (Mar. 2011).
European Search Report in European Patent Application No. 18150686.6-1220, dated Apr. 24, 2018 (11 pages).
Final Office action for U.S. Appl. No. 13/465,347, mailed Oct. 23, 2013.
Francis, Michael, "Viterbi Decoder Block Decoding—Trellis Termination and Tail Biting," Xilinx XAPP551 v2.0, pp. 1-21 (Jul. 30, 2010).
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
Harada, "Project: IEEE P802.15 Working Group for Wireless Personal Area Network (WPANs)," IEEE 802.15-07-0693-003c (May 2007).
Hiertz, et al., "The IEEE 802.11 Universe," *IEEE Communications Magazine*, pp. 62-70, (Jan. 2010).
IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999) Reaffirmed Jun. 12, 2003.
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).
IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).
IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).
IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
IEEE Std 802.11ad™/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, (Jul. 2012).
IEEE Std 802.11ad™M/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band The Institute of Electrical and Electronics Engineers, Inc., (Jul. 2012).
IEEE Std 802.11ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very

(56) References Cited

OTHER PUBLICATIONS

High Throughput in the 60 GHz Band," *The Institute of Electrical and Electronics Engineers, Inc.*, pp. 1-601 (Sep. 2011).
IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).
IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).
IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.
IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," The Institute of Electrical and Electronics Engineers, Inc., Nov. 7, 2001.
IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, pp. 1-69 (Apr. 2003).
IEEE Std P802.11-REVma/06.0, "Unapproved Draft Standard for Information Technology—Telecommunications and information exchange between systems—Local and metropolitan area network—Specific requirements Part 11: Wireless LAN Medium Access Control(MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999) (Superseded by P802.11-REVma--D7.0)," 2006.
IEEE Std P802.11-REVma/D6.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma--D7.0),pp. 1-1212 (2006).
IEEE Std P802.11ad/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," *The Institute of Electrical and Electronics Engineers, Inc.*, pp. 1-601 (Sep. 2011).
IEEE Std P802.11ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," The Institute of Electrical and Electronics Engineers, Inc., Sep. 2011.
IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
Imashioya et al., "RTL Design of 1.2 GBPS MIMO WLAN System and Its Business Aspect," IEEE 9th Int'l Symposium on Communications and Information Technology (ISCIT 2009), *The Institute of Electrical and Electronics Engineers*, pp. 296-301 (2009).
International Preliminary Report on Patentability in corresponding International Application No. PCT/US2013/035132 dated Oct. 7, 2014 (7 pages).
International Preliminary Report on Patentability in corresponding PCT/US2012/023832, dated Aug. 15, 2013.
International Preliminary Report on Patentability in International Application No. PCT/US2012/023832, dated Aug. 15, 2013 (19 pages).
International Preliminary Report on Patentability in International Application No. PCT/US2012/036736, dated Nov. 19, 2013 (8 pages).
International Preliminary Report on Patentability in International Application No. PCT/US2014/062247, dated Apr. 26, 2016 (8 pages).
International Preliminary Report on Patentability in International Application No. PCT/US2015/010480, mailed Jul. 12, 2016 (8 pages).
International Search Report and Written Opinion for International Application No. PCT/US2014/062247 mailed Feb. 17, 2015 (11 pages).
International Search Report and Written Opinion in co-pending PCT International Patent Application No. PCT/US2012/036736 (International Filing Date May 7, 2012), having a Date of Mailing of Jul. 6, 2012 (14 pgs).
International Search Report and Written Opinion in International Application No. PCT/US2012/023832, dated Jun. 19, 2012 (15 pages).
International Search Report and Written Opinion in International Application No. PCT/US2014/037534, dated Oct. 21, 2014 (21 pages).
International Search Report and Written Opinion in International Application No. PCT/US2015/010480, mailed Apr. 24, 2015 (10 pages).
International Search Report and Written Opinion issued in corresponding PCT/US2013/035132. mailed Jun. 24, 2013.
International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, The Institute of Electrical and Electronics Engineers, Inc., (1999).
Invitation to Pay Additional Fees and Partial International Search Report for PCT Application No. PCT/US2014/037534, 9 pages (Aug. 21, 2014).
Invitation to Pay Additional Fees and Partial International Search Report in International Application No. PCT/US2012/023832, dated Mar. 28, 2012 (5 pages).
Lee et al., "TGaf PHY proposal," *The Institute of Electrical and Electronics Engineers*, doc. No. IEEE 802.11-12/0809r5, pp. 1-43, Jul. 10, 2012.

(56) References Cited

OTHER PUBLICATIONS

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Non-Final Office action for U.S. Appl. No. 13/366,038, mailed Oct. 23, 2013.
Non-Final Office action for U.S. Appl. No. 13/366,064, mailed Jul. 3, 2014.
Non-Final Office action for U.S. Appl. No. 13/465,347, mailed Jul. 8, 2013.
Notice of Allowance in U.S. Appl. No. 14/954,961, mailed Jan. 20, 2017 (8 pages).
Notice of Allowance in U.S. Appl. No. 13/366,038, dated Jul. 7, 2014 (5 pages).
Notice of Allowance in U.S. Appl. No. 13/366,038, dated Mar. 25, 2014 (11 pages).
Notice of Allowance in U.S. Appl. No. 13/366,064, dated Apr. 30, 2015 (10 pages).
Notice of Allowance in U.S. Appl. No. 13/366,064, dated Jan. 21, 2015 (14 pages).
Notice of Allowance in U.S. Appl. No. 13/465,347, dated Jun. 25, 2014 (9 pages).
Notice of Allowance in U.S. Appl. No. 13/856,277, dated Apr. 29, 2015 (9 pages).
Notice of Allowance in U.S. Appl. No. 14/044,710, dated Jun. 19, 2015 (12 pages).
Notice of Allowance in U.S. Appl. No. 14/044,710, dated Mar. 3, 2015 (18 pages).
Notice of Allowance in U.S. Appl. No. 14/274,475, dated Mar. 30, 2016 (8 pages).
Notice of Allowance in U.S. Appl. No. 14/483,106, dated Nov. 12, 2015 (8 pages).
Notice of Allowance in U.S. Appl. No. 14/930,434, dated Apr. 11, 2016 (19 pages).
Notice of Allowance in U.S. Appl. No. 15/787,937, dated May 10, 2018 (22 pages).
Notice of Allowance in U.S. Appl. No. 14/591,759, mailed Apr. 26, 2017 (25 pages).
Notice of Allowance in U.S. Appl. No. 14/591,759, mailed Jun. 13, 2018 (18 pages).
Notice of Allowance in U.S. Appl. No. 14/591,759, mailed Oct. 2, 2018 (16 pages).
Notice of Allowance in U.S. Appl. No. 15/017,385, mailed Jan. 8, 2018 (19 pages).
Notice of Allowance in U.S. Appl. No. 15/017,385, mailed Jun. 18, 2018 (22 pages).
Notice of Allowance in U.S. Appl. No. 15/017,385, mailed May 19, 2017 (33 pages).
Notice of Allowance in U.S. Appl. No. 15/017,385, mailed Oct. 3, 2018 (20 pages).
Notice of Allowance in U.S. Appl. No. 15/075,823, dated Mar. 22, 2018 (19 pages).
Notice of Allowance in U.S. Appl. No. 15/075,823, mailed Sep. 27, 2017 (23 pages).
Notice of Allowance in U.S. Appl. No. 15/647,918 mailed Jan. 23, 2018 (26 pages).
Notice of Allowance in U.S. Appl. No. 15/647,918, mailed Apr. 12, 2018 (10 pages).
Notice of Allowance in U.S. Appl. No. 15/647,918, mailed Jul. 30, 2018 (7 pages).
Notice of Allowance in U.S. Appl. No. 15/648,596, mailed Aug. 9, 2018 (7 pages).
Notice of Allowance in U.S. Appl. No. 15/648,596, mailed May 1, 2018 (34 pages).
Notice of Allowance in U.S. Appl. No. 15/787,937, mailed May 10, 2018 (22 pages).
Notice of Allowance in U.S. Appl. No. 14/591,759, mailed Dec. 8, 2017 (13 pages).
Notice of Reasons for Refusal in Japanese Patent Application No. 2016-543570, dated Jun. 20, 2018, with English translation (7 pages).
Notice of Reasons for Rejection in Japanese Application No. 2013-552688, dated Jun. 14, 2016, with English translation (4 pages).
Notice of Reasons for Rejection in Japanese Application No. 2013-552688, dated Oct. 20, 2015, with English translation (5 pages).
Office Action in Chinese Application No. 2012800152821, dated Dec. 17, 2015, with English translation (21 pages).
Office Action in Chinese Patent Application No. 201480070012, dated Sep. 21, 2018, with English translation (6 pages).
Office Action in Korean Patent Application No. 10-2013-7023249, mailed Nov. 15, 2018, with English translation (14 pages).
Office Action in U.S. Appl. No. 13/366,038, dated Oct. 23, 2013 (5 pages).
Office Action in U.S. Appl. No. 14/483,106, dated Mar. 24, 2015 (10 pages).
Office Action in U.S. Appl. No. 14/591,759, mailed Dec. 16, 2016 (14 pages).
Office Action in U.S. Appl. No. 13/856,277, dated Nov. 20, 2014 (8 pages).
Office Action in U.S. Appl. No. 14/274,475, dated Dec. 9, 2015 (14 pages).
Office Action in U.S. Appl. No. 14/483,106, dated Aug. 26, 2015 (10 pages).
Office Action in U.S. Appl. No. 14/930,434, dated Dec. 17, 2015 (8 pages).
Office Action in U.S. Appl. No. 14/954,961, mailed Aug. 25, 2016 (17 pages).
Office Action in U.S. Appl. No. 15/787,937, mailed Dec. 29, 2017 (16 pages).
Park, "Proposed Specification Framework for TGah D9.x", The Institute of Electrical and Electronics Engineers, doc. No. IEEE 802.11-yy/xxxxr0, pp. 1-30 (Jul. 2012).
Park, "Proposed Specification Framework for TGah", The Institute of Electrical and Electronics Engineers, doc. No. IEEE 802.11--yy/xxxxr05, (Jan. 2012), pp. 1-12.
Park, "Proposed Specification Framework for TGah", *The Institute of Electrical and Electronics Engineers*, doc. No. IEEE 802.11-11/1137r11, pp. 1-36 (Sep. 2012).
Park, "Proposed Specification Framework for TGah", *The Institute of Electrical and Electronics Engineers*, doc. No. IEEE 802.11-11/1137r6, pp. 1-13 (Mar. 2012).
Park, "Specification Framework for TGah," *The Institute of Electrical and Electronics Engineers*, doc. No. IEEE 802.11-11/1137r13, pp. 1-58 (Jan. 14, 2013).
Perahia et al., "Gigabit Wireless LANs: an overview of IEEE 802.11 ac and 80211 ad," ACM SIGMOBILE Mobile Computing and Communications Review, vo. 15, No. 3, pp. 23-33, Jul. 2011.
Second Office Action in Chinese Application No. 2012800152821, dated Aug. 5, 2016, with English translation (16 pages).
Seok et al., "HEW PPDU Format for Supporting MIMO-OFDMA," IEEE 802.11-14/1210r0, 16 pages, (Sep. 14, 2014).
Shao, "Channel Selection for 802.11ah," doc.: IEEE 802.11-12/0816r0, pp. 1-11 (Jul. 2012).
Shi et al., "Phase Tracking During VHT-LTF," Doc. No. IEEE 802.11-10/0771r0, *The Institute of Electrical and Electronics Engineers, Inc.*, pp. 1-19 (Jul. 2010).
Stacey et al., "IEEE P802.11, Wireless LANs, Proposed TGac Draft Amendment," Institute of Electrical and Electronics Engineers, doc. No. IEEE 802.11-10/1361 r3 (Jan. 2011 ).
Stacey et al., "Specification Framework for TGac," document No. IEEE 802.11-09/0992r20, *Institute tor Electrical and Electronics Engineers*, pp. 1-49, Jan. 18, 2011.
Supplemental Notice of Allowability in U.S. Appl. No. 14/591,759, mailed Jan. 12, 2018 (4 pages).
Supplemental Notice of Allowability in U.S. Appl. No. 14/591,759, mailed Jun. 7, 2017 (4 pages).
Supplemental Notice of Allowability in U.S. Appl. No. 14/954,961, mailed Feb. 27, 2017 (3 pages).

(56) References Cited

OTHER PUBLICATIONS

Supplemental Notice of Allowability in U.S. Appl. No. 15/017,385, mailed Jan. 24, 2018 (4 pages).
Supplemental Notice of Allowability in U.S. Appl. No. 15/647,918, mailed Feb. 6, 2018 (2 pages).
Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), The Institute of Electrical and Electronics Engineers, pp. 207-211 (2009).
Taghavi et al., "Introductory Submission for TGah", doc. No. IEEE 802.11-11/0062r0, *Institute for Electrical and Electronics Engineers*, pp. 1-5 (Jan. 14, 2011).
Third Office Action in Chinese Patent Application No. 2012800152821, dated Aug. 5, 2016, with English translation (7 pages).
Van Nee et al., "The 802.11 n MIMO-OFDM Standard for Wireless LAN and Beyond, " Wireless Personal Communications, vol. 37, pp. 445-453 (Jun. 2006).
Van Zelst et al., "Pilot Sequence for VHT-DATA," Doc. No. IEEE 802.11-10/0811r1, *The Institute of Electrical and Electronics Engineers, Inc.*, pp. 1-10 (Jul. 2010).
Vermani et al. "Preamble Format for 1 MHz," *The Institute of Electrical and Electronics Engineers*, doc. No. IEEE 802.11-11/1482r2, pp. 1-30 (Nov. 2011).
Vermani, et al. "Spec Framework Text for PHY Numerology," *The Institute of Electrical and Electronics Engineers*, doc. No. IEEE 802.11-11/1311r0, pp. 1-5 (Sep. 2011).
Yu et al., "Coverage extension for IEEE802.11ah," *The Institute of Electrical and Electronics Engineers*, doc. No. IEEE 802.11-11/0035r1, pp. 1-10 (Jan. 2011).
Zhang et al., "11ah Data Transmission Flow," *The Institute of Electrical and Electronics Engineers*, doc. No. IEEE 802.11-11/1484r1, pp. 1-15 (Nov. 2011).
Zhang et al., "1MHz Waveform in Wider BW", *The Institute of Electrical and Electronics Engineers*, doc. No. IEEE 802.11-12/0309r1, pp. 1-10 (Mar. 2012).
Zhang et al., "Beamforming Feedback for Single Stream," *The Institute of Electrical and Electronics Engineers*, doc. No. IEEE 802.11-12/1312r0, pp. 1-22 (Nov. 12, 2012).
Zhang Zhao-Yang: "A Novel OFDM Transmission Scheme with Length-Adaptive Cyclic Prefix," Journal of Zhejiang University. Science, Zhejiant University Press, Hangzhou, CN vol. 5, No. 11, Jul. 7, 2003, pp. 1336-1342.
Zhang, et al., "Extended Guard Interval For Outdoor WLAN," U.S. Appl. No. 14/483,106, filed Sep. 10, 2014 (57 pages).
Search Report in Chinese Patent Application No. 201500100854, sent with Office Action dated Jun. 3, 2019 (2 pages).
Second Office Action in Chinese Patent Application No. 201480070012, with English summary, dated Jun. 21, 2019 (4 pages).
Search Report in Chinese Application No. 201480070012, sent with Office Action dated Jun. 21, 2019 (2 pages).
U.S. Appl. No. 16/544,391, Zhang et al., "Range Extension Mode for WiFi," filed Aug. 19, 2019.
Communication pursuant to Article 94(3) EPC in European Patent Application No. 15702022.3, dated Oct. 21, 2019 (5 pages).
Office Action in Chinese Patent Application No. 201580010085, dated Jan. 20, 2020, with English translation (8 pages).
Extended European Search Report in European Patent Application No. 20168508.8, dated Jul. 10, 2020 (8 pages).
Office Action in Korean Patent Application No. 10-2016-7013777, mailed Oct. 20, 2020, with English translation (15 pages).
Park et al., "Proposed TGah Draft Amendment, IEEE P802. 11ahTM/D0.1—Draft Standard for Information technology—Telecommunications and information exchange between systems, Local and metropolitan area networks—Specific requirements—Part 11: Wireless LAN Medium Access Control (MAC) and Physical Layer (PHY) Specifications—Amendment 6: Sub 1 GHz License Exempt Operation," IEEE Computer Society, draft doc. IEEE 802.11-13/0500ro, 330 pages (May 9, 2013).
Office Action in U.S. Appl. No. 16/544,391, mailed Feb. 18, 2021 (6 pages).
Office Action in Korea Patent Application No. 10-2016-7021295 mailed Apr. 26, 2021, with English translation (10 pages).
Communication pursuant to Article 94(3) EPC for Application No. EP20168508.8 mailed Mar. 17, 2022 (5 pages).
Office Action in Korean Application No. 10-2022-7011249, mailed Jul. 13, 2022 (5 pages).
Decision of Rejection in Korea Patent Application No. 10-2016-7021295 mailed on Oct. 25, 2021, with English translation (8 pages).

* cited by examiner

200
L-STF
202
L-LTF
204
L-SIG
206
DATA
208
PREAMBLE

208
SERVICE
SCRAMBLED PSDU
TAIL BITS
PAD BITS
PRIOR ART

300
L-STF
L-LTF
L-SIG
HT-SIG1
HT-SIG2
HT-STF
HT-LTF 1
HT-LTF N
HT-DATA
302
304
306
308-1
308-2
310
312-1
312-M
314
PREAMBLE

400
HT-GF-STF
HT-LTF1
HT-SIG1
HT-SIG2
HT-LTF
HT-LTF
HT-DATA
402
404
406-1
406-2
408-1
408-M
410
PREAMBLE 500
508
L-STF
L-LTF
L-SIG
VHT-SIGA1
VHT-SIGA2
VHT-STF
VHT-LTF
VHT-LTF
VHT-SIGB
VHT-DATA
502
504
506
508-1
508-2
510
512-1
512-M
514
516
PRIOR ART

FIG. 6A
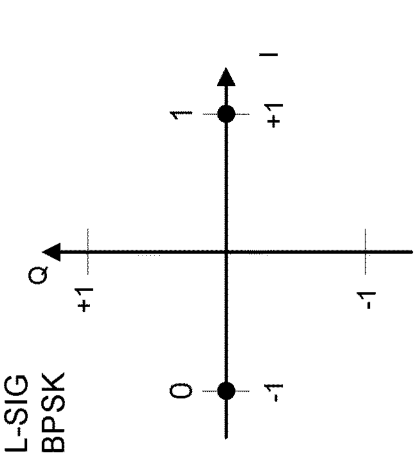
HT-SIG1
Q-BPSK
Q
I
+1
-1
0
1
HT-SIG2
Q-BPSK
Q
I
+1
-1
0
1
PRIOR ART
FIG. 6B
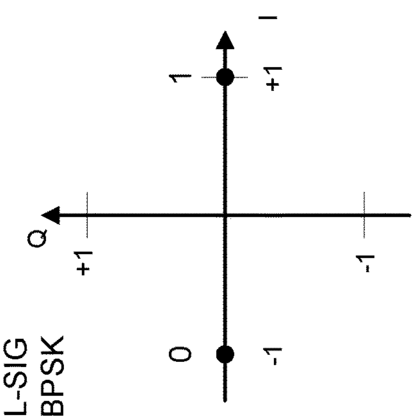
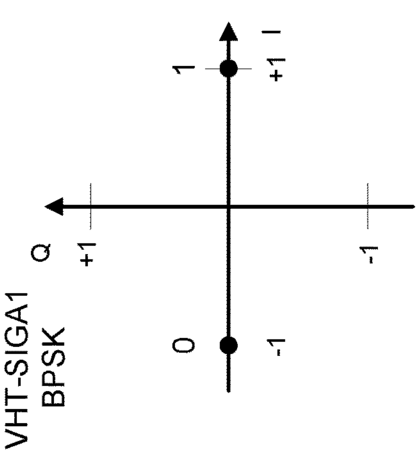
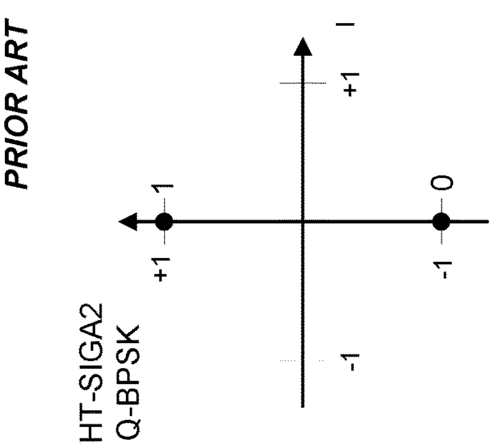
PRIOR ART 700
708
L-STF
L-LTF
L-SIG
HEW-SIGA1
HEW-SIGA2
HEW-STF
HEW-LTF
HEW-LTF
HEW-SIGB
HEW-DATA
702
704
706
708-1
708-2
710
712-1
712-M
714
701
716

L-SIG BPSK
HEW-SIGA1 BPSK
HEW-SIGA2 Q-BPSK
Q
I
+1
-1
0
1

1200
DGI
LTS
LTS
1202
1204
1206

1208
NGI
LTS
NGI
LTS
1210
1212
1214
1216

1400
L-STF
702
L-LTF
704
L-SIG
1406
L-LTF2
1156
1152
HEW-SIGA1
1152-1
HEW-SIGA2
1152-2
. . .
HEW-SIGAN
1152-N
HEW-STF
1158
HEW-LTF1
1160-1
. . .
HEW-LTFN
160-N
HEW-SIGB
162-N
1401

1406
DGI
1410
L-SIG
1412
L-SIG
1414

1406
L-SIG symbol
DGI
1410
L-SIG
1412
L-SIG
1414
FFT window for LSIG field at legacy receiver

HT-SIG1 HT-SIG1 HT-SIG2 HT-SIG2

FIG. 20A

L-SIG L-SIG

FIG. 20B

DATA-1 DATA-1 DATA-2 DATA-2

FIG. 20C

DATA-1 DATA-2 DATA-1 DATA-2

FIG. 20D

FIG. 22A
r1 r2 r3 r4
| 10MHz | 10MHz | 10MHz | 10MHz |
|---|---|---|---|
FIG. 22B
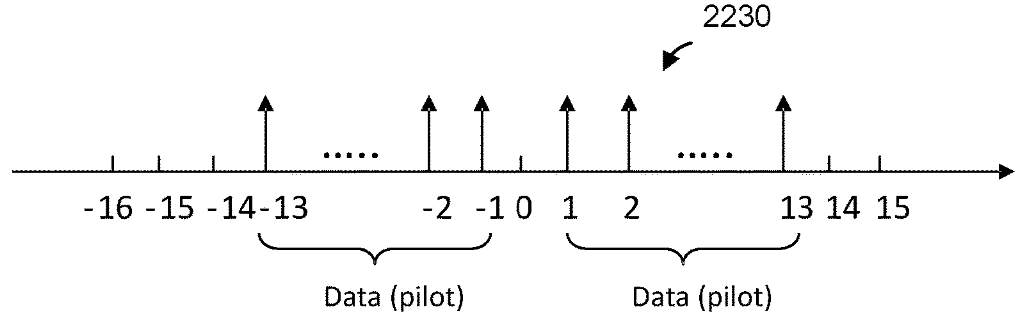
FIG. 22C

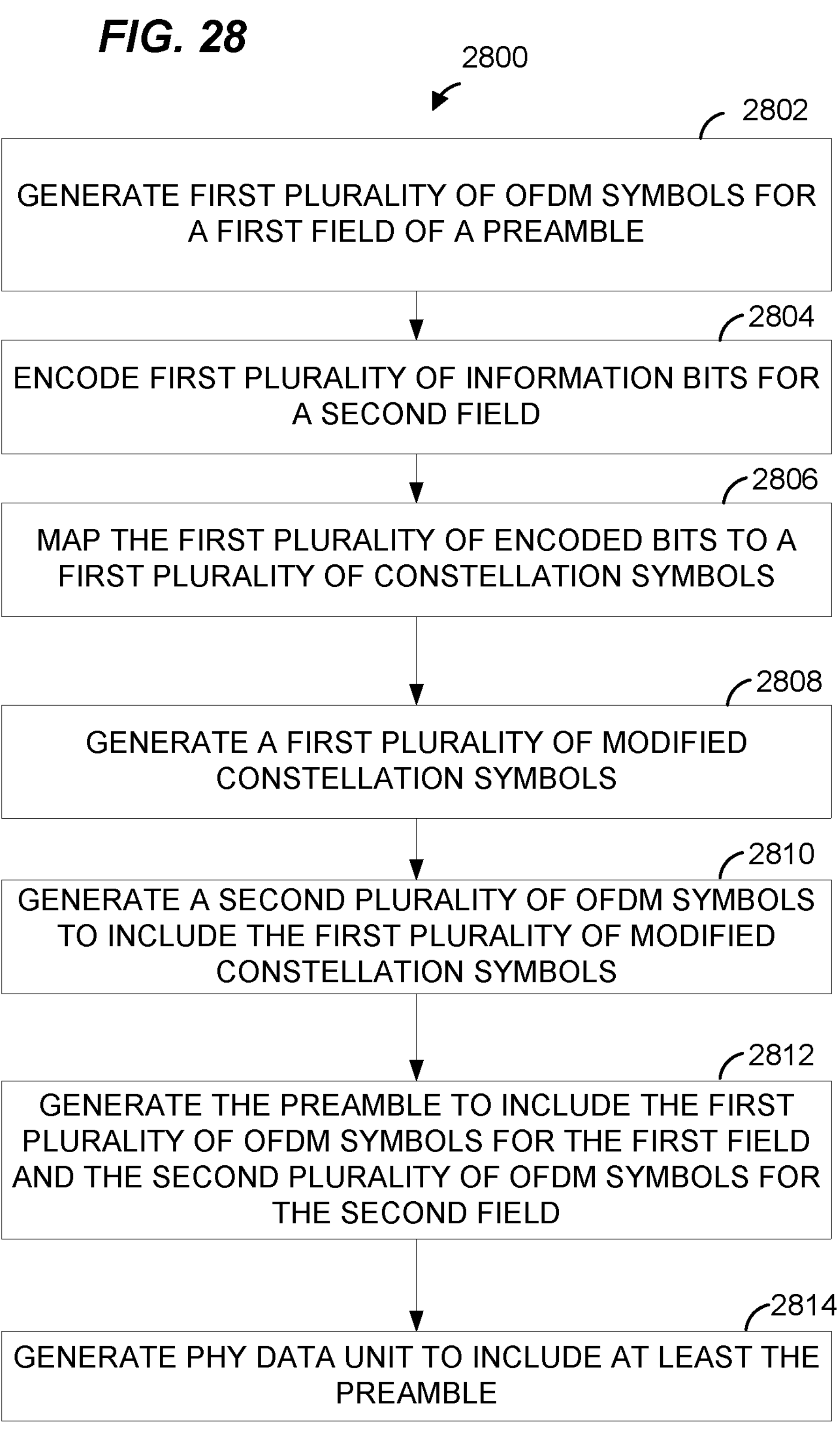
FIG. 28
2800
2802
GENERATE FIRST PLURALITY OF OFDM SYMBOLS FOR A FIRST FIELD OF A PREAMBLE
2804
ENCODE FIRST PLURALITY OF INFORMATION BITS FOR A SECOND FIELD
2806
MAP THE FIRST PLURALITY OF ENCODED BITS TO A FIRST PLURALITY OF CONSTELLATION SYMBOLS
2808
GENERATE A FIRST PLURALITY OF MODIFIED CONSTELLATION SYMBOLS
2810
GENERATE A SECOND PLURALITY OF OFDM SYMBOLS TO INCLUDE THE FIRST PLURALITY OF MODIFIED CONSTELLATION SYMBOLS
2812
GENERATE THE PREAMBLE TO INCLUDE THE FIRST PLURALITY OF OFDM SYMBOLS FOR THE FIRST FIELD AND THE SECOND PLURALITY OF OFDM SYMBOLS FOR THE SECOND FIELD
2814
GENERATE PHY DATA UNIT TO INCLUDE AT LEAST THE PREAMBLE 2900
HEW preamble
L-LTF 204/304/504
L-SIG 206/306/506
L-SIG 2928
HEW-SIG1 2932
HEW-SIG1 2944
DGI
L-LTF
L-LTF
GI
L-SIG
GI
L-SIG
DGI
HEW-SIG1
DGI
HEW-SIG1
2908
2912
2916
2920
2924
2920
2924
2936
2940
2936
2940
. . .
Legacy preamble
L-LTF 204/304/504
L-SIG 206/
306/506
DGI
L-LTF
L-LTF
GI
L-SIG
GI
(V)HT-SIG1
or DATA
GI
(V)HT-SIG2
or DATA
2908
2912
2916
. . .
2904

3000
HEW preamble
L-LTF 204/304/504
L-SIG 206/306/506
HEW-SIG1 3004
HEW-SIG1 3016
HEW-SIG2 3020
2908
2912
2916
2920
2924
3008
3012
3008
3012
3024
3028
DGI
L-LTF
L-LTF
GI
L-SIG
GI
HEW-SIG1
GI
HEW-SIG1
DGI
HEW-SIG2
Legacy preamble
L-LTF 204/304/504
L-SIG 206/306/506
2908
2912
2916
DGI
L-LTF
L-LTF
GI
L-SIG
GI
(V)HT-SIG1 or DATA
GI
(V)HT-SIG2 or DATA
2904

Figure 31:
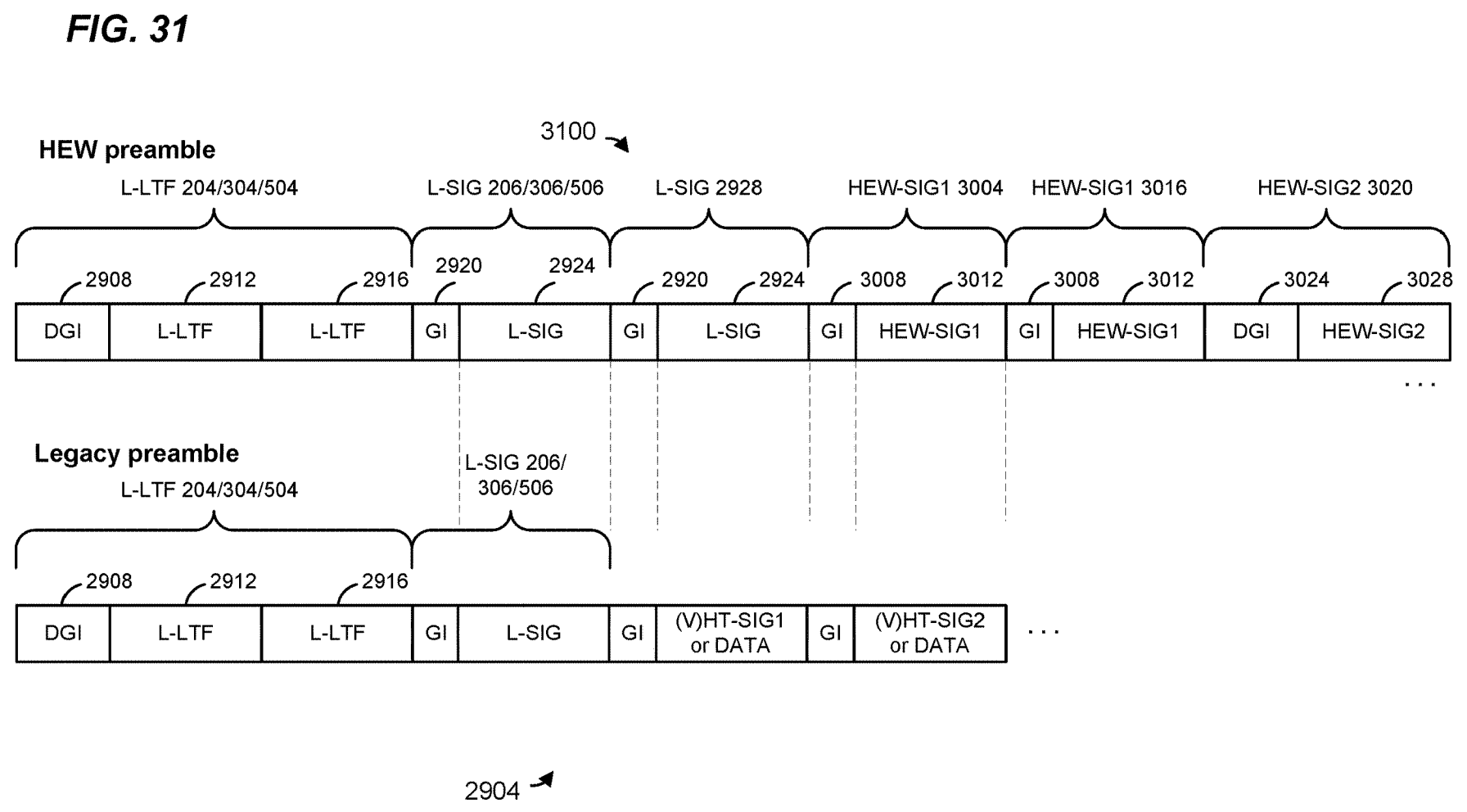

HEW preamble

L-LTF 204/304/504
L-SIG 206/306/506
L-SIG 2928
HEW-SIG1 3004
HEW-SIG1 3016
HEW-SIG2 3020

2908 DGI
2912 L-LTF
2916 L-LTF
2920 GI
2924 L-SIG
2920 GI
2924 L-SIG
3008 GI
3012 HEW-SIG1
3008 GI
3012 HEW-SIG1
3024 DGI
3028 HEW-SIG2
. . .

Legacy preamble

L-LTF 204/304/504
L-SIG 206/306/506

2908 DGI
2912 L-LTF
2916 L-LTF
GI
L-SIG
GI
(V)HT-SIG1 or DATA
GI
(V)HT-SIG2 or DATA
. . .

Figure 33:
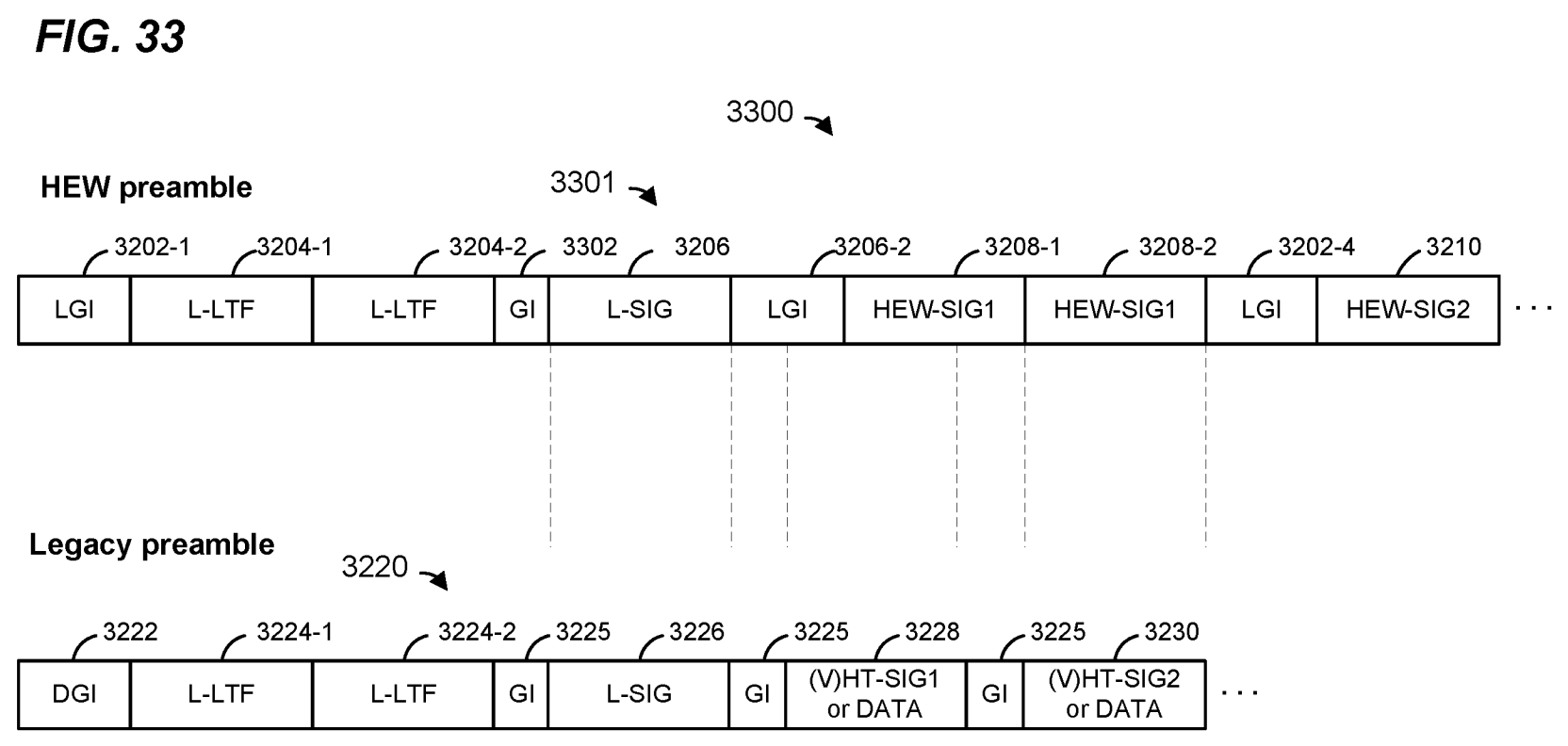

HEW preamble

3301

LGI 3202-1
L-LTF 3204-1
L-LTF 3204-2
GI 3302
L-SIG 3206
LGI 3206-2
HEW-SIG1 3208-1
HEW-SIG1 3208-2
LGI 3202-4
HEW-SIG2 3210
...

Legacy preamble

3220

DGI 3222
L-LTF 3224-1
L-LTF 3224-2
GI 3225
L-SIG 3226
GI 3225
(V)HT-SIG1 or DATA 3228
GI 3225
(V)HT-SIG2 or DATA 3230
...

Figure 34:
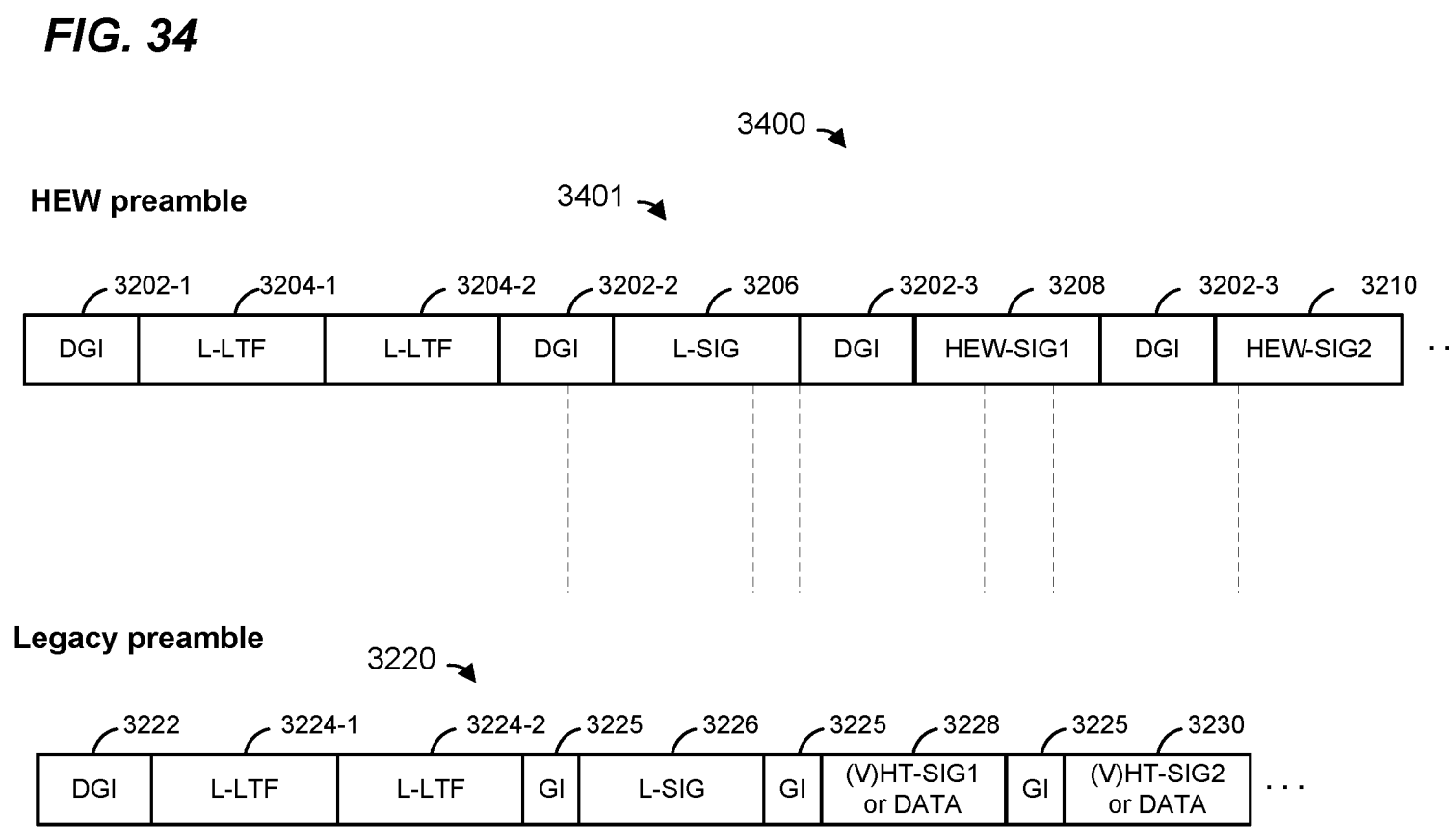

HEW preamble

DGI 3202-1
L-LTF 3204-1
L-LTF 3204-2
DGI 3202-2
L-SIG 3206
DGI 3202-3
HEW-SIG1 3208
DGI 3202-3
HEW-SIG2 3210
...

3220

Legacy preamble

DGI 3222
L-LTF 3224-1
L-LTF 3224-2
GI 3225
L-SIG 3226
GI 3225
(V)HT-SIG1 or DATA 3228
GI 3225
(V)HT-SIG2 or DATA 3230
...

3500
HEW preamble
DGI
L-LTF
L-LTF
GI
L-SIG
DGI
HEW-SIG1
DGI
HEW-SIG2
3202-1
3204-1
3204-2
3502
3206
3202-3
3208
3202-3
3210
Legacy preamble
3220
DGI
L-LTF
L-LTF
GI
L-SIG
GI
(V)HT-SIG1 or DATA
GI
(V)HT-SIG2 or DATA
3222
3224-1
3224-2
3225
3226
3225
3228
3225
3230

Figure 36:
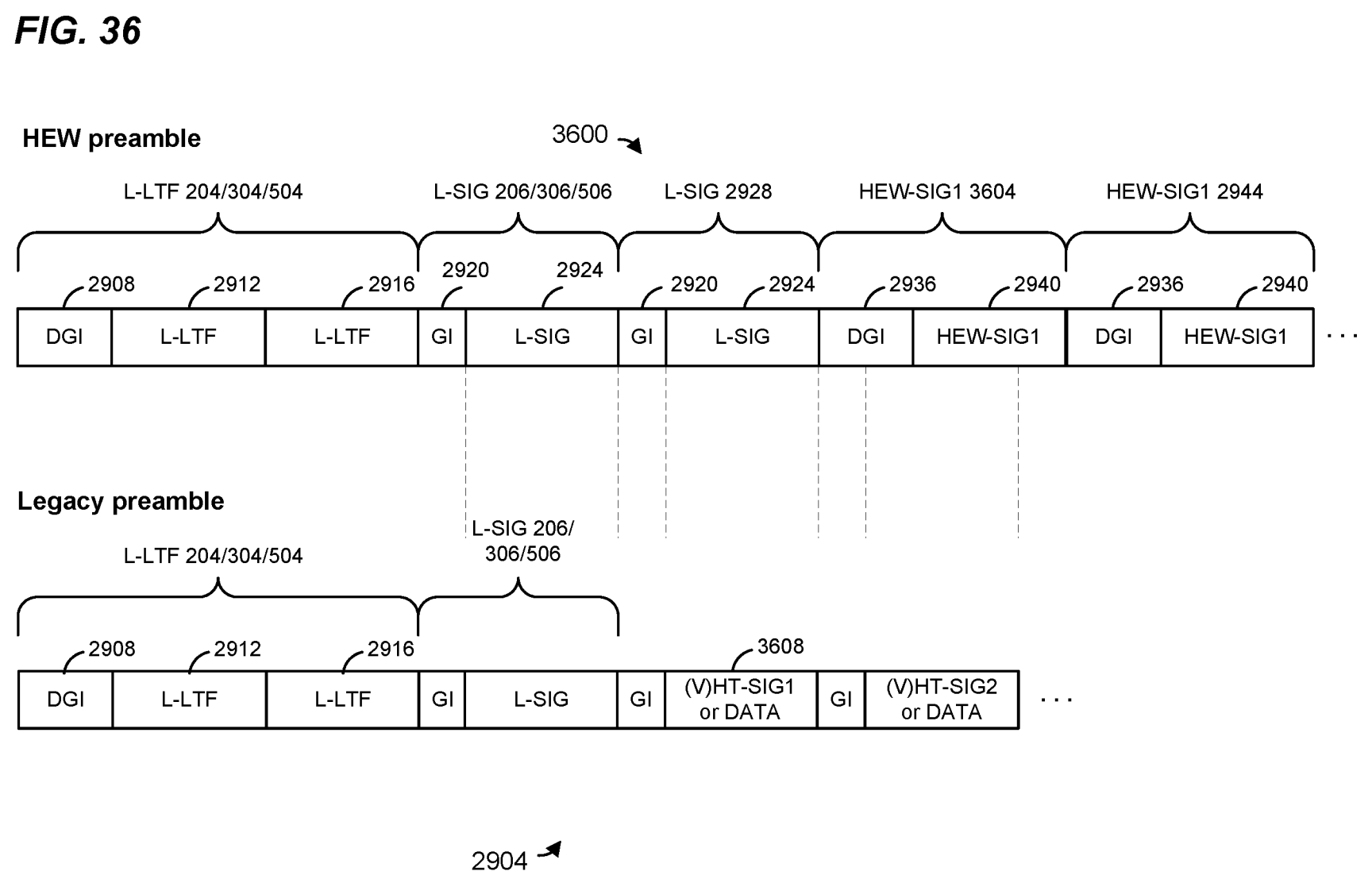

HEW preamble

L-LTF 204/304/504
L-SIG 206/306/506
L-SIG 2928
HEW-SIG1 3604
HEW-SIG1 2944

DGI 2908
L-LTF 2912
L-LTF 2916
GI 2920
L-SIG 2924
GI 2920
L-SIG 2924
DGI 2936
HEW-SIG1 2940
DGI 2936
HEW-SIG1 2940
. . .

Legacy preamble

L-LTF 204/304/504
L-SIG 206/306/506

DGI 2908
L-LTF 2912
L-LTF 2916
GI
L-SIG
GI
(V)HT-SIG1 or DATA 3608
GI
(V)HT-SIG2 or DATA
. . .

2904

3700
HEW preamble
3202-1
DGI
3204-1
L-LTF
3204-2
L-LTF
3302
GI
3206-1
L-SIG
3706
HEW AutoDet Symbol
3202-3
DGI
3208
HEW-SIG1
3202-4
DGI
3210
HEW-SIG2
Legacy preamble
3220
3222
DGI
3224-1
L-LTF
3224-2
L-LTF
3225
GI
3226
L-SIG
3225
GI
3228
(V)HT-SIG1 or DATA
3225
GI
3230
(V)HT-SIG2 or DATA

Same as first 4us of L-STF

L-SIG

HEW-AutoDet Symbol

FIG. 38D

S S S Postfix

L-SIG

HEW-AutoDet Symbol

Figure 39:
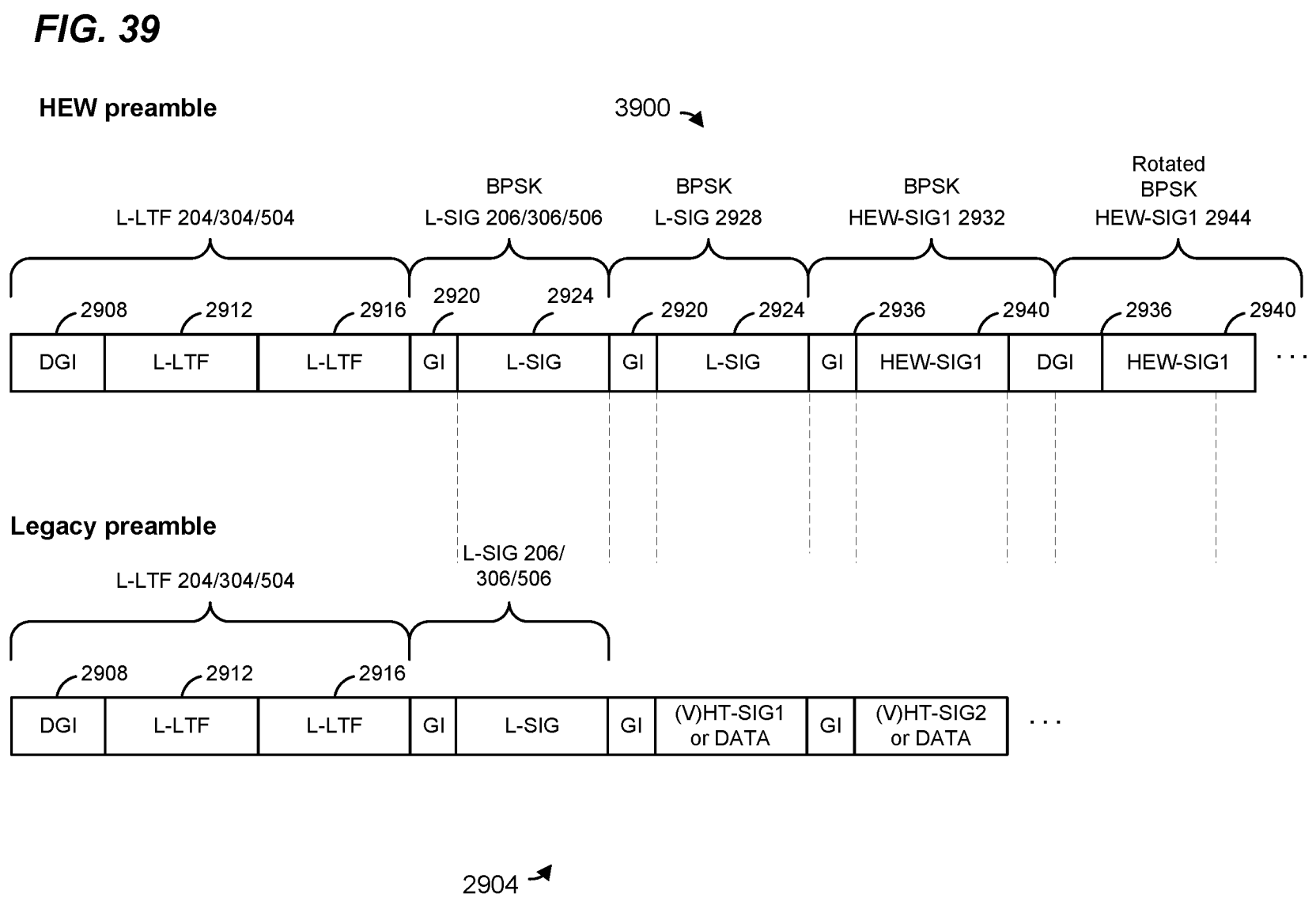

HEW preamble

L-LTF 204/304/504
BPSK L-SIG 206/306/506
BPSK L-SIG 2928
BPSK HEW-SIG1 2932
Rotated BPSK HEW-SIG1 2944

2908 2912 2916 2920 2924 2920 2924 2936 2940 2936 2940

DGI | L-LTF | L-LTF | GI | L-SIG | GI | L-SIG | GI | HEW-SIG1 | DGI | HEW-SIG1 | ...

Legacy preamble

L-LTF 204/304/504
L-SIG 206/306/506

2908 2912 2916

DGI | L-LTF | L-LTF | GI | L-SIG | GI | (V)HT-SIG1 or DATA | GI | (V)HT-SIG2 or DATA | ...

2904

4000
Legacy Portion 4004
4008
L-LTF
4012
L-LTF
4016
L-SIG
4020a
HEW-STF
4020b
HEW-STF
4024
HEW-LTF1
4028
HEW-SIGA
4032
HEW-LTFs 2-N
4036
HEW-SIGB 4050
Legacy Portion 4004
4008
L-LTF
4012
L-LTF
4016
L-SIG
4054a
L-SIG
4054b
L-SIG
4020a
HEW-STF
4020b
HEW-STF
4024
HEW-LTF1
4028
HEW-SIGA
4032
HEW-LTFs 2-N
4036
HEW-SIGB HEW RE mode preamble
4100
L-LTF 204/304/504
L-SIG 206/306/506
L-SIG 2928
HEW-SIG1 2932
HEW-SIG1 2944
2908
2912
2916
2920
2924
2920
2924
2936
2940
2936
2940
DGI
L-LTF
L-LTF
GI
L-SIG
GI
L-SIG
DGI
HEW-SIG1
DGI
HEW-SIG1
HEW regular mode preamble
4104
HEW-SIG1 4024
HEW-SIG2 4028
HEW-SIG3 4032
4104
4108
4112
4116
4120
DGI
L-LTF
L-LTF
GI
L-SIG
GI
HEW-SIG1
GI
HEW-SIG2
GI
HEW-SIG3
Legacy preamble
L-LTF 204/304/504
L-SIG 206/306/506
2908
2912
2916
DGI
L-LTF
L-LTF
GI
L-SIG
GI
(V)HT-SIG1 or DATA
GI
(V)HT-SIG2 or DATA
2904

HEW RE mode preamble
4200
L-LTF 204/304/504
L-SIG 206/306/506
HEW-SIG1 3004
HEW-SIG1 3016
HEW-SIG2 3020
2908
2912
2916
2920
2924
3008
3012
3008
3012
3024
3028
DGI
L-LTF
L-LTF
GI
L-SIG
GI
HEW-SIG1
GI
HEW-SIG1
DGI
HEW-SIG2
HEW regular mode preamble
4204
HEW-SIG1 4024
HEW-SIG2 4028
HEW-SIG3 4032
4104
4108
4112
4116
4120
DGI
L-LTF
L-LTF
GI
L-SIG
GI
HEW-SIG1
GI
HEW-SIG2
GI
HEW-SIG3
Legacy preamble
L-LTF 204/304/504
L-SIG 206/306/506
2908
2912
2916
DGI
L-LTF
L-LTF
GI
L-SIG
GI
(V)HT-SIG1 or DATA
GI
(V)HT-SIG2 or DATA
2904

4300
HEW RE mode preamble
L-LTF 204/304/504
L-SIG 206/306/506
HEW-SIG1 3016
HEW-SIG2 3020
2908
2912
2916
2920
2924
4308
3008
3012
3024
3028
DGI
L-LTF
L-LTF
GI
L-SIG
HEW AutoDet Symbol
DGI
HEW-SIG1
DGI
HEW-SIG2
HEW regular mode preamble
4304
HEW-SIG1 4024
HEW-SIG2 4028
HEW-SIG3 4032
4104
4108
4112
4116
4120
DGI
L-LTF
L-LTF
GI
L-SIG
GI
HEW-SIG1
GI
HEW-SIG2
GI
HEW-SIG3
Legacy preamble
L-LTF 204/304/504
L-SIG 206/306/506
2908
2912
2916
DGI
L-LTF
L-LTF
GI
L-SIG
GI
(V)HT-SIG1 or DATA
GI
(V)HT-SIG2 or DATA
2904

PHYSICAL LAYER FRAME FORMAT FOR WLAN

CROSS-REFERENCES TO RELATED APPLICATIONS

The present application is a continuation of U.S. patent application Ser. No. 17/491,525, entitled "Physical Layer Frame Format for WLAN," filed on Sep. 30, 2021, which is a continuation of U.S. patent application Ser. No. 16/410,962, entitled "Physical Layer Frame Format for WLAN," filed on May 13, 2019, which is a continuation of U.S. patent application Ser. No. 15/787,937, entitled "Physical Layer Frame Format for WLAN," filed on Oct. 19, 2017, which is a continuation of U.S. patent application Ser. No. 14/591,759, entitled "Physical Layer Frame Format for WLAN," filed on Jan. 7, 2015, which claims the benefit of U.S. Provisional Patent Application No. 61/924,467, entitled "Physical Layer Frame Format for WLAN," filed on Jan. 7, 2014, U.S. Provisional Patent Application No. 62/030,426, entitled "Physical Layer Frame Format for WLAN," filed on Jul. 29, 2014, U.S. Provisional Patent Application No. 62/034,509, entitled "Physical Layer Frame Format for WLAN," filed on Aug. 7, 2014, U.S. Provisional Patent Application No. 62/045,363, entitled "Physical Layer Frame Format for WLAN," filed on Sep. 3, 2014, U.S. Provisional Patent Application No. 62/051,537, entitled "Physical Layer Frame Format for WLAN," filed on Sep. 17, 2014, and U.S. Provisional Patent Application No. 62/089,032, entitled "Physical Layer Frame Format for WLAN," filed on Dec. 8, 2014. All of the applications referenced above are incorporated herein by reference in their entireties.

Additionally, U.S. patent application Ser. No. 14/591,759 is a continuation in part of U.S. patent application Ser. No. 14/523,678, entitled "Range Extension Mode for WiFi," filed on Oct. 24, 2014, which claims the benefit of U.S. Provisional Patent Application No. 61/895,591, entitled "Range Extension PHY," filed on Oct. 25, 2013, U.S. Provisional Patent Application No. 61/925,332, entitled "Range Extension PHY," filed on Jan. 9, 2014, U.S. Provisional Patent Application No. 61/950,727, entitled "Range Extension PHY," filed on Mar. 10, 2014, and U.S. Provisional Patent Application No. 61/987,778, entitled "Range Extension PHY," filed on May 2, 2014. All of the applications referenced above are incorporated herein by reference in their entireties.

FIELD OF THE DISCLOSURE

The present disclosure relates generally to wireless communication networks and, more particularly, to physical layer (PHY) frame formats that facilitate coexistence with legacy devices in wireless local area networks.

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for generating a physical layer (PHY) data unit that conforms to a first communication protocol includes: generating, at a first communication device, a PHY preamble of the PHY data unit to include: a first orthogonal frequency division multiplexing (OFDM) symbol corresponding to a legacy signal field, the legacy signal field including i) a length subfield, and ii) a rate subfield, wherein the length subfield and the rate subfield indicate a duration of the PHY data unit, and wherein the legacy signal field is formatted according to a legacy second communication protocol, a second OFDM symbol corresponding to a duplicate of the legacy signal field, the second OFDM symbol following the first OFDM symbol in time, and a plurality of additional OFDM symbols corresponding to a non-legacy signal field. The method also includes: setting, at the first communication device, the length subfield of the legacy signal field to a length value such that a remainder value resulting from dividing the length value by three, indicates that the PHY data unit conforms to the first communication protocol; generating, at the communication device, a PHY data portion of the PHY data unit; and transmitting, by the communication device, the PHY data unit via a wireless communication channel.

In another embodiment, a communication device comprises a wireless network interface device having one or more integrated circuit (IC) devices configured to: generate a PHY preamble of the PHY data unit to include: a first orthogonal frequency division multiplexing (OFDM) symbol corresponding to a legacy signal field, the legacy signal field including i) a length subfield, and ii) a rate subfield, wherein the length subfield and the rate subfield indicate a duration of the PHY data unit, and wherein the legacy signal field is formatted according to a legacy second communication protocol, a second OFDM symbol corresponding to a duplicate of the legacy signal field, the second OFDM symbol following the first OFDM symbol in time, and a plurality of additional OFDM symbols corresponding to a non-legacy signal field. The one or more IC devices are further configured to: set the length subfield of the legacy signal field to a length value such that a remainder value resulting from dividing the length value by three, indicates that the PHY data unit conforms to the first communication protocol, generate a PHY data portion of the PHY data unit, and control the wireless network interface device to transmit the PHY data unit via a wireless communication channel.

BRIEF DESCRIPTION OF THE DRAWINGS

FIG. 6A is a group of diagrams of modulations used to modulate symbols in a prior art data unit.

FIG. 6B is a group of diagrams of modulations used to modulate symbols in an example data unit, according to an embodiment.

FIG. 20A is a diagram showing repetition of OFDM symbols in a preamble of a range extension mode data unit, according to an embodiment.

FIG. 20B is a diagram showing repetition of OFDM symbols in a preamble of a range extension mode data unit, according to an embodiment.

FIG. 20C is a diagram showing a time domain repetition scheme for OFDM symbols, according to one embodiment.

FIG. 20D is a diagram showing a repetition scheme for OFDM symbols, according to another embodiment.

FIG. 22A is a diagram of a 20 MHz overall bandwidth having repetitions of the range extension data unit having a 10 MHz sub-band, according to an embodiment.

FIG. 22B is a diagram of a 40 MHz overall bandwidth having repetitions of the range extension data unit having a 10 MHz sub-band, according to an embodiment.

FIG. 22C is a diagram of an example tone plan for a 32-FFT mode, according to an embodiment.

FIG. 28 is a flow diagram of an example method for generating a data unit, according to another embodiment.

FIG. 31 is a diagram of a portion of another example PHY preamble that conforms to a first communication protocol, according to another embodiment, as compared to the portion of the preamble that conforms to a legacy protocol.

FIG. 33 is a diagram of a portion of another example PHY preamble that conforms to a first communication protocol, according to another embodiment, as compared to the portion of the preamble that conforms to a legacy protocol.

FIG. 34 is a diagram of a portion of another example PHY preamble that conforms to a first communication protocol, according to another embodiment, as compared to the portion of the preamble that conforms to a legacy protocol.

FIG. 36 is a diagram of a portion of another example PHY preamble that conforms to a first communication protocol, according to another embodiment, as compared to the portion of the preamble that conforms to a legacy protocol.

FIGS. 38A-D are diagrams illustrating examples of auto detection symbols that are utilized with the example PHY preamble of FIG. 37, according to various embodiments.

FIG. 39 is a diagram of a portion of another example PHY preamble that conforms to a first communication protocol, according to another embodiment, as compared to the portion of the preamble that conforms to a legacy protocol.

DETAILED DESCRIPTION

Figure 1:
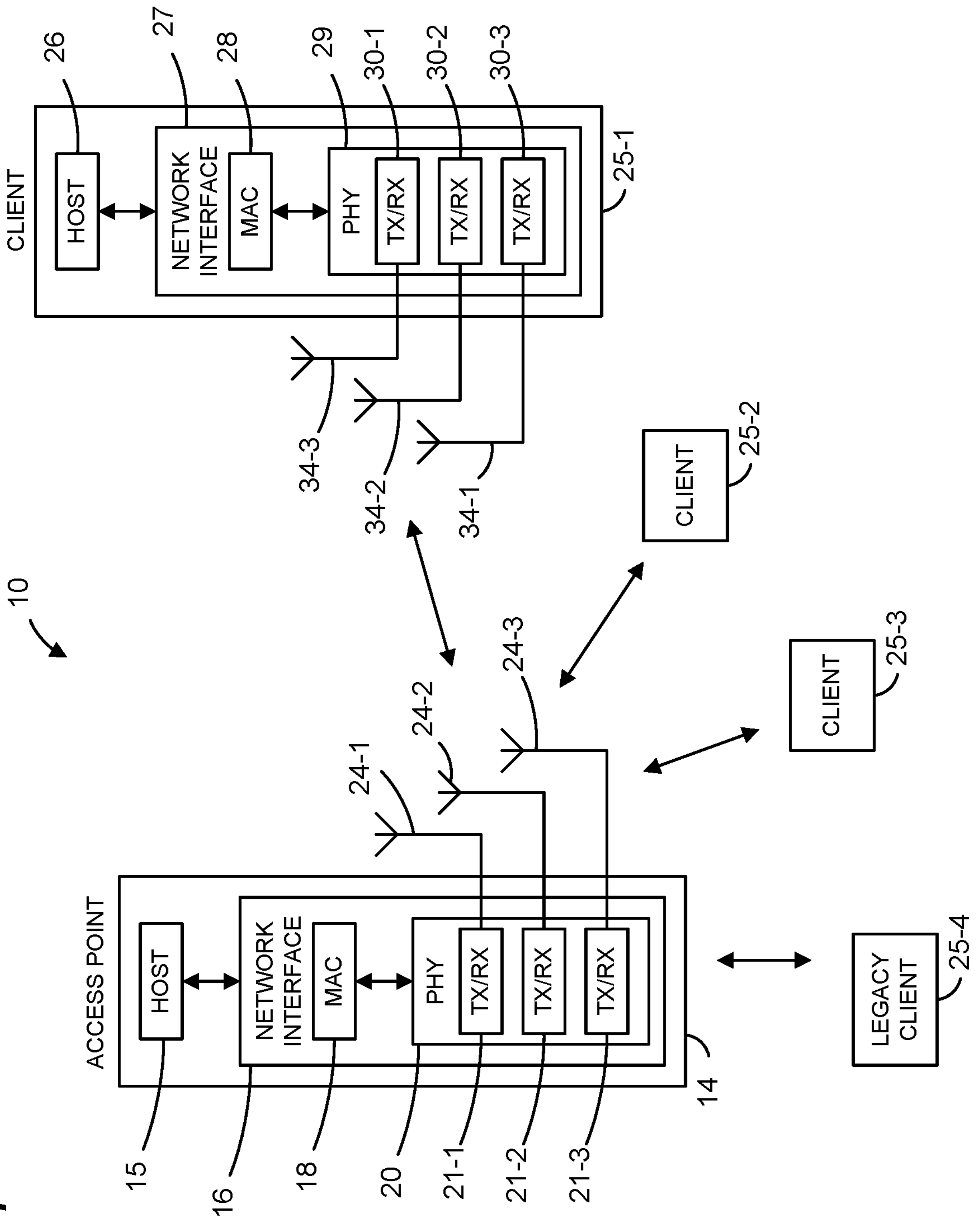
FIG. 1 is a block diagram of an example wireless local area network (WLAN), according to an embodiment.

In embodiments described below, a wireless network device such as an access point (AP) of a wireless local area network (WLAN) transmits data streams to one or more client stations. The AP is configured to operate with client stations according to at least a first communication protocol. The first communication protocol is sometimes referred to herein as "high efficiency Wi-Fi," "HEW" communication protocol, or 802.11ax communication protocol. In some embodiments, different client stations in the vicinity of the AP are configured to operate according to one or more other communication protocols which define operation in the same frequency band as the HEW communication protocol but with generally lower data throughputs. The lower data throughput communication protocols (e.g., IEEE 802.11a, IEEE 802.11n, and/or IEEE 802.11ac) are collectively referred herein as "legacy" communication protocols. In at least some embodiments, the legacy communication protocols are generally deployed in indoor communication channels, and the HEW communication protocol is at least sometimes deployed for outdoor communications, extended range communications, or communications in areas with reduced signal-to-noise ratios (SNR) of transmitted signals.

According to an embodiment, symbols transmitted by the AP are generated according to a range extension coding scheme that provides increased redundancy of symbols or information bits encoded within the symbols. The redundancy increases the likelihood of the symbols being successfully decoded by a device that receives the symbols from the AP, particularly in areas with reduced SNR. An amount of redundancy needed to mitigate the reduced SNR generally depends on a delay channel spread (e.g. for an outdoor communication channel), other signals that interfere with the symbols, and/or other factors. In an embodiment, the HEW communication protocol defines a regular mode and a range extension mode. The regular mode is generally used with communication channels characterized by shorter channel delay spreads (e.g., indoor communication channels) or generally higher SNR values, while the range extension mode is generally used with communication channels characterized by relatively longer channel delay spreads (e.g., outdoor communication channels) or generally lower SNR values in an embodiment. In an embodiment, a regular coding scheme is used in the regular mode, and a range extension coding scheme is used in the range extension mode.

In an embodiment, a data unit transmitted by the AP includes a preamble and a data portion, wherein the preamble is used, at least in part, to signal, to a receiving device, various parameters used for transmission of the data portion. In various embodiments, the preamble of a data unit is used to signal, to a receiving device, the particular coding scheme being utilized in at least the data portion of the data unit. In some embodiments, a same preamble format is used in the regular mode as in the range extension mode. In one such embodiment, the preamble includes an indication set to indicate whether the regular coding scheme or the range extension coding scheme is used for at least the data portion of the data unit. In some embodiments, the indicated regular coding scheme or range extension coding scheme is used for at least a portion of the preamble of the data unit, in addition to the data portion of the data unit. In an embodiment, the receiving device determines the particular coding scheme being utilized based on the indication in the preamble of the data unit, and then decodes the appropriate remaining portion of the data unit (e.g., the data portion, or a portion of the preamble and the data portion) using the particular coding scheme.

In another embodiment, a preamble used in the range extension mode is formatted differently from a preamble used in the regular mode. For example, the preamble used in the range extension mode is formatted such that the receiving device can automatically (e.g., prior to decoding) detect that the data unit corresponds to the range extension mode. In an embodiment, when the receiving device detects that the data unit corresponds to the range extension mode, the receiving device decodes the data portion of the data unit, and in at least some embodiments, at least a portion of the preamble as well as the data portion of the data unit, using the range extension coding scheme. On the other hand, when the receiving device detects that the data unit does not correspond to the range extension mode, the receiving device assumes that the data unit corresponds to the regular mode, in an embodiment. The receiving device then decodes at least the data portion of the data unit using the regular coding scheme, in an embodiment.

Additionally, in at least some embodiments, a preamble of a data unit in the regular mode and/or in the range extension mode is formatted such that a client station that operates according to a legacy protocol, and not the HEW communication protocol, is able to determine certain information regarding the data unit, such as a duration of the data unit, and/or that the data unit does not conform to the legacy protocol. Additionally, a preamble of the data unit is formatted such that a client station that operates according to the HEW protocol is able to determine the data unit conforms to the HEW communication protocol and whether the data unit is formatted according to the regular mode or the range extension mode, in an embodiment. Similarly, a client station configured to operate according to the HEW communication protocol also transmits data units such as described above, in an embodiment.

In at least some embodiments, data units formatted such as described above are useful, for example, with an AP that is configured to operate with client stations according to a plurality of different communication protocols and/or with WLANs in which a plurality of client stations operate according to a plurality of different communication protocols. Continuing with the example above, a communication device configured to operate according to both the HEW communication protocol (including the regular mode and the range extension mode) and a legacy communication protocol is able to determine that a given data unit is formatted according to the HEW communication protocol and not the legacy communication protocol, and further, to determine that the data unit is formatted according to the range extension mode and not the regular mode. Similarly, a communication device configured to operate according to a legacy communication protocol but not the HEW communication protocol is able to determine that the data unit is not formatted according to the legacy communication protocol and/or determine a duration of the data unit.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., HEW communication protocol), including at least a first mode and a second mode of the first communication protocol. In some embodiments, the first mode corresponds to a range extension mode that uses a range extension coding scheme (e.g., block encoding, bit-wise replication, or symbol replication), a signal modulation scheme (e.g., phase shift keying or quadrature amplitude modulation), or both a range extension coding scheme and signal modulation scheme. The range extension mode is configured to increase a range and/or reduce a signal-to-noise (SNR) ratio, as compared to the second mode (e.g., a regular mode using a regular coding scheme), at which successful decoding of PHY data units conforming to the range extension mode is performed. In various embodiments, the range extension mode reduces a data rate of transmission as compared to the regular mode to achieve successful decoding with increased range and/or reduced SNR ratio. In another embodiment, the MAC processing unit 18 and the PHY processing unit 20 are also configured to operate according to a second communication protocol (e.g., IEEE 802.11ac Standard). In yet another embodiment, the MAC processing unit 18 and the PHY processing unit 20 are additionally configured to operate according to the second communication protocol, a third communication protocol, and/or a fourth communication protocol (e.g., the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 21 is/are configured to receive data units via the antenna(s) 24. The PHY processing unit 20 of the AP 14 is configured to process received data units conforming to the first communication protocol and having formats described hereinafter and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna (s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

Figures 2A, 2B:
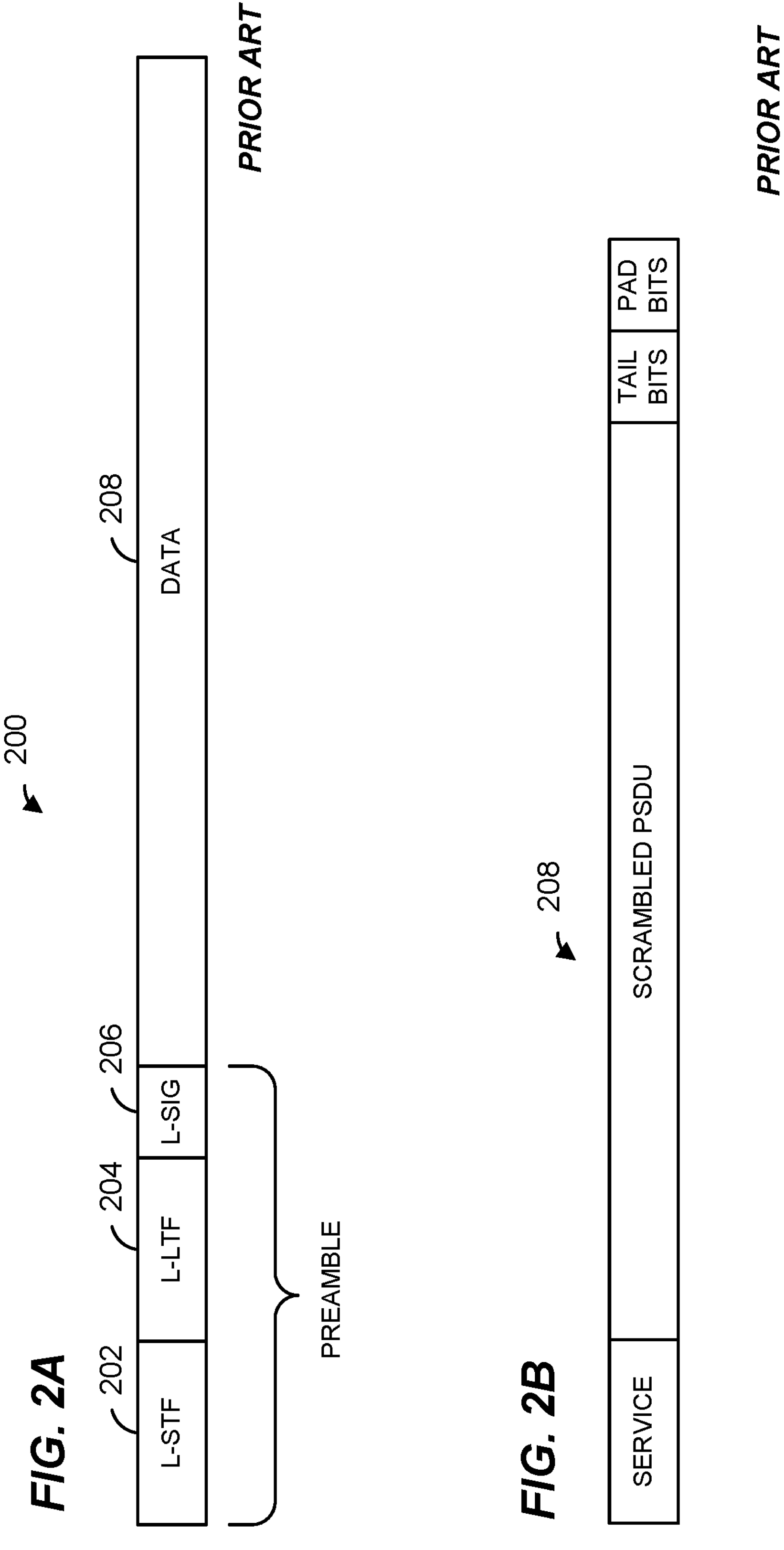
FIGS. 2A and 2B are diagrams of a prior art data unit format.

FIG. 2A is a diagram of a prior art OFDM data unit 200 that the AP 14 is configured to transmit to the legacy client station 25-4 via orthogonal frequency division multiplexing (OFDM) modulation, according to an embodiment. In an embodiment, the legacy client station 25-4 is also configured to transmit the data unit 200 to the AP 14. The data unit 200 conforms to the IEEE 802.11a Standard and occupies a 20 Megahertz (MHz) band. The data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The data unit 200 also includes a legacy signal field (L-SIG) 206, used to carry certain physical layer (PHY) parameters with the data unit 200, such as modulation type and coding rate used to transmit the data unit, for example. The data unit 200 also includes a data portion 208. FIG. 2B is a diagram of example data portion 208 (not low density parity check encoded), which includes a service field, a scrambled physical layer service data unit (PSDU), tail bits, and padding bits, if needed. The data unit 200 is designed for transmission over one spatial or space-time stream in a single input single output (SISO) channel configuration.

Figures 3, 4, 5:
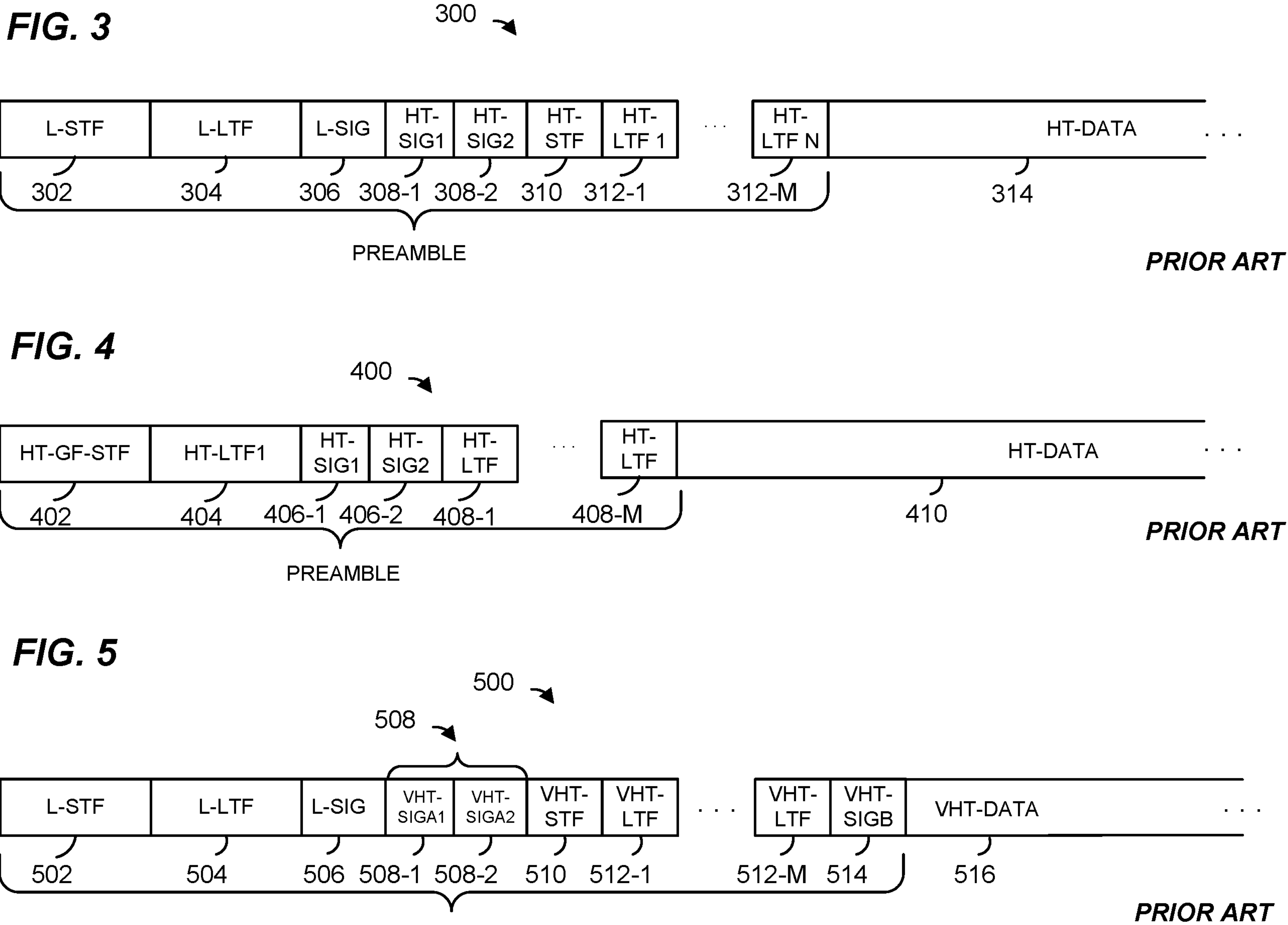
FIG. 3 is a diagram of another prior art data unit format.
FIG. 4 is a diagram of another prior art data unit format.
FIG. 5 is a diagram of another prior art data unit format.

FIG. 3 is a diagram of a prior art OFDM data unit 300 that the AP 14 is configured to transmit to the legacy client station 25-4 via orthogonal frequency domain multiplexing (OFDM) modulation, according to an embodiment. In an embodiment, the legacy client station 25-4 is also configured to transmit the data unit 300 to the AP 14. The data unit 300 conforms to the IEEE 802.11n Standard, occupies a 20 MHz band, and is designed for mixed mode situations, i.e., when the WLAN includes one or more client stations that conform to the IEEE 802.11a Standard but not the IEEE 802.11n Standard. The data unit 300 includes a preamble having an L-STF 302, an L-LTF 304, an L-SIG 306, a high throughput signal field (HT-SIG) 308, a high throughput short training field (HT-STF) 310, and M data high throughput long training fields (HT-LTFs) 312, where M is an integer generally determined by the number of spatial streams used to transmit the data unit 300 in a multiple input multiple output (MIMO) channel configuration. In particular, according to the IEEE 802.11n Standard, the data unit 300 includes two HT-LTFs 312 if the data unit 300 is transmitted using two spatial streams, and four HT-LTFs 312 is the data unit 300 is transmitted using three or four spatial streams. An indication of the particular number of spatial streams being utilized is included in the HT-SIG field 308. The data unit 300 also includes a data portion 314.

FIG. 4 is a diagram of a prior art OFDM data unit 400 that the AP 14 is configured to transmit to the legacy client station 25-4 via orthogonal frequency domain multiplexing (OFDM) modulation, according to an embodiment. In an embodiment, the legacy client station 25-4 is also configured to transmit the data unit 400 to the AP 14. The data unit 400 conforms to the IEEE 802.11n Standard, occupies a 20 MHz band, and is designed for "Greenfield" situations, i.e., when the WLAN does not include any client stations that conform to the IEEE 802.11a Standard, and only includes client stations that conform to the IEEE 802.11n Standard. The data unit 400 includes a preamble having a high throughput Greenfield short training field (HT-GF-STF) 402, a first high throughput long training field (HT-LTF1) 404, a HT-SIG 406, and M data HT-LTFs 408, where M is an integer which generally corresponds to a number of spatial streams used to transmit the data unit 400 in a multiple input multiple output (MIMO) channel configuration. The data unit 400 also includes a data portion 410.

FIG. 5 is a diagram of a prior art OFDM data unit 500 that the AP 14 is configured to transmit to the legacy client station 25-4 via orthogonal frequency domain multiplexing (OFDM) modulation, according to an embodiment. In an embodiment, the legacy client station 25-4 is also configured to transmit the data unit 500 to the AP 14. The data unit 500 conforms to the IEEE 802.11ac Standard and is designed for "Mixed field" situations. The data unit 500 occupies a 20 MHz bandwidth. In other embodiments or scenarios, a data unit similar to the data unit 500 occupies a different bandwidth, such as a 40 MHz, an 80 MHz, or a 160 MHz bandwidth. The data unit 500 includes a preamble having an L-STF 502, an L-LTF 504, an L-SIG 506, two first very high throughput signal fields (VHT-SIGAs) 508 including a first very high throughput signal field (VHT-SIGA1) 508-1 and a second very high throughput signal field (VHT-SIGA2) 508-2, a very high throughput short training field (VHT-STF) 510, M very high throughput long training fields (VHT-LTFs) 512, where M is an integer, and a second very high throughput signal field (VHT-SIG-B) 514. The data unit 500 also includes a data portion 516.

FIG. 6A is a set of diagrams illustrating modulation of the L-SIG, HT-SIG1, and HT-SIG2 fields of the data unit 300 of FIG. 3, as defined by the IEEE 802.11n Standard. The L-SIG field is modulated according to binary phase shift keying (BPSK), whereas the HT-SIG1 and HT-SIG2 fields are modulated according to BPSK, but on the quadrature axis (Q-BPSK). In other words, the modulation of the HT-SIG1 and HT-SIG2 fields is rotated by 90 degrees as compared to the modulation of the L-SIG field.

FIG. 6B is a set of diagrams illustrating modulation of the L-SIG, VHT-SIGA1, and VHT-SIGA2 fields of the data unit 500 of FIG. 5, as defined by the IEEE 802.11ac Standard. Unlike the HT-SIG1 field in FIG. 6A, the VHT-SIGA1 field is modulated according to BPSK, same as the modulation of the L-SIG field. On the other hand, the VHT-SIGA2 field is rotated by 90 degrees as compared to the modulation of the L-SIG field.

Figures 7A, 7B:
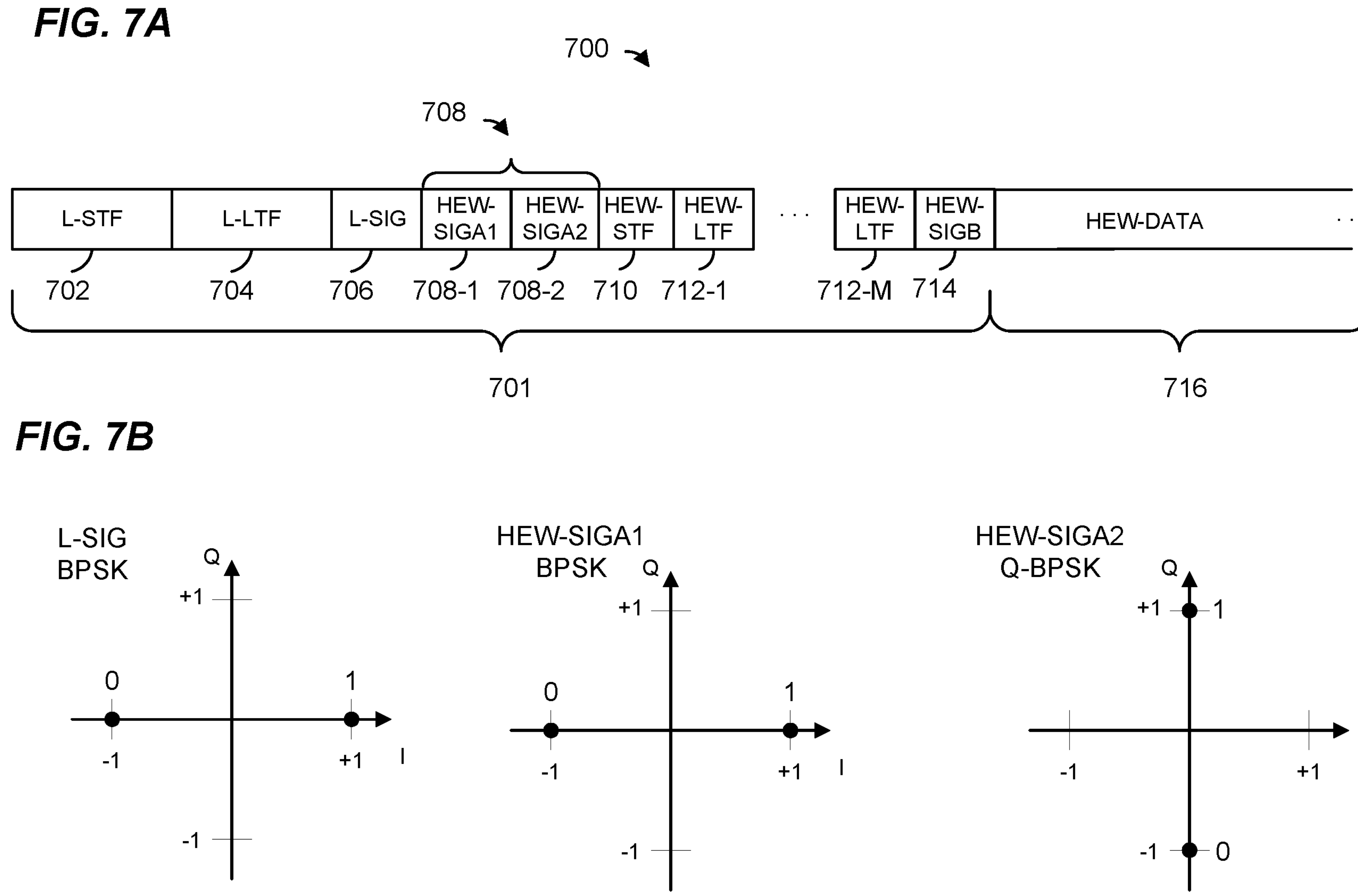
FIG. 7A is a diagram of an orthogonal frequency division multiplexing (OFDM) data unit, according to an embodiment.
FIG. 7B is a group of diagrams of modulations used to modulate symbols in the data unit depicted in FIG. 7A, according to an embodiment.

FIG. 7A is a diagram of an OFDM data unit 700 that the AP 14 is configured to transmit to the client station 25-1 via orthogonal frequency domain multiplexing (OFDM) modulation, according to an embodiment. In an embodiment, the client station 25-1 is also configured to transmit the data unit 700 to the AP 14. The data unit 700 conforms to the first communication protocol and occupies a 20 MHz bandwidth. Data units that conform to the first communication protocol similar to the data unit 700 may occupy other suitable bandwidth such as 40 MHz, 80 MHz, 160 MHz, 320 MHz, 640 MHz, for example, or other suitable bandwidths, in other embodiments. The data unit 700 is suitable for "mixed mode" situations, i.e., when the WLAN 10 includes a client station (e.g., the legacy client station 25-4) that conforms to a legacy communication protocol, but not the first communication protocol. The data unit 700 is utilized in other situations as well, in some embodiments.

In an embodiment, the data unit 700 includes a preamble 701 having an L-STF 702, an L-LTF 704, an L-SIG 706, two first HEW signal fields (HEW-SIGAs) 708 including a first HEW signal field (HEW-SIGA1) 708-1 and a second HEW signal field (HEW-SIGA2) 708-2, an HEW short training field (HEW-STF) 710, M HEW long training fields (HEW-LTFs) 712, where M is an integer, and a third HEW signal field (HEW-SIGB) 714. Each of the L-STF 702, the L-LTF 704, the L-SIG 706, the HEW-SIGAs 708, the HEW-STF 710, the M HEW-LTFs 712, and the HEW-SIGB 714 comprises an integer number of one or more OFDM symbols. For example, in an embodiment, the HEW-SIGAs 708 comprise two OFDM symbols, where the HEW-SIGA1 708-1 field comprises the first OFDM symbol and the HEW-SIGA2 comprises the second OFDM symbol. In another embodiment, for example, the preamble 701 includes a third HEW signal field (HEW-SIGA3, not shown) and the HEW-SIGAs 708 comprise three OFDM symbols, where the HEW-SIGA1 708-1 field comprises the first OFDM symbol, the HEW-SIGA2 comprises the second OFDM symbol, and the HEW-SIGA3 comprises the third OFDM symbol. In at least some examples, the HEW-SIGAs 708 are collectively referred to as a single HEW signal field (HEW-SIGA) 708. In some embodiments, the data unit 700 also includes a data portion 716. In other embodiments, the data unit 700 omits the data portion 716.

In the embodiment of FIG. 7A, the data unit 700 includes one of each of the L-STF 702, the L-LTF 704, the L-SIG 706, and the HEW-SIGA1s 708. In other embodiments in which an OFDM data unit similar to the data unit 700 occupies a cumulative bandwidth other than 20 MHz, each of the L-STF 702, the L-LTF 704, the L-SIG 706, the HEW-SIGA1s 708 is repeated over a corresponding number of 20 MHz sub-bands of the whole bandwidth of the data unit, in an embodiment. For example, in an embodiment, the OFDM data unit occupies an 80 MHz bandwidth and, accordingly, includes four of each of the L-STF 702, the L-LTF 704, the L-SIG 706, the HEW-SIGA1s 708, in an embodiment. In some embodiments, the modulation of different 20 MHz sub-bands signals is rotated by different angles. For example, in one embodiment, a first sub-band is rotated 0-degrees, a second sub-band is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 700, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HEW-STF, the HEW-LTFs, the HEW-SIGB and the HEW data portion occupy the corresponding whole bandwidth of the data unit.

FIG. 7B is a set of diagrams illustrating modulation of the L-SIG 706, HEW-SIGA1 708-1, and HEW-SIGA2 708-2 of the data unit 700 of FIG. 7A, according to an embodiment. In this embodiment, the L-SIG 706, HEW-SIGA1 708-1, and HEW-SIGA2 708-2 fields have the same modulation as the modulation of the corresponding field as defined in the IEEE 802.11ac Standard and depicted in FIG. 6B. Accordingly, the HEW-SIGA1 field is modulated the same as the L-SIG field. On the other hand, the HEW-SIGA2 field is rotated by 90 degrees as compared to the modulation of the L-SIG field. In some embodiments having the third HEW-SIGA3 field, the HEW-SIGA2 field is modulated the same as the L-SIG field and the HEW-SIGA1 field, while the HEW-SIGA3 field is rotated by 90 degrees as compared to the modulation of the L-SIG field, the HEW-SIGA1 field, and the HEW-SIGA2 field.

In an embodiment, because the modulations of the L-SIG 706, HEW-SIGA1 708-1, and HEW-SIGA2 708-2 fields of the data unit 700 correspond to the modulations of the corresponding fields in a data unit that conforms to the IEEE 802.11ac Standard (e.g., the data unit 500 of FIG. 5), legacy client stations configured to operate according to the IEEE 802.11a Standard and/or the IEEE 802.11n Standard will assume, in at least some circumstances, that the data unit 700 conforms to the IEEE 802.11ac Standard and will process the data unit 700 accordingly. For example, a client station that conforms to the IEEE 802.11a Standard will recognize the legacy IEEE 802.11a Standard portion of the preamble of the data unit 700 and will set a duration of the data unit (or the data unit duration) according to a duration indicated in the L-SIG 706. For example, the legacy client station 25-4 will calculate a duration for the data unit based on a rate and a length (e.g., in number of bytes) indicated in the L-SIG field 706, according to an embodiment. In an embodiment, the rate and the length in the L-SIG field 706 are set such that a client station configured to operate according to a legacy communication protocol will calculate, based the rate and the length, a packet duration (T) that corresponds to, or at least approximates, the actual duration of the data unit 700. For example, the rate is set to indicate a lowest rate defined by the IEEE 802.11a Standard (i.e., 6 Mbps), and the length is set to a value computed such that packet duration computed using the lowest rate at least approximates the actual duration of the data unit 700, in one embodiment.

In an embodiment, a legacy client station that conforms to the IEEE 802.11a Standard, when receiving the data unit 700, will compute a packet duration for the data unit 700, e.g., using a rate field and a length field of L-SIG field 706, and will wait until the end of the computed packet duration before performing clear channel assessment (CCA), in an embodiment. Thus, in this embodiment, communication medium is protected against access by the legacy client station at least for the duration of the data unit 700. In an embodiment, the legacy client station will continue decoding the data unit 700, but will fail an error check (e.g., using a frame check sequence (FCS)) at the end of the data unit 700.

Similarly, a legacy client station configured to operate according to the IEEE 802.11n Standard, when receiving the data unit 700, will compute a packet duration (T) of the data unit 700 based on the rate and the length indicated in the L-SIG 706 of the data unit 700, in an embodiment. The legacy client station will detect the modulation of the first HEW signal field (HEW-SIGA1) 708-1 (BPSK) and will assume that the data unit 700 is a legacy data unit that conforms to the IEEE 802.11a Standard. In an embodiment, the legacy client station will continue decoding the data unit 700, but will fail an error check (e.g., using a frame check sequence (FCS)) at the end of the data unit. In any event, according to the IEEE 802.11n Standard, the legacy client station will wait until the end of a computed packet duration (T) before performing clear channel assessment (CCA), in an embodiment. Thus, communication medium will be protected from access by the legacy client station for the duration of the data unit 700, in an embedment.

A legacy client station configured to operate according to the IEEE 802.11ac Standard but not the first communication protocol, when receiving the data unit 700, will compute a packet duration (T) of the data unit 700 based on the rate and the length indicated in the L-SIG 706 of the data unit 700, in an embodiment. However, the legacy client station will not be able to detect, based on the modulation of the data unit 700, that the data unit 700 does not conform to the IEEE 802.11ac Standard, in an embodiment. In some embodiments, one or more HEW signal fields (e.g., the HEW-SIGA1 and/or the HEW-SIGA2) of the data unit 700 is/are formatted to intentionally cause the legacy client station to detect an error when decoding the data unit 700, and to therefore stop decoding (or "drop") the data unit 700. For example, HEW-SIGA 708 of the data unit 700 is formatted to intentionally cause an error when the SIGA field is decoded by a legacy device according to the IEEE 802.11ac Standard, in an embodiment. Further, according to the IEEE 802.11ac Standard, when an error is detected in decoding the VHT-SIGA field, the client station will drop the data unit 700 and will wait until the end of a computed packet duration (T), calculated, for example, based on a rate and a length indicated in the L-SIG 706 of the data unit 700, before performing clear channel assessment (CCA), in an embodiment. Thus, communication medium will be protected from access by the legacy client station for the duration of the data unit 700, in an embodiment.

Figure 8:
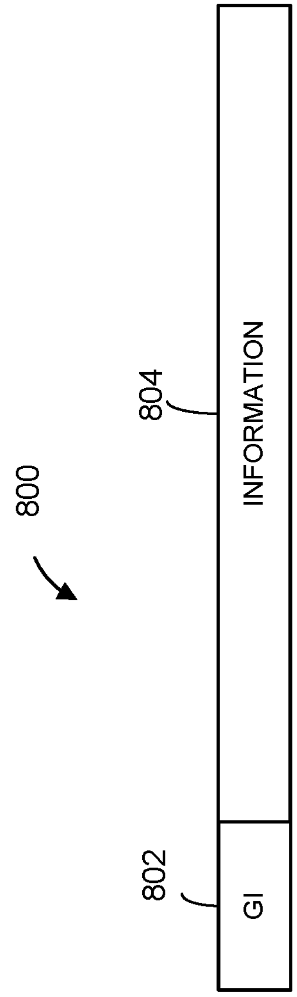
FIG. 8 is a block diagram of an OFDM symbol, according to an embodiment.

FIG. 8 is a diagram of an OFDM symbol 800, according to an embodiment. The data unit 700 of FIG. 7 includes OFDM symbols such as the OFDM symbols 800, in an embodiment. The OFDM symbol 800 includes a guard interval (GI) portion 802 and an information portion 804. In an embodiment, the guard interval comprises a cyclic prefix repeating an end portion of the OFDM symbol. In an embodiment, the guard interval portion 802 is used to ensure orthogonality of OFDM tones at a receiving device (e.g., the client station 25-1) and to minimize or eliminate inter-symbol interference due to multi-path propagation in the communication channel via which the OFDM symbol 800 is transmitted from a transmitting device (e.g., the AP 14) to the receiving device. In an embodiment, the length of the guard interval portion 802 is selected based on expected worst case channel delay spread in the communication channel between the transmitting device and the receiving device. For example, a longer guard interval is selected for outdoor communication channels typically characterized by longer channel delay spreads as compared to a shorter guard interval selected for indoor communication channels typically characterized by shorter channel delay spreads, in an embodiment. In an embodiment, the length of the guard interval portion 802 is selected based on a tone spacing (e.g., spacing between sub-carrier frequencies of the whole bandwidth of the data unit) with which the information portion 804 has been generated. For example, a longer guard interval is selected for a narrower tone spacing (e.g., 256 tones) as compared to a shorter guard interval for a wider tone spacing (e.g., 64 tones).

According to an embodiment, the guard interval portion 802 corresponds to a short guard interval, a normal guard interval, or a long guard interval, depending on mode of transmission being utilized. In an embodiment, the short guard interval or the normal guard interval is used for indoor communication channels, communication channels with relatively short channel delay spreads, or communication channels having suitably high SNR ratios, and the long guard interval is used for outdoor communication channels, communication channels with relatively long delay spreads, or communication channels not having suitably high SNR ratios. In an embodiment, the normal guard interval or the short guard interval is used for some or all OFDM symbols of an HEW data unit (e.g., the HEW data unit 700) when the HEW data unit is transmitted in the regular mode, and the long guard interval is used for at least some OFDM symbols of the HEW data unit when the HEW data unit is transmitted in the range extension mode.

In an embodiment, the short guard interval (SGI) has a length of 0.4 μs, the normal guard interval is 0.8 μs and the long guard interval (LGI) has a length of 1.2 μs or 1.8 μs. In an embodiment, the information portion 804 has a length of 3.2 μs. In other embodiments, the information portion 804 has an increased length that corresponds to the tone spacing with which the information portion 804 has been generated. For example, the information portion 804 has a first length of 3.2 μs for the regular mode using a first tone spacing of 64 tones and has a second length of 6.4 μs for a second tone spacing of 128 tones, where the second tone spacing and second length are both increased by an integer multiple of 2 as compared to the first tone spacing and first length. In an embodiment, the remaining length of the information portion 804 is filled with a copy of a received time-domain signal (e.g., the information portion 804 contains two copies of the received time-domain signal). In other embodiments, other suitable lengths for the SGI, the NGI, the LGI, and/or the information portion 804 are utilized. In some embodiments, the SGI has a length that is 50% of the length of the NGI, and the NGI has a length that is 50% of the length of the LGI. In other embodiments, the SGI has a length that is 75% or less of the length of the NGI, and the NGI has a length that is 75% or less of the length of the LGI. In other embodiments, the SGI has a length that is 50% or less of the length of the NGI, and the NGI has a length that is 50% or less of the LGI.

In other embodiments, OFDM modulation with reduced tone spacing is used in the range extension mode using a same tone plan (e.g., a predetermined sequence of indices that indicate which OFDM tones are designated for data tones, pilot tones, and/or guard tones). For example, whereas the regular mode for a 20 MHz bandwidth OFDM data unit uses a 64-point discrete Fourier transform (DFT), resulting in 64 OFDM tones (e.g., indices −32 to +31), the range extension mode uses a 128-point DFT for a 20 MHz OFDM data unit, resulting in 128 OFDM tones (e.g., indices −64 to +63) in the same bandwidth. In this case, tone spacing in the range extension mode OFDM symbols is reduced by a factor of two (½) compared to regular mode OFDM symbols while using the same tone plan. As another example, whereas the regular mode for a 20 MHz bandwidth OFDM data unit uses a 64-point discrete Fourier transform (DFT) resulting in 64 OFDM tones, the range extension mode uses a 256-point DFT for a 20 MHz OFDM data unit resulting in 256 OFDM tones in the same bandwidth. In this case, tone spacing in the range extension mode OFDM symbols is reduced by a factor of four (¼) compared to the regular mode OFDM symbols. In such embodiments, long GI duration of, for example, 1.6 μs is used. However, the duration of the information portion of the range extension mode OFDM symbol is increased (e.g., from 3.2 μs to 6.4 μs), and the percentage of the GI portion duration to the total OFDM symbols duration remains the same, in an embodiment. Thus, in this case, loss of efficiency due to a longer GI symbol is avoided, in at least some embodiments. In various embodiments, the term "long guard interval" as used herein encompasses an increased duration of a guard interval as well as a decreased OFDM tone spacing that effectively increases duration of the guard interval.

Figures 9A, 9B:
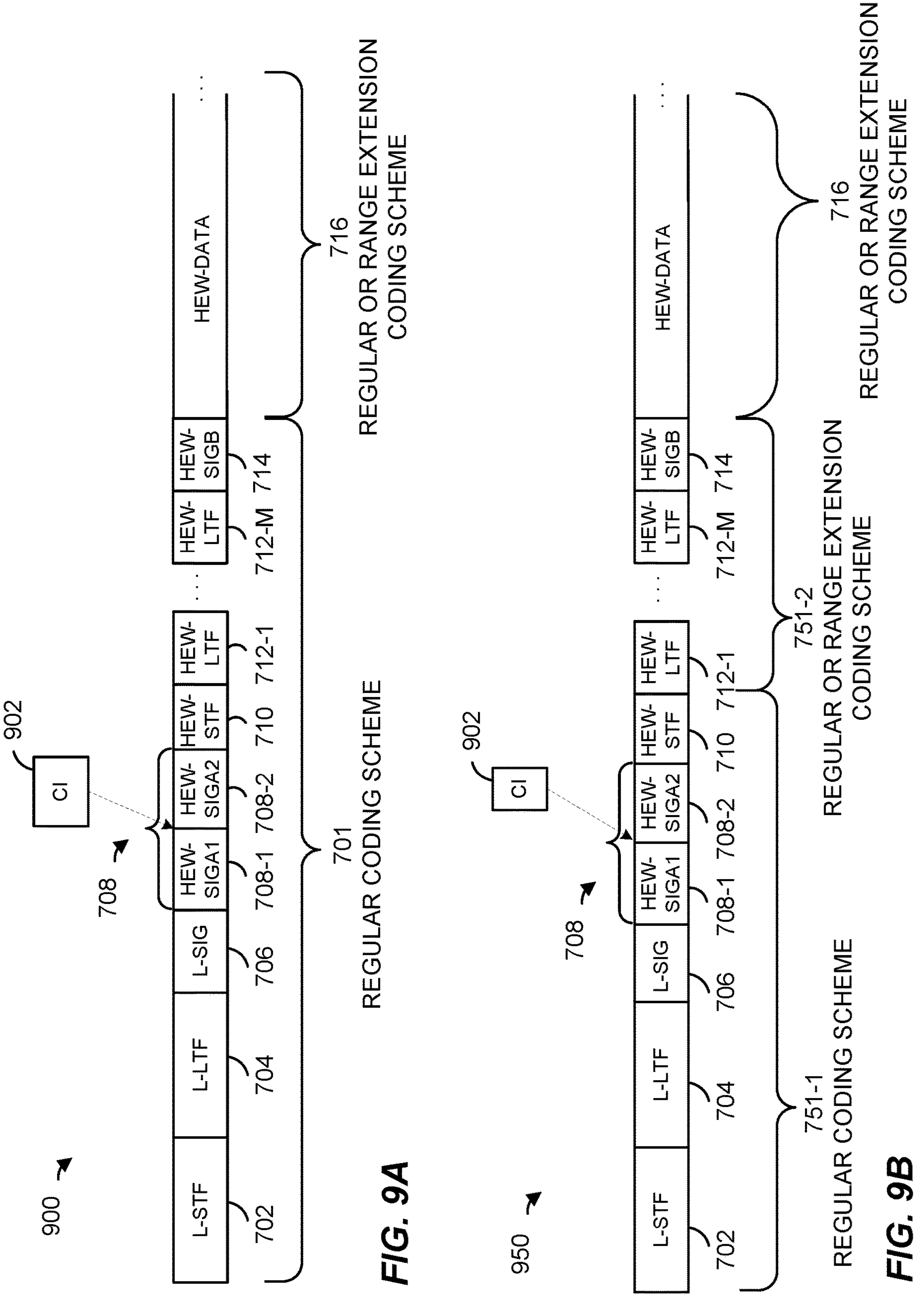
FIG. 9A is a diagram illustrating an example data unit in which a regular coding scheme is used for a preamble of the data unit, according to an embodiment.
FIG. 9B is a diagram illustrating an example data unit in which a regular coding scheme is used for only a portion a preamble of the data unit, according to an embodiment.

FIG. 9A is a diagram illustrating an example data unit 900 in which the regular mode or range extension mode is used for a preamble of the data unit, according to an embodiment. The data unit 900 is generally the same as the data unit 700 of FIG. 7A and includes like-numbered elements with the data unit 700 of FIG. 7A. The HEW-SIGA field 708 (e.g., the HEW-SIGA1 708-1 or the HEW-SIGA2 708-2) of the data unit 900 includes a coding indication (CI) 902. According to an embodiment, the CI indication 902 is set to indicate one of (i) regular mode with a regular coding scheme or (ii) range extension mode with a range extension coding scheme. In an embodiment, the CI indication 902 comprises one bit, wherein a first value of the bit indicates the regular mode and a second value of the bit indicates the range extension mode. In some embodiments, the CI indication is combined with a modulation and coding scheme (MCS) indicator. In an embodiment, for example, the regular mode corresponds to MCS values which are determined to be valid by a legacy receiver device (e.g., in compliance with IEEE 802.11ac protocol), while the range extension mode corresponds to an MCS value that is determined to be invalid (or not supported) by the legacy receiver device (e.g., not in compliance with IEEE 802.11ac protocol). In other embodiments, the CI indication 902 has a plurality of bits that indicate a plurality of regular mode MCS values and a plurality of range extension mode MCS values. As illustrated in FIG. 9A, the regular coding scheme is used for all OFDM symbols of the preamble of the data unit 700, and one of the regular coding scheme or the range extension coding scheme, as indicated by the CI indication 902, is used for OFDM symbols of the data portion 716, in the illustrated embodiment.

In an embodiment, for example, where the range extension coding scheme is used for OFDM symbols of the data portion 716, the range and/or SNR at which successful decoding of PHY data units is generally improved (i.e., successful decoding at longer range and/or lower SNR) as compared to regular data units. In some embodiments, the improved range and/or SNR performance is not necessarily achieved for decoding of the preamble 701, which is generated using the regular coding scheme. In such embodiments, transmission of at least a portion of the preamble 701 with a transmission power boost, as compared to transmission power used for transmission of the data portion 716, to increase a decoding range of the portion of the preamble 701. In some embodiments, the portion of the preamble 701 that is transmitted with the transmission power boost includes legacy fields, such as the L-STF 702, L-LTF 704, and L-SIG 708, and/or non-legacy fields, such as the HEW-STF and HEW-LTF. In various embodiments, the transmission power boost is 3 dB, 6 dB, or other suitable values. In some embodiments, the transmission power boost is determined such that the "boosted" preamble 701 is decodable with similar performance as compared to the "unboosted" data portion 716 at a same location. In some embodiments, an increased length of the L-STF 702, L-LTF 704, and/or L-SIG 706 is used in combination with the transmission power boost. In other embodiments, the increased length of the L-STF 702, L-LTF 704, and/or L-SIG 706 is used instead of the transmission power boost.

FIG. 9B is a diagram illustrating an example data unit 950 in which the range extension coding scheme is used for a portion of a preamble of the data unit, according to an embodiment. The data unit 950 is generally the same as the data unit 900 of FIG. 9A, except that in the data unit 950 includes a preamble 751 in which the coding scheme indicated by the CI indication 902 is applied to OFDM symbols of a portion of the preamble 751 as well as to the OFDM symbols of the data portion 716. In particular, in the illustrated embodiment, the regular coding scheme is used for a first portion 751-1 of the preamble 701, and one of the regular coding scheme or the range extension coding scheme, as indicated by the CI indication 902, is used for OFDM symbols of a second portion 751-2 of the preamble 751, in addition to OFDM symbols of the data portion 716. Accordingly, the coding scheme indicated by the CI indication 902 skips the OFDM symbol that corresponds to the HEW-STF 710 and is applied beginning with the OFDM symbol that corresponds to the HEW-LTF 712-1, in the illustrated embodiment. Skipping the HEW-STF 710 allows the device receiving the data unit 950 sufficient time to decode the CI indication 902 and to properly set up the receiver to begin decoding OFDM symbols using the coding scheme indicated by the CI indication 902 prior to receiving such OFDM symbols, in at least some embodiments.

Figures 10A, 10B:
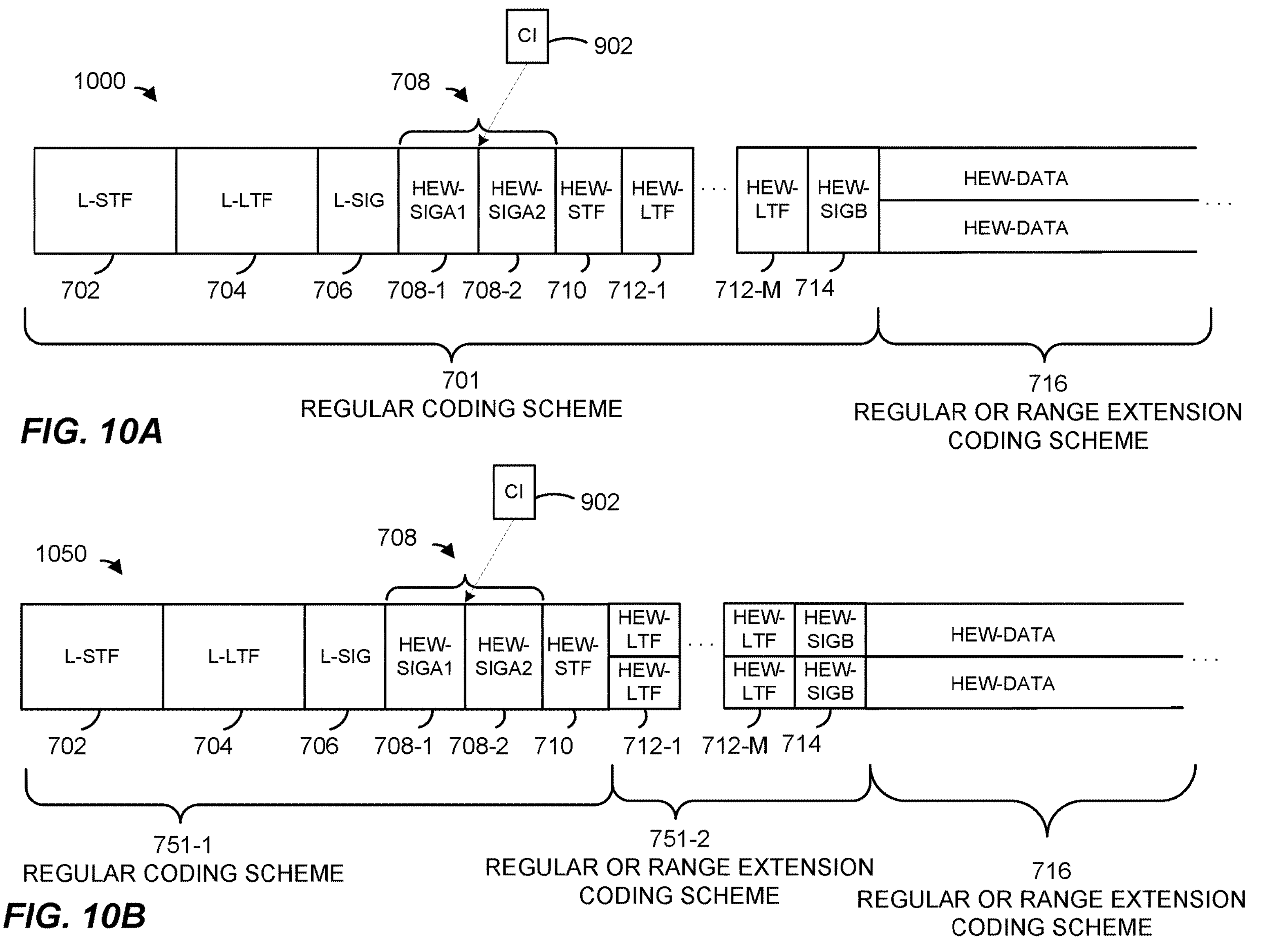
FIG. 10A is a diagram illustrating an example data unit in which tone spacing adjustment is used in combination with block coding, according to an embodiment.
FIG. 10B is a diagram illustrating an example data unit in which tone spacing adjustment is used in combination with block coding, according to another embodiment.

FIG. 10A is a diagram illustrating an example data unit 1000 in which OFDM tone spacing adjustment is used in combination with bit and/or symbol repetition for the range extension coding scheme, according to an embodiment. The data unit 1000 is generally the same as the data unit 900 of FIG. 7A, except that in the data unit 1000, when the CI indication 902 indicates that the range extension coding scheme is being utilized, the OFDM symbols of the data portion 716 are generated using OFDM modulation with reduced tone spacing compared to tone spacing used for regular mode OFDM symbols of the data unit 1000.

FIG. 10B is a diagram illustrating an example data unit 1050 in which OFDM tone spacing adjustment is used in combination with bit and/or symbol repetition for the range extension coding scheme, according to another embodiment. The data unit 1050 is generally the same as the data unit 950 of FIG. 9B, except that in the data unit 1050, when the CI indication 902 indicates that the range extension coding scheme is being utilized, the OFDM symbols of the second portion 751-2 and OFDM symbols of the data portion 716 are generated using OFDM modulation with reduced tone spacing compared to tone spacing used for regular mode OFDM symbols of the data unit 1050. In the embodiment shown in FIG. 10A, an overall bandwidth of 20 MHz is used with normal tone spacing and guard interval in the first portion 751-1 and tone spacing reduced by 2, long guard interval, and an FFT size of 64 repeated twice across the overall bandwidth. In some embodiments, a transmission power boost is applied to the first portion 751-1. In other embodiments, other multiples such as 4×, 8×, or other suitable values are used for one or more of reduced tone spacing, increased guard interval, increased symbol duration, or increased repetition across overall bandwidth.

Figures 11A, 11B:
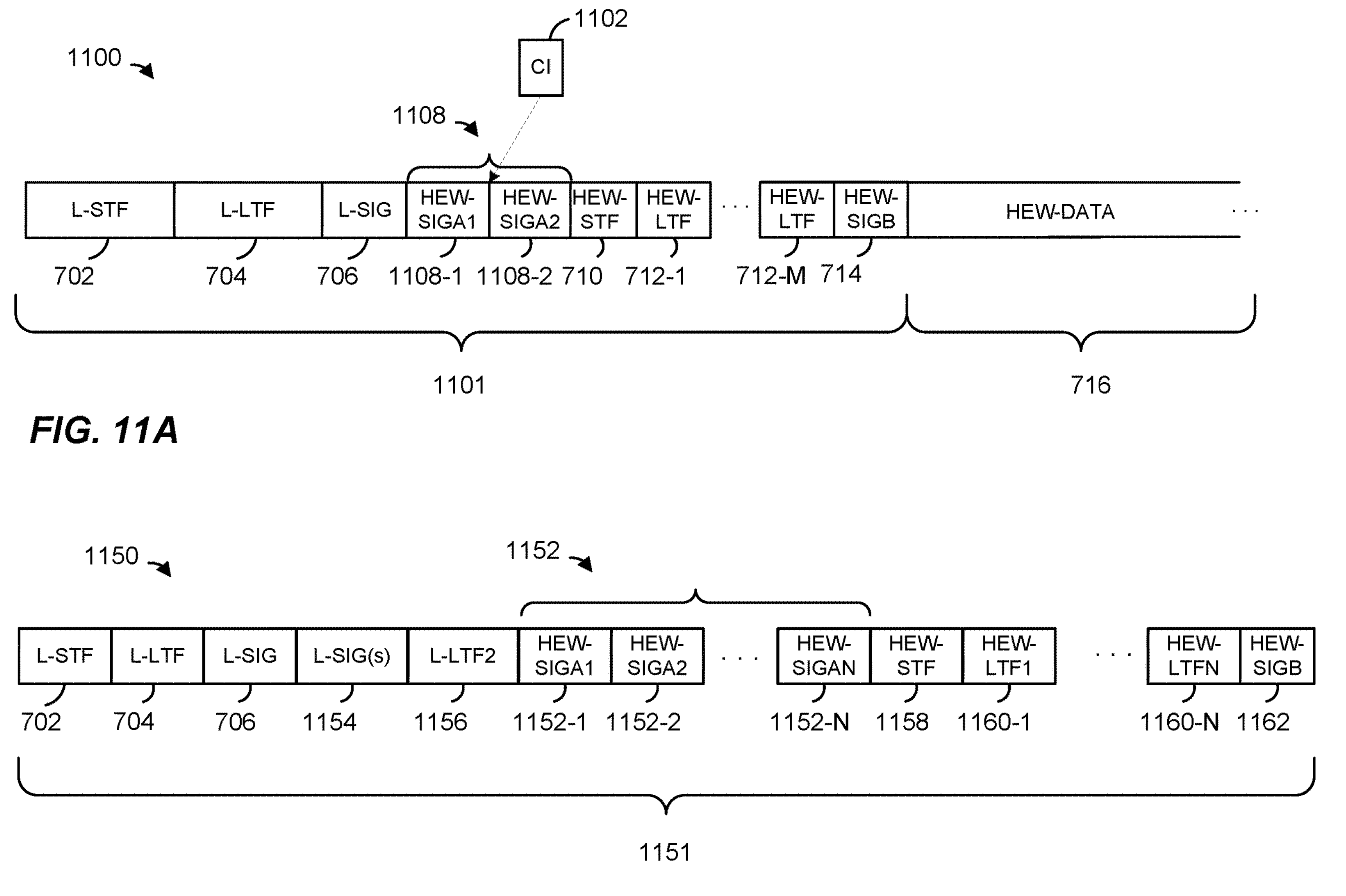
FIG. 11A is a diagram illustrating a regular mode data unit, according to an embodiment.
FIG. 11B is a diagram illustrating range extension mode data unit, according to an embodiment.

In some embodiments, a different preamble format is used for range extension mode data units compared to the preamble used for regular mode data units. In such embodiments, a device receiving a data unit can automatically detect whether the data unit is a regular mode data unit or a range extension mode data unit based on the format of the preamble of the data unit. FIG. 11A is a diagram illustrating a regular mode data unit 1100, according to an embodiment. The regular mode data unit 1100 includes a regular mode preamble 1101. The regular mode preamble 1101 is generally the same as the preamble 701 of the data unit 700 of FIG. 7A. In an embodiment, the preamble 1101 includes a HEW-SIGA field 1108, which includes a first HEW-SIGA1 field 1108-1 and a second first HEW-SIGA2 field 1108-1. In an embodiment, the HEW-SIGA field 1108 (e.g., the HEW-SIGA1 1108-1 or the HEW-SIGA2 1108-2) of the preamble 1101 includes a CI indication 1102. The CI indication 1102 is set to indicate whether the range extension coding scheme or the regular coding scheme is used for OFDM symbols of the data portion 716 of the data unit 1100, in an embodiment. In an embodiment, the CI indication 1102 comprises one bit, wherein a first value of the bit indicates the regular coding scheme and a second value of the bit indicates the range extension coding scheme. As will be explained in more detail below, a device receiving the data unit 1100 is able to detect, based on the format of the preamble 1101, that the preamble 1101 is a regular mode preamble, and not an extension mode preamble, in an embodiment. Upon detecting that the preamble 1101 is the regular mode preamble, the receiving device determines, based on the CI indication 1102, whether the range extension coding scheme or the regular coding scheme is used for OFDM symbols of the data portion 716, and decodes the data portion 716 accordingly, in an embodiment. In some embodiments, when the CI indication 1102 indicates that the range extension coding scheme is being utilized, the OFDM symbols of a portion of the preamble 1101 (e.g., the HEW-LTFs and HEW-SIGB, as and OFDM symbols of the data portion 716 are generated using OFDM modulation with smaller tone spacing compared to tone spacing used for regular mode OFDM symbols of the data unit 1050

FIG. 11B is a diagram illustrating a range extension mode data unit 1150, according to an embodiment. The range extension mode data unit 1150 includes a range extension mode preamble 1151. The data unit 1150 is generally similar to the data unit 1100 of FIG. 11A, except that the preamble 1151 of the data unit 1150 is formatted differently from the preamble 1101 of the data unit 1100. In an embodiment, the preamble 1151 is formatted such that a receiving device that operates according to the HEW communication protocol is able to determine that the preamble 1151 is a range extension mode preamble rather than a regular mode preamble. In an embodiment, the range extension mode preamble 1151 includes an L-STF 702, an L-LTF 704, and an L-SIG 706, and one or more first HEW signal fields (HEW-SIGAs) 1152. In an embodiment, the preamble 1150 further includes one or more secondary L-SIG(s) 1154 that follow the L-SIG field 706. The secondary L-SIG(s) 1154 are followed by a second L-LTF field (L-LTF2) 1156, in some embodiments. In other embodiments, the preamble 1151 omits the L-SIG(s) 1154 and/or the L-LTF2 1156. In some embodiments, the preamble 1151 also includes an HEW-STF 1158, one or more HEW-LTF fields 1160, and a second HEW signal field (HEW-SIGB) 1162. In other embodiments, the preamble 1151 omits the HEW-STF 1158, the HEW-LTF(s) 1160 and/or the HEW-SIGB 1162. In an embodiment, the data unit 1150 also includes a data portion 716 (not shown in FIG. 11B). In some embodiments, the HEW signal fields (HEW-SIGAs) 1152 are modulated using a same range extension coding scheme as the data field 716.

In an embodiment, one or more symbols of the HEW-SIGAs 1152 is modulated using QBPSK instead of BPSK, for example, to allow autodetection between the regular mode and the range extension mode by the receiving device that operates according to the HEW communication protocol. In an embodiment, for example, where the regular mode preamble includes two BPSK symbols and one Q-BPSK symbol after the L-SIG 706 field, the range extension mode preamble includes three BPSK symbols and one Q-BPSK symbol after the L-SIG 706 field. In an embodiment, for example, when using a 4× bit-wise repetition of MCS0 with 48 data tones in each 64-FFT (20 MHz). In some embodiments, for example, where autodetection differentiate the regular mode from the range extension mode, some bits are omitted from the HEW-SIGAs 1152, such as bits used to indicate signal bandwidth, MCS value, or other suitable bits.

In one embodiment in which the preamble 1151 includes one or more secondary L-SIG(s) 1154, the content of each of the L-SIG(s) 1154 is the same as the content of the L-SIG 706 of the data unit 1150. In an embodiment, a receiving device receiving the data unit 1150 determines that the preamble 1151 corresponds to a range extension mode preamble by detecting the repetition(s) of the L-SIG fields 706, 1154. Further, in an embodiment, both a rate subfield and a length subfield of the L-SIG 706, and, accordingly, the rate subfield(s) and the length subfield(s) of the secondary L-SIG(s) 1154 are set to fixed (e.g., predetermined) values. In this case, upon detecting the repetition(s) of the L-SIG fields 706, 1154, the receiving device uses the fixed values in the repeating L-SIG fields as additional training information to improve channel estimation, in an embodiment. In some embodiments, however, at least the length subfield of the L-SIG 706, and accordingly at least the length fields of the secondary L-SIG(s) 1154, is not set to a fixed value. For example, the length field is instead set to a value determined based on the actual length of the data unit 1150, in an embodiment. In one such embodiment, the receiving device first decodes the L-SIG 706, and then detects the repetition(s) of the L-SIG fields 706, 1154 using the value of the length subfield in L-SIG 706. In another embodiment, the receiving device first detects the repetition(s) of the L-SIG fields 706, 1154, and then combines the detected multiple L-SIG fields 706, 1154 to improve decoding reliability of the L-SIG fields 706, 1154 and/or uses the redundant information in the multiple L-SIG fields 706, 1154 to improve channel estimation.

In an embodiment in which the preamble 1151 includes L-LTF2 1156, the OFDM symbol(s) of the L-LTF2 1156 are generated using the range extension coding scheme. In another embodiment in which the preamble 1151 includes L-LTF2 11156, the OFDM symbol(s) of the L-LTF2 1156 are generated using the regular coding scheme. For example, if a double guard interval (DGI) used in the L-LTF 704 is sufficiently long for the communication channel in which the data unit 1150 travels from the transmitting device to the receiving device, then OFDM symbols of the L-LTF2 1156 are generated using the regular coding scheme or, alternatively, the preamble 1151 omits the L-LTF2 1156, in an embodiment.

Figures 12A, 12B:
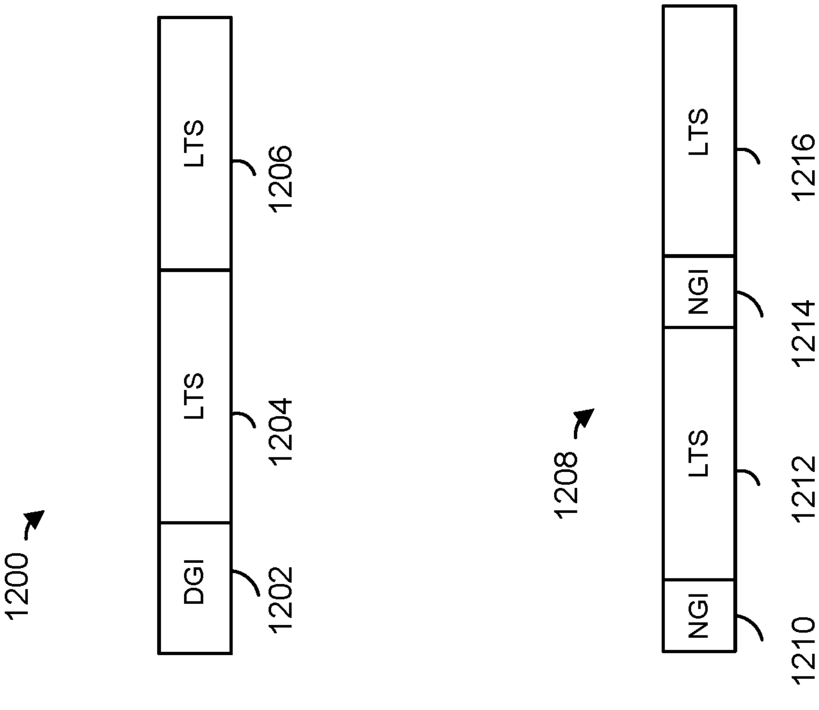
FIGS. 12A-12B are diagrams respectively illustrating two possible formats of a long training field, according to two example embodiments.

In another embodiment, the preamble 1151 omits the secondary L-SIG(s) 1154, but includes the L-LTF2 1156. In this embodiment, a receiving device detects that the preamble 1151 is the range extension mode preamble by detecting the presence of the L-LTF2 1156. FIGS. 12A-12B are diagrams illustrating two possible formats of LTFs suitable for use as the L-LTF2 1156 according to two example embodiments. Turning first to FIG. 12A, in a first example embodiment, an L-LTF2 1200 is formatted in the same manner as the L-LTF 704, i.e., as defined by a legacy communication protocol (e.g., the IEEE 802.11a/n/ac Standards). In particular, in the illustrated embodiment, the L-LTF2 1200 includes a double guard interval (DGI) 1202 followed by two repetitions of a long training sequence 1204, 1206. Turning now to FIG. 12B, in another example embodiment, an L-LTF2 1208 is formatted differently from the L-LTF 704. In particular, in the illustrated embodiment, the L-LTF2 1208 includes a first normal guard interval 1210, a first repetition of a long training sequence 1212, a second normal guard interval 1214, and a second repetition of the long training sequence 1216.

Referring back to FIG. 11B, in an embodiment, the HEW-SIGA(s) 1152 are generated using the range extension coding scheme. In an embodiment, the number of the HEW-SIGAs 1152 is the same as the number of the HEW-SIGA(s) 1108 of the regular mode preamble 1101. Similarly, in an embodiment, the content of the HEW-SIGAs 1152 is the same as the content of the HEW-SIGA(s) 1108 of the regular mode preamble 1101. In other embodiments, the number and/or the content of the HEW-SIGAs 1152 is different from the number and/or content of the HEW-SIGA(s) 1108 of the regular mode preamble 1101. A device receiving the data unit 1150 decodes the HEW-SIGA(s) 1152 using the range extension coding scheme based on detecting that the preamble 1151 corresponds to the range extension mode preamble and interprets the HEW-SIGA(s) 1152 appropriately as defined for the range extension mode, in an embodiment.

Figures 13A, 13B:
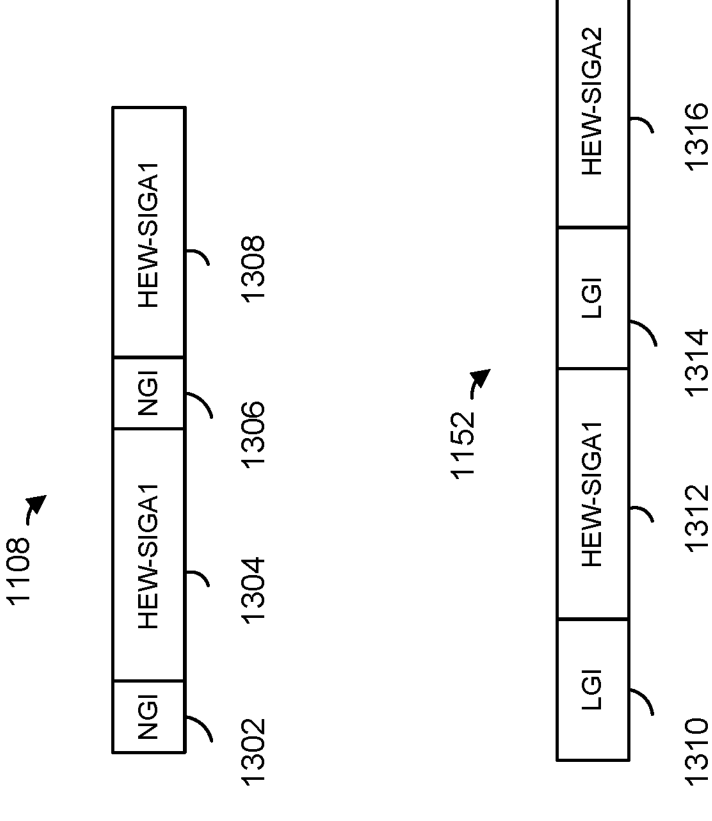
FIG. 13A is a diagram illustrating a non-legacy signal field of the regular mode data unit of FIG. 11A, according to an embodiment.
FIG. 13B is a diagram illustrating a non-legacy signal field of the range extension mode data unit of FIG. 11B, according to an embodiment.

In an embodiment in which the preamble 1151 omits the L-SIG(s) 1154 and/or L-LTF2 1156, a receiving device determines whether a preamble corresponds to the range extension mode preamble 1151 or to the normal mode preamble 1101 by detecting whether the HEW-SIGA field in the preamble is generated using the range extension coding scheme or the regular coding scheme based on auto-correlation of the HEW-SIGA field using the range extension coding scheme and the regular coding scheme. FIGS. 13A-13B are diagrams of the HEW-SIGA 1108 of the regular mode preamble 1101 and the HEW-SIGA 1152 of the range extension mode preamble 1151, respectively, according to an embodiment. In the illustrated embodiment, the HEW-SIGA 1108 of the regular mode preamble 1101 includes a first NGI 1302, a first HEW-SIGA field 1304, a second NGI 1306, and a second HEW-SIGA field 1308. On the other hand, the HEW-SIGA 1152 of the range extension mode preamble 1151 includes a first LGI 1310, a first HEW-SIGA field 1312, a second LGI 1314, and a second HEW-SIGA field 1312. In an embodiment, a receiving device performs a first auto-correlation of the HEW-SIGA field using a normal guard interval structure, such as the structure illustrated in FIG. 13A, performs a second auto-correlation using a long guard interval structure, such as the structure illustrated in FIG. 13B, and performs a comparison of the auto-correlation results. If auto-correlation of the HEW-SIGA field using the long guard interval produces a greater result compared to the result of the auto-correlation of the HEW-SIGA field using the normal guard interval, then the receiving device determines that the preamble corresponds to the range extension mode preamble 1151, in an embodiment. On the other hand, if auto-correlation of the HEW-SIGA field using the normal guard interval produces a greater result compared to the result of auto-correlation of the HEW-SIGA field with the long guard interval, then the receiving device determines that the preamble corresponds to the regular mode preamble 1101, in an embodiment.

Referring again to FIG. 11B, in an embodiment, the preamble 1151 is formatted such that a legacy client station can determine a duration of the data unit 1150 and/or that the data unit does not conform to a legacy communication protocol. Additionally, the preamble 1151 is formatted such that a client station that operates according to the HEW protocol is able to determine that the data unit conforms to the HEW communication protocol, in an embodiment. For example, at least two OFDM symbols immediately following the L-SIG 706 of the preamble 1151, such as the L-SIG(s) 1154 and/or the L-LTF2 1156 and/or the HEW-SIGA(s) 1152, are modulated using BPSK modulation. In this case, a legacy client station will treat the data unit 1150 as a legacy data unit, will determine a duration of the data unit based on the L-SIG 706, and will refrain from accessing the medium for the determined duration, in an embodiment. Further, one or more other OFDM symbols of the preamble 1151, such as one or more of the HEW-SIG(s) 1152 are modulated using Q-BPSK modulation, allowing a client station operating according to the HEW communication protocol to detect that the data unit 1150 conforms to the HEW communication protocol, in an embodiment.

In some embodiments, the HEW communication protocol allows beamforming and/or multi user MIMO (MU-MIMO) transmission in the range extension mode. In other embodiments, the HEW communication protocol allows only single stream and/or only single user transmission in the range extension mode. With continued reference to FIG. 11B, in an embodiment in which the preamble 1151 includes the HEW-STF 1158 and the HEW-LTF(s) 1160, the AP 14 applies beamforming and/or multi-user transmission beginning with the HEW-STF 1158. In other words, the fields of the preamble 1151 precede the HEW-STF 1158 are omni-directional and, in multi-user mode, are intended to be received by all intended recipients of the data unit 1150, while the HEW-STF field 1158, as well as the preamble fields that follow the HEW-STF field 1158 and the data portion that follows the preamble 1151, are beam-formed and/or include different portions intended to be received by different intended recipients of the data unit 1150, in an embodiment. In an embodiment, the HEW-SIGB field 1162 includes user-specific information for the intended recipients of the data unit 1150 in MU-MIMO mode. The HEW-SIGB field 1162 is generated using the regular coding scheme or the range extension coding scheme, depending on an embodiment. Similarly, the HEW-STF 1158 is generated using the regular coding scheme or the range extension coding scheme, depending on an embodiment. In an embodiment, the training sequence used on the HEW-STF 1158 is the sequence defined in a legacy communication protocol, such as in the IEEE 802.11ac protocol.

On the other hand, in an embodiment in which the preamble 1151 omits the HEW-STF 1158 and the HEW-LTF(s) 1160, beamforming and MU-MIMO are not allowed in the extension guard interval mode. In this embodiment, only single user single stream transmission is allowed in the extension guard interval mode. In an embodiment, a receiving device obtains a single stream channel estimate based on the L-LTF field 704, and demodulates the data portion of the data unit 1150 based on the channel estimate obtained based on the L-LTF field 704.

In some embodiments, a receiver device uses the HEW-STF field 1158 to re-start an automatic gain control (AGC) process for receiving the data portion 716. The HEW-STF has a same duration as the VHT-STF (i.e., 4 microseconds), in an embodiment. In other embodiments, the HEW-STF has a longer duration than the VHT-STF. In an embodiment, the HEW-STF has a same time-domain periodicity as the VHT-STF, such that in the frequency domain there are one non-zero tones every 4 tones and using a same tone spacing as IEEE 802.11ac. In other embodiments having a 1/N tone spacing, the HEW-STF has one non-zero tone in every 4*N tones. In embodiments where the overall bandwidth for the data unit is greater than 20 MHz, (e.g., 40 MHz, 80 MHz, etc.), the HEW-STF uses the same wider bandwidth VHT- STF as in IEEE 802.11ac (i.e., a duplication of the 20 MHz VHT-STF for overall bandwidth of 40 MHz, 80 MHz, 160 MHz, etc.).

Figures 14A, 14B, 14C:
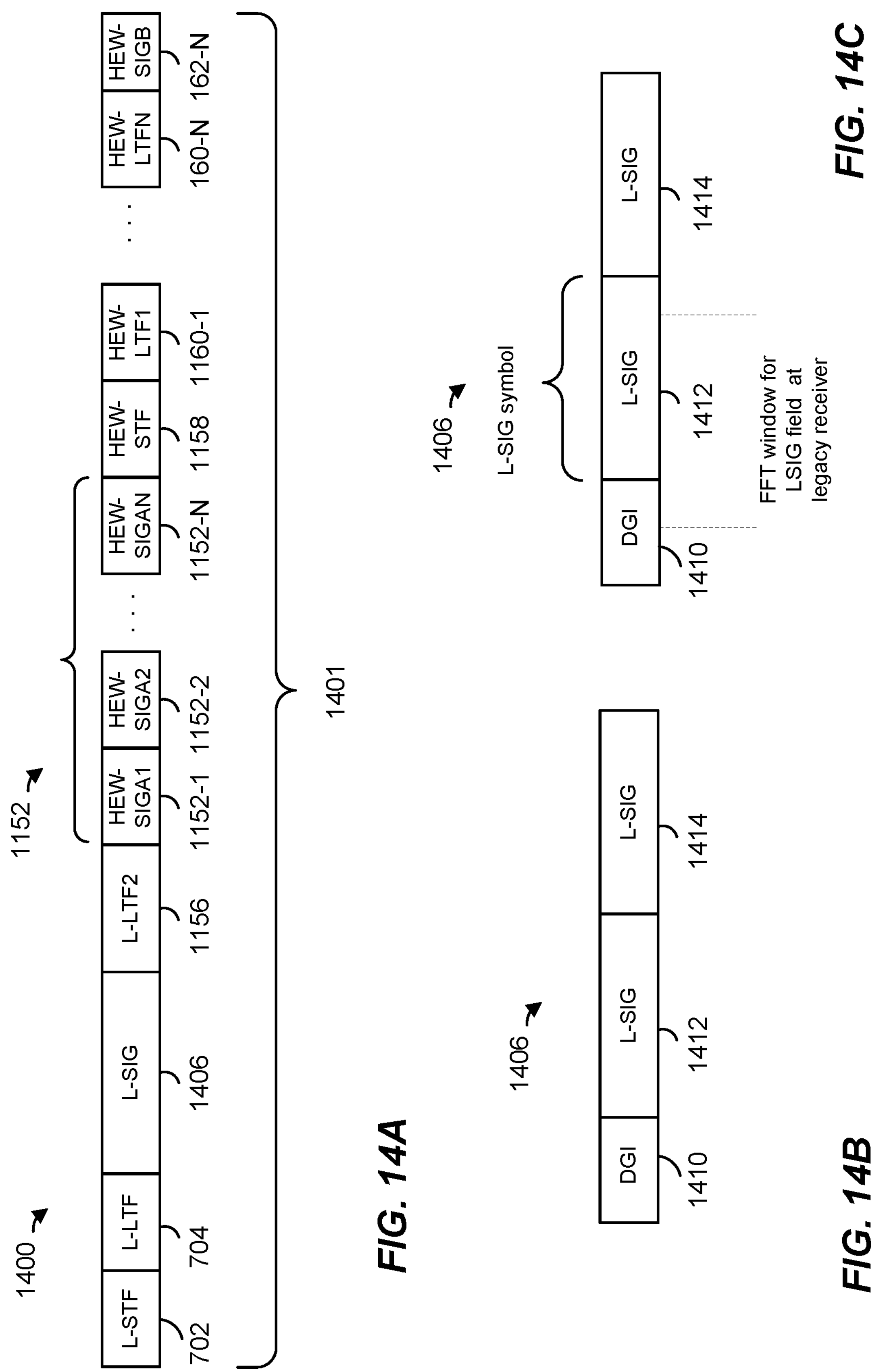
FIG. 14A is a block diagram illustrating a range extension mode data unit, according to an embodiment.
FIG. 14B is a diagram illustrating a legacy signal field of the range extension mode data unit of FIG. 14A, according to one embodiment.
FIG. 14C is a diagram illustrating a Fast Fourier Transform (FFT) window for the legacy signal field of FIG. 14B at the legacy receiving device, according to an embodiment.

FIG. 14A is a block diagram illustrating a range extension mode data unit 1400, according to an embodiment. The data unit 1400 includes a range extension mode preamble 1401. The range extension mode preamble 1401 is generally similar to the range extension mode preamble 1151 of FIG. 11B, except that the L-SIG 706 and the secondary L-SIG 1154 of the preamble 1151 are combined into a single L-SIG field 1406 in the preamble 1401. FIG. 14B is a diagram illustrating the L-SIG field 1406 according to one embodiment. In the embodiment of FIG. 14B, the L-SIG field 1406 includes a double guard interval 1410, a first L-SIG field 1412, which includes contents of L-SIG field 706 of the preamble 1151, and a second L-SIG field 1414, which includes contents of the secondary L-SIG2 field 1154 of the preamble 1151. In various embodiments, L-SIG field 1406 includes a length subfield set to a fixed value or set to a variable value, as discussed above with respect to the L-SIG fields 706, 1154 of FIG. 11B. In various embodiments, redundant (repeated) bits in L-SIG field 1406 are used for improved channel estimation as discussed above with respect to L-SIG fields 706, 1154 of FIG. 11B.

In an embodiment, a legacy client station receiving the data unit 1400 assumes that the L-SIG field 1406 includes a normal guard interval. As illustrated in FIG. 14C, the FFT window for L-SIG information bits assumed at the legacy client station is shifted compared to the actual L-SIG field 1412, in this embodiment. In an embodiment, to ensure that constellation points within the FFT window correspond to BPSK modulation, as expected by the legacy client station, and thus to allow the legacy client station to properly decode the L-SIG field 1412, modulation of the L-SIG field 1412 is phase-shifted relative to regular BPSK modulation. For example, in a 20 MHz OFDM symbol, if the normal guard interval is 0.8 μs, and the double guard interval is 1.6 μs, then modulation of an OFDM tone k of the L-SIG field 1412 is shifted with respect to the corresponding OFDM tone k of the original L-SIG as can be seen from:

$$S_{LSIG}^{(k)} = S_{SLSIG-LSIG}^{(k)} e^{-j \cdot 2\pi \cdot 0.8 \cdot 2.0/64} = S_{SLSIG-LSIG}^{(k)} \cdot (-j) \qquad \text{Equation 1}$$

Accordingly, in an embodiment, L-SIG field 1412 is modulated using reverse Q-BPSK rather than regular BPSK. Thus, for example, a bit of value 1 is modulated onto −j, and a bit of value 0 is modulated onto j, resulting in {j, −j} modulation rather than the regular {1, −1} BPSK modulation, in an embodiment. In an embodiment, due to the reverse Q-BPSK modulation of the L-SIG field 1412, a legacy client station can properly decode the L-SIG field 1412 an determine the duration of the data unit 1400 based on the L-SIG 1412 field, in an embodiment. A client station that operates according to the HEW protocol, on the other hand, can auto-detect that the preamble 1401 is a range extension mode preamble by detecting the repetition of the L-SIG field 1412 or by detecting the reverse Q-BPSK modulation of the L-SIG field within the FFT window of the legacy client station, in an embodiment. Alternatively, in other embodiments, a client station that operates according to the HEW protocol detects that the preamble 1401 is a range extension mode preamble using other detection methods discussed above, such as based on modulation or format of the HEW-SIGA field(s) 1152.

Referring FIGS. 11A-11B and 14A, long guard interval is used for initial OFDM symbols of both a regular mode preamble (e.g., the preamble 1101) and a range extension mode preamble (e.g., the preamble 1151 or the preamble 1401), in some embodiments. For example, referring to FIGS. 11A-11B, the L-STF field 702, the L-LTF field 704 and the L-SIG field 706, 1154, and HEW-SIGA field 1152 is each generated using the long guard interval, in an embodiment. Similarly, referring to FIG. 14A, the L-STF field 702, the L-LTF field 704, the L-SIG field 1406, and the HEW-SIGA(s) 1152 are generated using the long guard interval, in an embodiment. In an embodiment, a receiving device can determine whether a preamble corresponds to the regular mode preamble or the range extension mode preamble based on modulation of the HEW-SIGA field 1152 (e.g., Q-BPSK) or based on an indication included in the HEW-SIGA field 1152, in various embodiments. Further, similar to the preamble 1151 of FIG. 11B, the preamble 1401 of FIG. 14A includes or omits the second L-LTF2 field 1156, depending on the embodiment and/or scenario.

Figure 15:
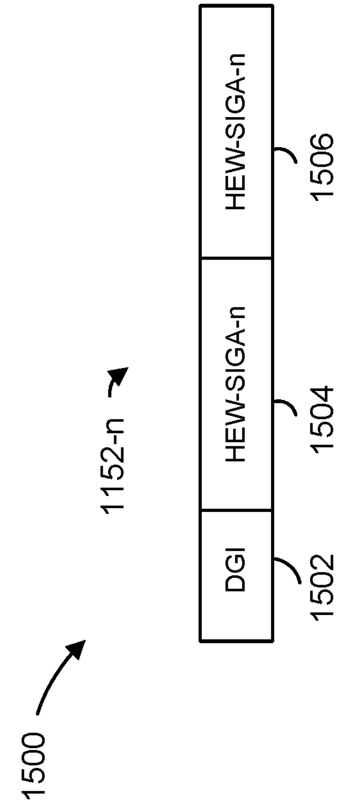
FIG. 15 is a block diagram illustrating format of a non-legacy signal field, according to an embodiment.

FIG. 15 is a block diagram illustrating a format of an HEW-SIGA field 1500, according to an embodiment. In some embodiments, the HEW-SIGA field(s) 1152 of the data unit 1150 or the data unit 1400 are formatted as the HEW-SIGA field 1500. In some embodiments, the HEW-SIGA field(s) 1108 are formatted as the HEW-SIGA field 1500. The HEW-SIGA field 1500 includes a double guard interval 1502, a first repetition of a HEW-SIGA field 1504 and a second repetition of a HEW-SIGA field 1506. In an example embodiment, the DGI is 1.8 μs and each repetition of HEW-SIGA is 3.2 μs. In an embodiment, the repeated bits in the HEW-SIGA field 1500 are used to increase reliability of decoding of the HEW-SIGA field 1500. In an embodiment, the format of the HEW-SIGA field 1500 is used to auto-detect a range extension mode preamble based on a comparison between auto-correlation of the HEW-SIGA field of the preamble using the format of the HEW-SIGA field 1500 and auto-correlation of the HEW-SIGA field of the preamble using the regular HEW-SIGA field format used in the regular mode, such as the format illustrated in FIG. 13A. In some embodiments, the HEW-SIGA field 1500 is modulated using less redundancy as compared to the data portion 716, because the additional time domain repetition of the HEW-SIGA field 1500 provides a sufficient improvement in decoding performance.

Figure 16:
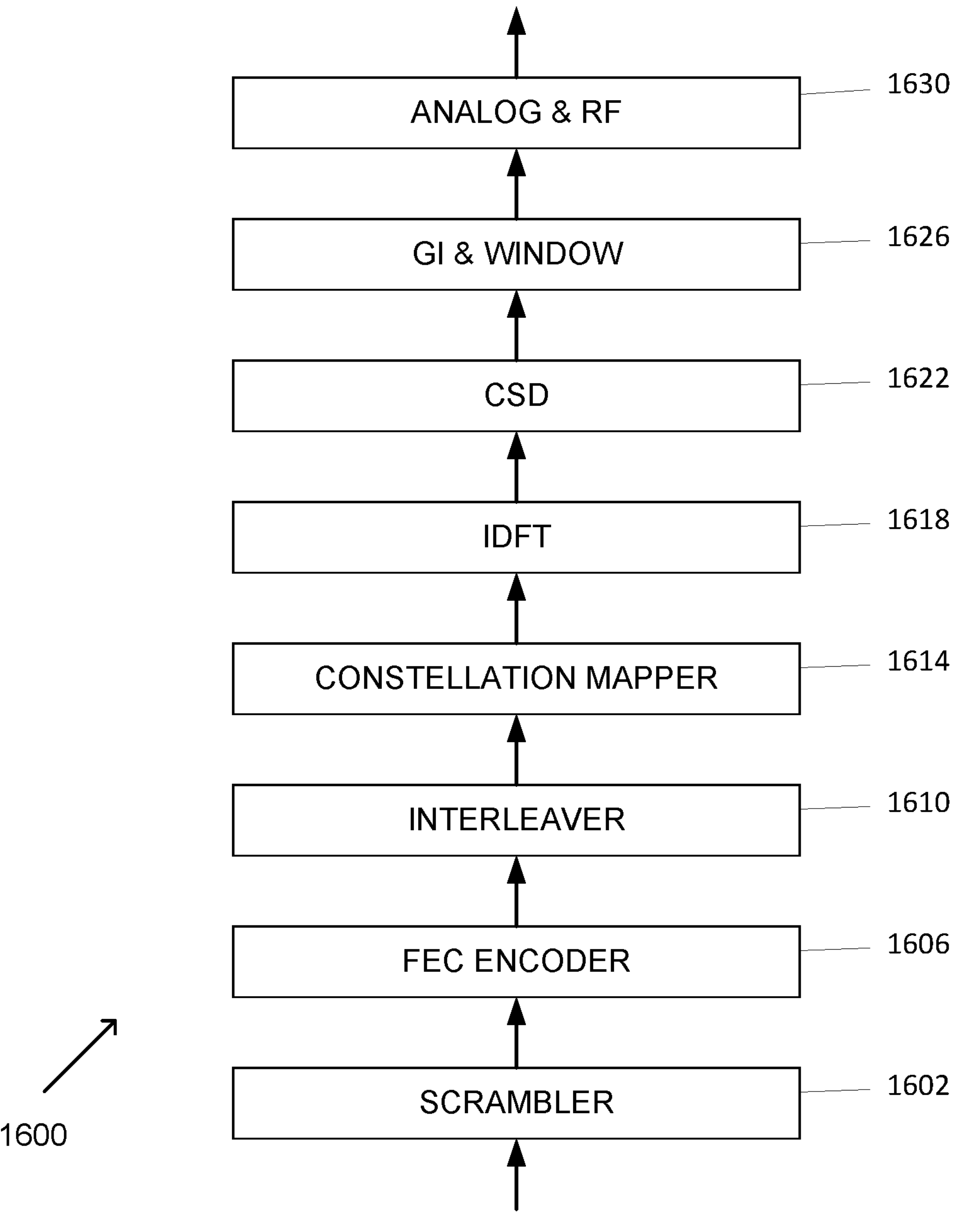
FIG. 16 is a block diagram illustrating an example PHY processing unit for generating regular mode data units using the regular coding scheme, according to an embodiment.

FIG. 16 is a block diagram illustrating an example PHY processing unit for generating regular mode data units using the regular coding scheme, according to an embodiment. Referring to FIG. 1, the AP 14 and the client station 25-1, in one embodiment, each include a PHY processing unit such as the PHY processing unit 1600. In various embodiments and/or scenarios, the PHY processing unit 1600 generates range extension data units such as one of the data units of FIG. 9A, 9B, 10A, or 10B, for example. The PHY processing unit 1600 includes a scrambler 1602 that generally scrambles an information bit stream to reduce the occurrence of long sequences of ones or zeros. An FEC encoder 1606 encodes scrambled information bits to generate encoded data bits. In one embodiment, the FEC encoder 1606 includes a binary convolutional code (BCC) encoder. In another embodiment, the FEC encoder 1606 includes a binary convolutional encoder followed by a puncturing block. In yet another embodiment, the FEC encoder 1606 includes a low density parity check (LDPC) encoder. An interleaver 1610 receives the encoded data bits and interleaves the bits (i.e., changes the order of the bits) to prevent long sequences of adjacent noisy bits from entering a decoder at the receiver. A constellation mapper 1614 maps the interleaved sequence of bits to constellation points corresponding to different subcarriers of an OFDM symbol. More specifically, for each spatial stream, the constellation mapper 1614 translates every bit sequence of length $\log_2(M)$ into one of M constellation points.

The output of the constellation mapper 1614 is operated on by an inverse discrete Fourier transform (IDFT) unit 1618 that converts a block of constellation points to a time-domain signal. In embodiments or situations in which the PHY processing unit 1600 operates to generate data units for transmission via multiple spatial streams, the cyclic shift diversity (CSD) unit 1622 inserts a cyclic shift into all but one of the spatial streams to prevent unintentional beamforming. The output of the CSD unit 1622 is provided to the guard interval (GI) insertion and windowing unit 1626 that prepends, to an OFDM symbol, a circular extension of the OFDM symbol and smooths the edges of each symbol to increase spectral decay. The output of the GI insertion and windowing unit 1626 is provided to the analog and radio frequency (RF) unit 1630 that converts the signal to analog signal and upconverts the signal to RF frequency for transmission.

In various embodiments, the range extension mode corresponds to a lowest data rate modulation and coding scheme (MCS) of the regular mode and introduces redundancy or repetition of bits into at least some fields of the data unit or repetition of symbols to further reduce the data rate. For example, the range extension mode introduces redundancy into the data portion and/or the non-legacy signal field of a range extension mode data unit or repetition of symbols according to one or more range extension coding schemes described below, in various embodiments and/or scenarios. As an example, according to an embodiment, regular mode data units are generated according a regular coding scheme. In various embodiments, the regular coding scheme is a modulation and coding scheme (MCS) selected from a set of MCSs, such as MCS0 (binary phase shift keying (BPSK) modulation and coding rate of 1/2) to MCS9 (quadrature amplitude modulation (QAM) and coding rate of 5/6), with higher order MCSs corresponding to higher data rates. Range extension mode data units, in one such embodiment, are generated using a range extension coding scheme, such as a modulation and coding as defined by MCS0 and with added bit repetition, block encoding, or symbol repetition that further reduce the data rate.

Figure 17A:
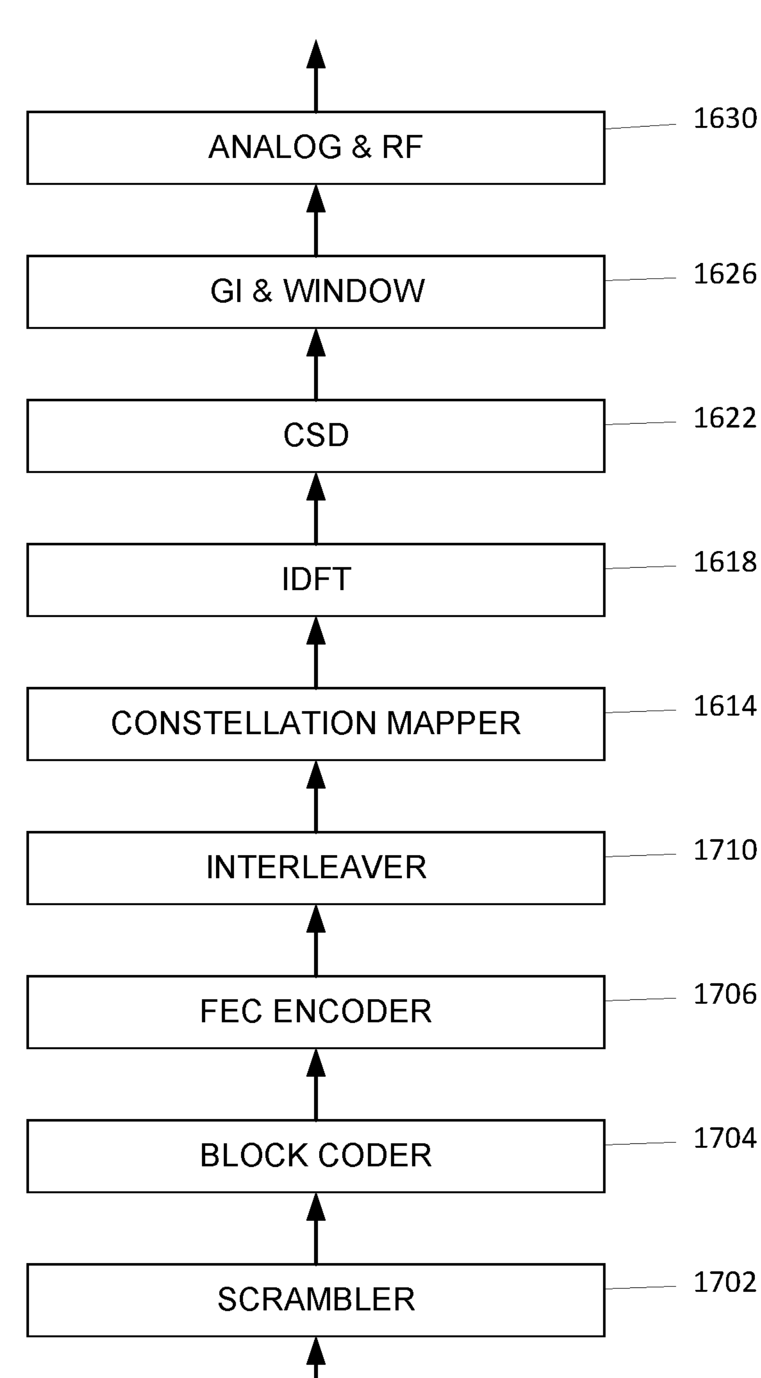
FIG. 17A is a block diagram of an example PHY processing unit for generating range extension mode data units using a range extension coding scheme, according to an embodiment.

FIG. 17A is a block diagram of an example PHY processing unit 1700 for generating range extension mode data units using a range extension coding scheme, according to an embodiment. In some embodiments, the PHY processing unit 1700 generates signal and/or data fields of range extension mode data units. Referring to FIG. 1, the AP 14 and the client station 25-1, in one embodiment, each include a PHY processing unit such as the PHY processing unit 1700.

The PHY processing unit 1700 is similar to the PHY processing unit 1600 of FIG. 16 except that the PHY processing unit 1700 includes a block coder 1704 coupled to a scrambler 1702. In an embodiment, the block coder 1704 reads incoming (scrambled) information bits one block at a time, generates a number of copies of each block (or each bit in a block), interleaves the resulting bits according to the range extension coding scheme and outputs the interleaved bits for further encoding by a FEC encoder 1706 (e.g., a binary convolutional encoder). Generally, each block contains the number of information bits that, after having been encoded by the block coder 1704 and by the FEC encoder 1706, fill the data tones of a single OFDM symbol, according to an embodiment. As an example, in one embodiment, the block coder 1704 generates two copies (2× repetition) of each block of 12 information bits to generate 24 bits to be included in an OFDM symbol. The 24 bits are then encoded by the FEC encoder 1706 at the coding rate of 1/2 to generate 48 bits that modulate 48 data tones of an OFDM symbol (e.g., using BPSK modulation). As another example, in another embodiment, the block coder 1704 generates four copies (4× repetition) of each block of 6 information bits to generate 24 bits which are then encoded by the FEC encoder 1706 at the coding rate of 1/2 to generate 48 bits that modulate 48 data tones of an OFDM symbol. As yet another example, in another embodiment, the block coder 1704 generates two copies (2× repetition) of each block of 13 information bits to generate 26 bits which are then encoded by the FEC encoder 1706 at the coding rate of 1/2 to generate 52 bits that modulate 52 data tones of an OFDM symbol. In other embodiments, the block coder 1704 and FEC encoder 1706 are configured to generate 104, 208, or any suitable number of bits for modulation of data tones of an OFDM symbol.

In some embodiments, the block coder 1704 applies a 4× repetition scheme when generating a data (or a signal) field as defined by MCS0 as specified in the IEEE 802.11n Standard for 20 MHz channel, i.e., with 52 data tones per OFDM symbol. In this case, according to an embodiment, the block coder 1704 generates four copies of each block of 6 information bits to generate 24 bits and then adds two padding bits (i.e., two bits of a predetermined values) to provide the specified number of bits (i.e., 26 bits for 52 data tones) to the BCC encoder which encoded the 26 bits using the coding rate of 1/2 to generate 52 coded bits for modulating the 52 data tones.

In one embodiment, the block coder 1704 utilizes a "block level" repetition scheme in which each block of n bits is repeated m consecutive times. As an example, if m is equal to 4 (4× repetitions), the block coder 1704 generates a sequence [C, C, C, C], where C is a block of n bits, according to an embodiment. In another embodiment, the block coder 1704 utilizes a "bit level" repetition scheme in which each incoming bit is repeated m consecutive times. In this case, in an embodiment, if m is equal to 4 (4× repetitions), the block coder 1704 generates the sequence [b1 b1 b1 b1 b2 b2 b2 b2 b3 b3 b3 b3 . . . ], where b1 is the first bit in the block of bits, b2 is the second bit, and so on. In yet another embodiment, the block coder 1704 generates m number of copies of the incoming bits and interleaves the resulting bit stream according to any suitable code. Alternatively, in still another embodiment, the block coder 1704 encodes incoming bits or incoming blocks of bits using any suitable code, e.g., a Hamming block code with the coding rate of a 1/2, 1/4, etc., or any other block code with the coding rate of 1/2, 1/4, etc. (e.g., (1,2) or (1, 4) block code, (12,24) block code or (6, 24) block code, a (13,26) block code, etc.).

According to an embodiment, the effective coding rate corresponding to a combination of the coding performed by the block coder 1704 and coding performed by the FEC encoder 1706 the product of the two coding rates. For example, in an embodiment in which the block coder 1704 utilizes 4× repetition (or coding rate of 1/4) and the FEC encoder 1706 utilizes a coding rate of 1/2, the resulting effective coding rate is equal to 1/8. As a result of the reduced coding rate compared to the coding rate used to generate a similar regular mode data unit, data rate in range extension mode is effectively reduced by a factor corresponding to the number the coding rate applied by the block coder 1704 (e.g., a factor of 2, a factor of 4, etc.), according to an embodiment.

According to some embodiments, the block coder 1704 utilizes the same block coding scheme for generating the signal field of a control mode data unit as the block coding scheme used for generating the data portion of the control mode data unit. For instance, in an embodiment, an OFDM symbol of the signal field and an OFDM symbol of the data portion each includes 48 data tones, and in this embodiment, the block coder 1704 applies a 2× repetition scheme to blocks of 12 bits for the signal field and the data portion, for example. In another embodiment, the data portion and the signal field of a control mode data unit are generated using different block coding schemes. For example, in an embodiment, the long range communication protocol specifies a different number of data tones per OFDM symbol in the signal field compared to the number of data tones per OFDM symbol in the data portion. Accordingly, in this embodiment, the block coder 1704 utilizes a different block size and, in some embodiments, a different coding scheme, when operating on the signal field compared to the block size and the coding scheme used for generating the data portion. For example, if the long range communication protocol specifies 52 data tones per OFDM symbol of the signal field and 48 data tones per OFDM tones of the data portion, the block coder 1704 applies a 2× repetition scheme to blocks of 13 bits of the signal field and a 2× repetition scheme to blocks of 12 bits of the data portion, according to one embodiment.

The FEC encoder 1706 encodes the block coded information bits, according to an embodiment. In an embodiment, BCC encoding is performed continuously over the entire field being generated (e.g., the entire data field, the entire signal field, etc.). Accordingly, in this embodiment, information bits corresponding to the field being generated are partitioned into blocks of a specified size (e.g., 6 bits, 12 bits, 13 bits, or any other suitable number of bits), each block is processed by the block coder 1704, and the resulting data stream is then provided to the FEC encoder 1706 which continuously encodes the incoming bits.

Similar to the interleaver 1610 of FIG. 16, in various embodiments, the interleaver 1710 changes the order of bits in order to provide diversity gain and reduce the chance that consecutive bits in a data stream will become corrupted in the transmission channel. In some embodiments, however, the block coder 1704 provides sufficient diversity gain and the interleaver 1710 is omitted. In some embodiments, the interleaver 1710 or the FEC encoder 1706 provides the bits to the constellation mapper 1614 for transmission, as described above.

In some embodiments, information bits in the data portion of a range extension mode data unit are be padded (i.e., a number of bits of a known value is added to the information bits) so that the data unit occupies an integer number of OFDM symbols, for example. Referring to FIG. 1, in some embodiments, padding is implemented in the MAC processing unit 18, 28 and/or the PHY processing unit 20, 29. In some such embodiments, the number of padding bits is determined according to padding equations provided in a short range communication protocol (e.g., the IEEE 802.11a Standard, the IEEE 802.11n Standard, the IEEE 802.11ac Standard, etc.). In general, these padding equations involve computing a number of padding bits based, in part, on a number of data bits per OFDM symbol ($N_{DBPS}$) and/or a number coded data bits per symbol ($N_{CBPS}$). In range extension mode, according to an embodiment, the number of padding bits is determined based on the number of information bits in an OFDM symbol (e.g., 6 bits, 12 bits, 13 bits, etc.) before the information bits are block encoded by the block coder 1704 and BCC encoded by the FEC encoder 1706. Accordingly, the number of padding bits in a range extension mode data unit is generally different from the number of padding bits in the corresponding regular mode data (or in the corresponding short range data unit). On the other hand, according to an embodiment, the number of coded bits per symbol is the same as the number of coded bits per symbol in regular mode data unit (or in the corresponding short range data unit), e.g., 24, 48, 52, etc. coded bits per OFDM.

Figure 17B:
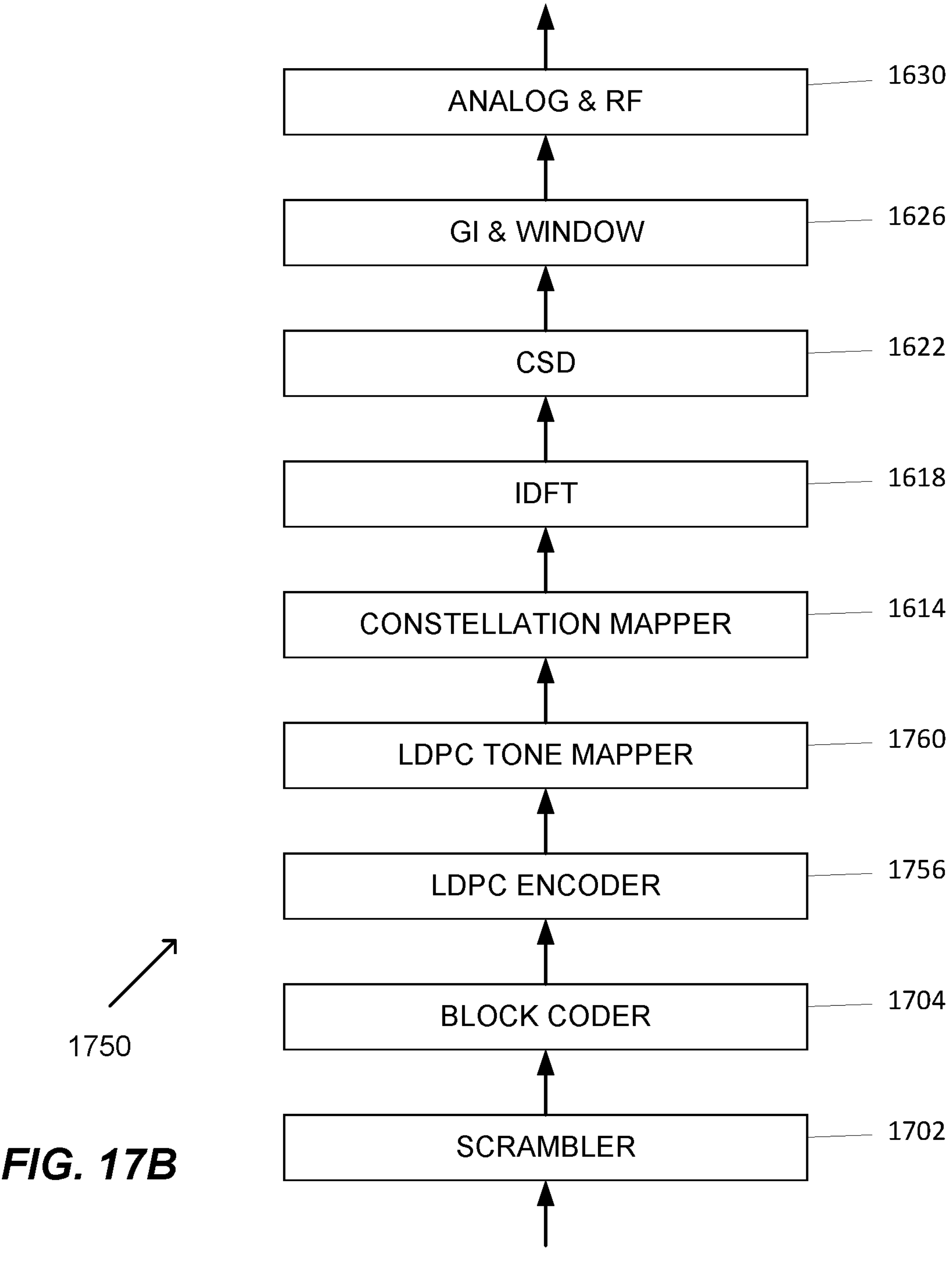
FIG. 17B is a block diagram of an example PHY processing unit for generating range extension mode data units, according to another embodiment.

FIG. 17B is a block diagram of an example PHY processing unit 1750 for generating range extension mode data units, according to another embodiment. In some embodiments, the PHY processing unit 1750 generates signal and/or data fields of range extension mode data units. Referring to FIG. 1, the AP 14 and the client station 25-1, in one embodiment, each include a PHY processing unit such as the PHY processing unit 1750.

The PHY processing unit 1750 is similar to the PHY processing unit 1700 of FIG. 17A, except that in the PHY processing unit 1750, the FEC encoder 1706 is replaced by the LDPC encoder 1756. Accordingly, in this embodiment, the output of the block coder 1704 is provided for further block encoding by the LDPC encoder 1756. In an embodiment, the LDPC encoder 1756 utilizes a block code corresponding to a coding rate of 1/2, or a block code corresponding to another suitable coding rate. In the illustrated embodiment, the PHY processing unit 1750 omits the interleaver 1710 because adjacent bits in an information stream are generally spread out by the LDPC code itself and no further interleaving is needed. Additionally, in an embodiment, further frequency diversity is provided by the LDPC tone remapping unit 1760. According to an embodiment, the LDPC tone remapping unit 1760 reorders coded information bits or blocks of coded information bits according to a tone remapping function. The tone remapping function is generally defined such that consecutive coded information bits or blocks of information bits are mapped onto nonconsecutive tones in the OFDM symbol to facilitate data recovery at the receiver in cases in which consecutive OFDM tones are adversely affected during transmission. In some embodiments, the LDPC tone remapping unit 1760 is omitted. Referring again to FIG. 17A, in various embodiments, a number of tail bits are typically added to each field of a data unit for proper operation of the FEC encoder 1706, e.g., to ensure that the BCC encoder, after having encoded each field, is brought back to zero state. In one embodiment, for example, six tail bits are inserted at the end of the data portion before the data portion is provided to the FEC encoder 1706 (e.g., after the bits are processed by the block coder 1704).

In some embodiments, the signal field of a range extension mode data unit has a different format compared to the signal field format of a regular mode data unit. In some such embodiment, the signal field of range extension mode data units is shorter compared to a signal field of a regular mode data unit. For example, only one modulation and coding scheme is used in range extension mode, according to an embodiment, and therefore less information (or no information) regarding modulation and coding needs to be communicated in the range extension mode signal field. Similarly, in an embodiment, maximum length of a range extension mode data unit is shorter compared to a maximum length of a regular mode data unit and, in this case, less bits are needed for the length subfield of the range extension mode signal field. As an example, in one embodiment, a range extension mode signal field is formatted according to the IEEE 802.11n Standard but omits certain subfields (e.g., the low density parity check (LDPC) subfield, the space time block coding (STBC) subfield, etc.). Additionally or alternatively, in some embodiments, a range extension mode signal field includes a shorter CRC subfield compared to the cyclic redundancy check (CRC) subfield of a regular mode signal field (e.g., less than 8 bits). In general, in range extension mode, certain signal field subfields are omitted or modified and/or certain new information is added, according to some embodiments.

Figure 18A:
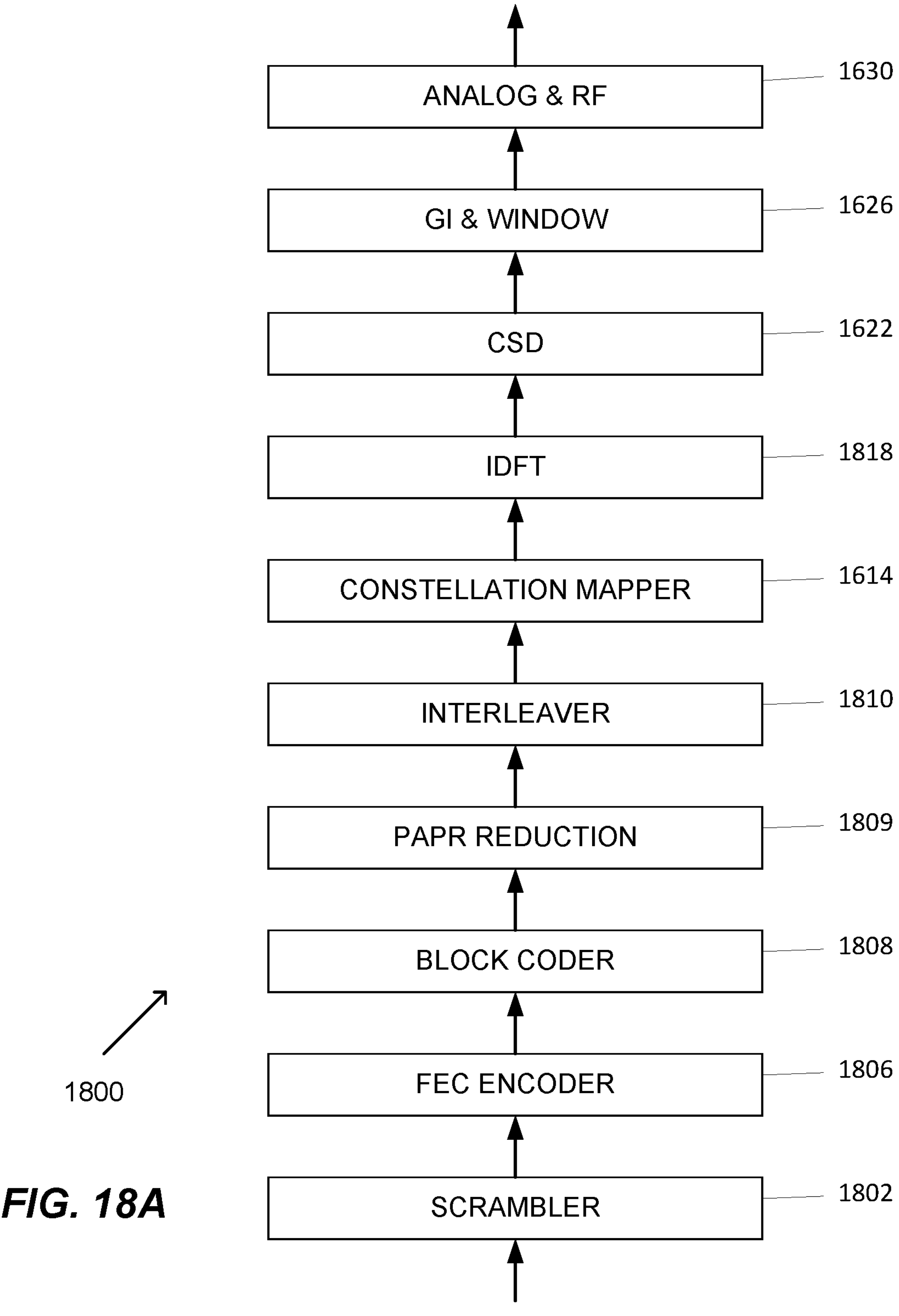
FIG. 18A is a block diagram of an example PHY processing unit for generating range extension mode data units using a range extension coding scheme, according to another embodiment.

FIG. 18A is a block diagram of an example PHY processing unit 1800 for generating range extension mode data units using a range extension coding scheme, according to another embodiment. In some embodiments, the PHY processing unit 1800 generates signal and/or data fields of range extension mode data units. Referring to FIG. 1, the AP 14 and the client station 25-1, in one embodiment, each include a PHY processing unit such as the PHY processing unit 1800.

The PHY processing unit 1800 is similar to the PHY processing unit 1700 of FIG. 17A, except that in the PHY processing unit 1800 a block coder 1808 is located after an FEC encoder 1806. Accordingly, in this embodiment, information bits are first scrambled by scrambler 1802, encoded by the FEC encoder 1806 and the FEC coded bits are then replicated or otherwise block encoded by the block coder 1808. As in the example embodiment of the PHY processing unit 1700, in an embodiment, processing by the FEC encoder 1806 is performed continuously over the entire field being generated (e.g., the entire data portion, the entire signal field, etc.). Accordingly, in this embodiment, information bits corresponding to the field being generated are first encoded by the FEC encoder 1806 and the BCC coded bits are then partitioned into blocks of a specified size (e.g., 6 bits, 12 bits, 13 bits, or any other suitable number of bits). Each block is then processed by the block coder 1808. As an example, in one embodiment, the FEC encoder 1806 encodes 12 information bits per OFDM symbol using the coding rate of 1/2 to generate 24 BCC coded bits and provides the BCC coded bits to the block coder 1808. In an embodiment, the block coder 1808 generates two copies of each incoming block and interleaves the generated bits according to a range extension coding scheme coding scheme to generate 48 bits to be included in an OFDM symbol. In one such embodiment, the 48 bits correspond to 48 data tones generated using a Fast Fourier Transform (FFT) of size 64 at the IDFT processing unit 1818. As another example, in another embodiment, the FEC encoder 1806 encodes 6 information bits per OFDM symbol using the coding rate of 1/2 to generate 12 BCC coded bits and provides the BCC coded bits to the block coder 1808. In an embodiment, the block coder 1808 generates two copies of each incoming block and interleaves the generated bits according to a range extension coding scheme to generate 24 bits to be included in an OFDM symbol. In one such embodiment, the 24 bits correspond to 24 data tones generated using an FFT of size 32 at the IDFT processing unit 1818.

Similar to the block coder 1704 of FIG. 17A, the range extension coding scheme used by the block coder 1808 to generate the signal field of a range extension mode data unit, depending on an embodiment, is the same as or different from the range extension coding scheme used by the block coder 1808 to generate the data portion of the range extension mode data unit. In various embodiments, the block coder 1808 implements a "block level" repetition scheme or a "bit level" repetition scheme as discussed above in regard to the block coder 1704 of FIG. 17A. Similarly, in another embodiment, the block coder 1808 generates m number of copies of the incoming bits and interleaves the resulting bit stream according to a suitable code, or otherwise encodes incoming bits or incoming blocks of bits using any suitable code, e.g., a Hamming block code with the coding rate of a 1/2, 1/4, etc., or any other block code with the coding rate of 1/2, 1/4, etc. (e.g., (1,2) or (1, 4) block code, (12,24) block code or (6, 24) block code, a (13,26) block code, etc.). The effective coding rate for data units generated by the PHY processing unit 1800 is a product of the coding rate used by the FEC encoder 1806 and the number of repetitions (or the coding rate) used by the block coder 1808, according to an embodiment.

In an embodiment, the block coder 1808 provides sufficient diversity gain such that no further interleaving of coded bits is needed, and the interleaver 1810 is omitted. One advantage of omitting the interleaver 1810 is that in this case OFDM symbols with 52 data tones can be generated using 4× or a 6× repetition schemes even though in some such situations the number of data bits per symbol is not an integer. For example, in one such embodiment, the output of the FEC encoder 1806 is partitioned into blocks of 13 bits and each block is repeated four times (or block encoded with a rate of 1/4) to generate 52 bits to be included in an OFDM symbol. In this case, if the FEC encoder 1806 utilizes a coding rate of 1/2, the number of data bits per symbol is equal 6.5. In an example embodiment utilizing 6× repetition, the FEC encoder 1806 encodes information bits using a coding rate of 1/2 and the output is partitioned into blocks of four bits. The block coder 1808 repeats each four bit block six times (or block encodes each block using a coding rate of 1/6) and adds four padding bits to generate 52 bits to be included in an OFDM symbol.

As in the example of the PHY processing unit 1700 of FIG. 17A discussed above, if padding is used by the PHY processing unit 1800, the number of data bits per symbol (NDBPS) used for padding bit computations is the actual number of non-redundant data bits in an OFDM symbol (e.g., 6 bits, 12 bits, 13 bits as in the example above, or any other suitable number of bits). The number of coded bits per symbol (NCBPS) used in padding bit computations is equal to the number of bits actually included in an OFDM symbol (e.g., 24 bits, 48 bits, 52 bits, or any other suitable number of bits included in an OFDM symbol).

Also as in the example of the PHY processing unit 1700 of FIG. 17, a number of tail bits are typically inserted into each field of a data unit for proper operation of the FEC encoder 1806, e.g., to ensure that the BCC encoder, after having encoded each field, is brought back to zero state. In one embodiment, for example, six tail bits are inserted at the end of the data portion before the data portion is provided to the FEC encoder 1806 (i.e., after processing by the block coder 1704 is performed). Similarly, in the case of a signal field, tail bits are inserted at the end of the signal field before the signal field is provided to the FEC encoder 1806, according to an embodiment. In an example embodiment in which the block coder 1808 utilizes a 4× repetition scheme (or another block code with the coding rate of 1/4), the FEC encoder 1806 utilizes the coding rate of 1/2, and the signal field includes 24 information bits (including tail bits), the 24 signal field bits are BCC encoded to generate 48 BCC encoded bits which are then partitioned into four blocks of 12 bits each for further encoding by the block coder 1808. Accordingly, in this embodiment, the signal field is transmitted over four OFDM symbols each of which includes 6 information bits of the signal field.

Further, in some embodiments, the PHY processing unit 1800 generates OFDM symbols with 52 data tones according to the MCS0 specified in the IEEE 802.11n Standard or the IEEE 802.11ac Standard and the block coder 1808 utilizes a 4× repetition scheme. In some such embodiments, extra padding is used to ensure that the resulting encoded data stream to be included in an OFDM symbol includes 52 bits. In one such embodiment, padding bits are added to coded information the bits after the bits have been processed by the block coder 1808.

In the embodiment of FIG. 18A, the PHY processing unit 1800 also includes a peak to average power ratio (PAPR) reduction unit 1809. In an embodiment, the PAPR reduction unit 1809 flips the bits in some or all repeated blocks to reduce or eliminate the occurrence of the same bit sequences at different frequency locations in an OFDM symbol thereby reducing the peak to average power ratio of the output signal. In general, bit flipping involves changing the bit value of zero to the bit value of one and changing the bit vale of one to the bit value of zero. According to an embodiment, the PAPR reduction unit 1809 implements bit flipping using an XOR operation. For example, in an embodiment utilizing 4× repetition of a block of coded bits, if a block of coded bits to be included in an OFDM symbols is denoted as C and if C'=C XOR 1 (i.e., block C with bits flipped), then some possible bit sequences at the output of the PAPR reduction unit 1809, according to some embodiments, are [C C' C' C'], [C' C' C' C], [C C' C C'], [C C C C'], etc. In general, any combination of block with bits flipped and blocks with bits not flipped can be used. In some embodiments, the PAPR unit 1809 is omitted.

Figure 18B:
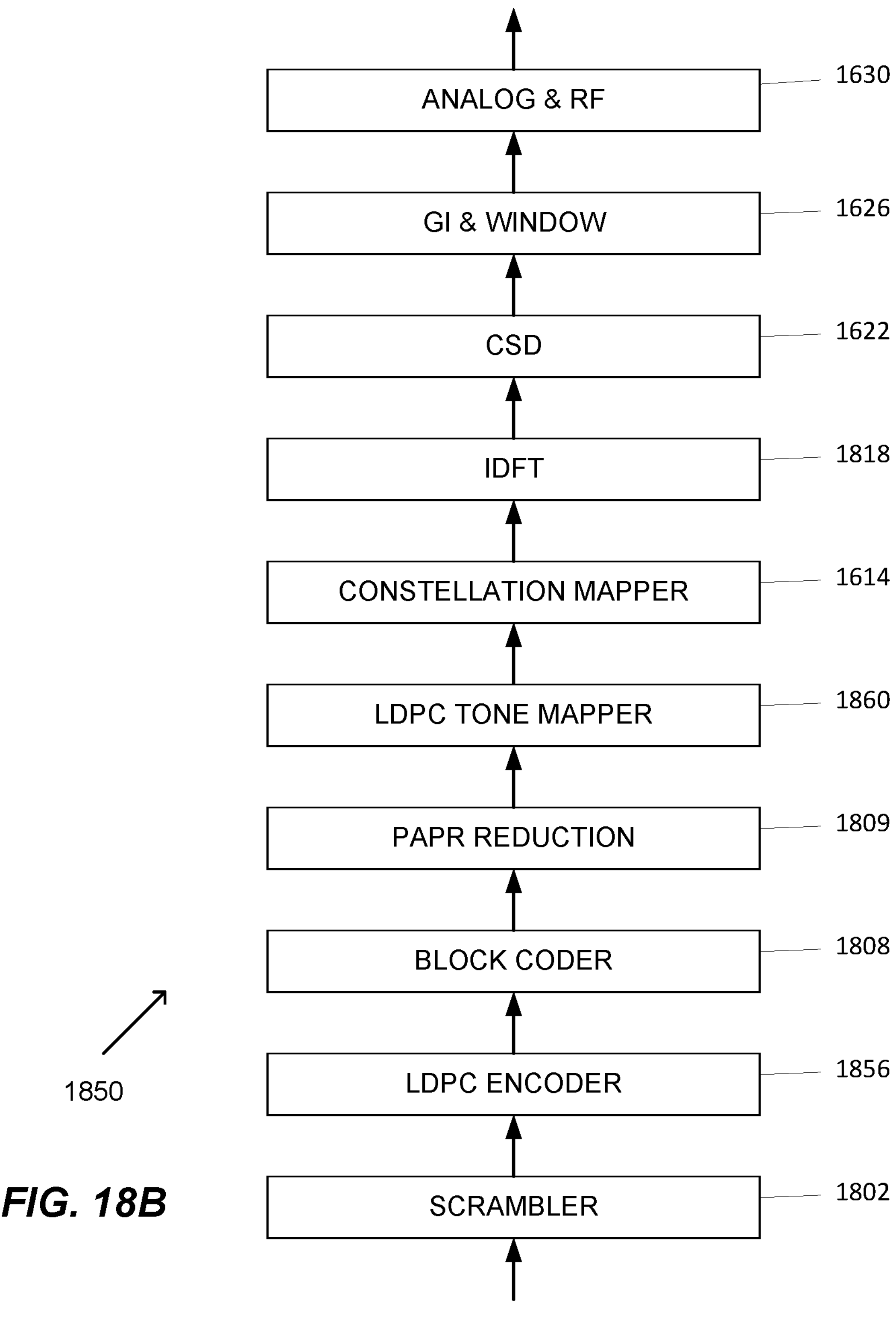
FIG. 18B is a block diagram of an example PHY processing unit for generating range extension mode data units, according to another embodiment.

FIG. 18B is a block diagram of an example PHY processing unit 1850 for generating range extension mode data units, according to another embodiment. In some embodiments, the PHY processing unit 1850 generates signal and/or data fields of range extension mode data units. Referring to FIG. 1, the AP 14 and the client station 25-1, in one embodiment, each include a PHY processing unit such as the PHY processing unit 1850.

The PHY processing unit 1850 is similar to the PHY processing unit 1800 of FIG. 18, except that in the PHY processing unit 1850, the FEC encoder 1806 is replaced by the LDPC encoder 1856. Accordingly, in this embodiment, information bits are first encoded by the LDPC encoder 1856 and the LDPC coded bits are then replicated or otherwise block encoded by the block coder 1808. In an embodiment, the LDPC encoder 1856 utilizes a block code corresponding to a coding rate of 1/2, or a block code corresponding to another suitable coding rate. In the illustrated embodiment, the PHY processing unit 1850 omits the interleaver 1810 because adjacent bits in an information stream are generally spread out by the LDPC code itself and, according to an embodiment, no further interleaving is needed. Additionally, in an embodiment, further frequency diversity is provided by the LDPC tone remapping unit 1860. According to an embodiment, the LDPC tone remapping unit 1860 reorders coded information bits or blocks of coded information bits according to a tone remapping function. The tone remapping function is generally defined such that consecutive coded information bits or blocks of information bits are mapped onto nonconsecutive tones in the OFDM symbol to facilitate data recovery at the receiver in cases in which consecutive OFDM tones are adversely affected during transmission. In some embodiments, the LDPC tone remapping unit 1860 is omitted.

Figure 19A:
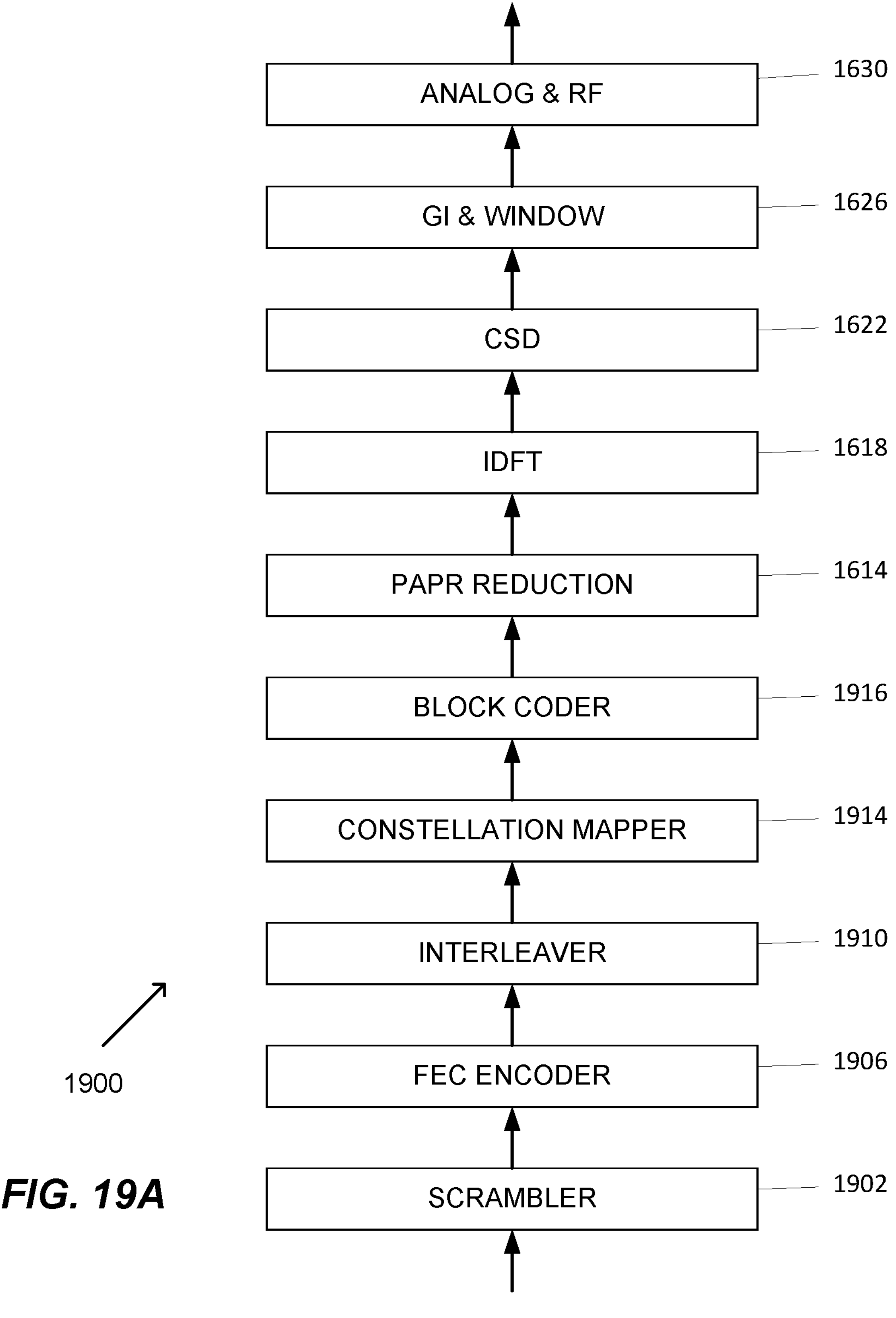
FIG. 19A is a block diagram of an example PHY processing unit for generating range extension mode data units, according to another embodiment.

FIG. 19A is a block diagram of an example PHY processing unit 1900 for generating range extension mode data units, according to another embodiment. In some embodiments, the PHY processing unit 1900 generates signal and/or data fields of range extension mode data units. Referring to FIG. 1, the AP 14 and the client station 25-1, in one embodiment, each include a PHY processing unit such as the PHY processing unit 1900.

The PHY processing unit 1900 is similar to the PHY processing unit 1800 of FIG. 18A except that in the PHY processing unit 1900 the block coder 1916 is located after the constellation mapper 1914. Accordingly, in this embodiment, BCC encoded information bits, after having been processed by the interleaver 1910, are mapped to constellation symbols and the constellation symbols are then replicated or otherwise block encoded by the block coder 1916. According to an embodiment, processing by the FEC encoder 1906 is performed continuously over the entire field being generated (e.g., the entire data field, the entire signal field, etc.). In this embodiment, information bits corresponding to the field being generated are first encoded by the FEC encoder 1806 and the BCC coded bits are then mapped to constellation symbols by the constellation mapper 1914. The constellation symbols are then partitioned into blocks of a specified size (e.g., 6 symbols, 12 symbols, 13 symbols, or any other suitable number of symbols) and each block is then processed by the block coder 1916. As an example, in an embodiment utilizing 2× repetition, the constellation mapper 1914 generates 24 constellation symbols and the block coder 1916 generates two copies of the 24 symbols to generate 48 symbols corresponding to 48 data tones of an OFDM symbol (e.g., as specified in the IEEE 802.11a Standard). As another example, in an embodiment utilizing 4× repetition, the constellation mapper 1914 generates 12 constellation symbols and the block coder 1916 generates four copies of the 12 constellation symbols to generate 48 symbols corresponding to 48 data tones of an OFDM symbol (e.g., as specified in the IEEE 802.11a Standard). As yet another example, in an embodiment utilizing 2× repetition, the constellation mapper 1914 generates 26 constellation symbols and the block coder 1916 repeats the 26 symbols (i.e., generates two copies of the 26 symbols) to generate 52 symbols corresponding to 52 data tones of an OFDM symbol (e.g., as specified in the IEEE 802.11n Standard or the IEEE 802.11ac Standard). In general, in various embodiments and/or scenarios, the block coder 1916 generates any suitable number of copies of blocks of incoming constellation symbols and interleaves the generated symbols according to any suitable coding scheme. Similar to the block coder 1704 of FIG. 17A and the block coder 1808 of FIG. 18A, the range extension coding scheme used by the block coder 1916 to generate a signal field (or signal fields) of a range extension mode data unit is, depending on the embodiment, the same as or different from the range extension coding scheme used by the block coder 1916 to generate the data portion of the range extension mode data unit. The effective coding rate for data units generated by the PHY processing unit 1900 is a product of the coding rate used by the FEC encoder 1906 and the number of repetitions (or the coding rate) used by the block coder 1916, according to an embodiment.

According to an embodiment, because redundancy in this case is introduced after the information bits have been mapped to constellation symbols, each OFDM symbol generated by the PHY processing unit 1900 includes less non-redundant data tones compared to OFDM data tones included in a regular mode data units. Accordingly, the interleaver 1910 is designed to operate on fewer tones per OFDM symbol compared to the interleaver used in the regular mode (such as the interleaver 1610 of FIG. 16), or the interleaver used in generating the corresponding short range data unit. For example, in an embodiment with 12 non-redundant data tones per OFDM symbol, the interleaver 1910 is designed using the number of columns ($N_{col}$) of 6 and the number of rows ($N_{row}$) of 2*the number of bits per subcarrier ($N_{bpscs}$). In another example embodiment with 12 non-redundant data tones per OFDM symbol, the interleaver 1910 is designed using $N_{col}$ of 4 and $N_{row}$ of 3*$N_{bpscs}$. In other embodiments, other interleaver parameters different from interleaver parameter used in the regular mode are utilized for the interleaver 1910. Alternatively, in an embodiment, the block coder 1916 provides sufficient diversity gain such that no further interleaving of coded bits is needed, and the interleaver 1910 is omitted. In this case, as in the example embodiment utilizing the PHY processing unit 1800 of FIG. 18A, OFDM symbols with 52 data tones can be generated using 4× or a 6× repetition schemes even though in some such situations the number of data bits per symbol is not an integer.

As in the example embodiment of the PHY processing unit 1700 of FIG. 17A or the PHY processing unit 1800 of FIG. 18A discussed above, if padding is used by the PHY processing unit 1900, the number of data bits per symbol (NDBPS) used for padding bit computations is the actual number of non-redundant data bits in an OFDM symbol. (e.g., 6 bits, 12 bits, 13 bits as in the example above, or any other suitable number of bits). The number of coded bits per symbol (NCBPS) used in padding bit computations is equal to the number of non-redundant bits included in an OFDM symbol which, in this case, corresponds to number of bits in the block of constellation symbols processed by the block coder 1916 (e.g., 12 bits, 24 bits, 26 bits, etc.).

In some embodiments, the PHY processing unit 1900 generates OFDM symbols with 52 data tones according to the MCS0 specified in the IEEE 802.11n Standard or the IEEE 802.11ac Standard and the block coder 1916 utilizes a 4× repetition scheme. In some such embodiments, extra padding is used to ensure that the resulting encoded data stream to be included in an OFDM symbol includes 52 bits. In one such embodiment, padding bits are added to coded information the bits after the bits have been processed by the block coder 1808.

In the embodiment of FIG. 19, the PHY processing unit 1900 includes a peak to average power ratio (PAPR) reduction unit 1917. In an embodiment, the peak to average power ratio unit 1917 adds a phase shift to some of the data tones modulated with repeated constellations. For example, in one embodiment the added phase shift is 180 degrees. The 180 degree phase shift corresponds to a sign flip of the bits that modulate the data tones for which phase shifts are implemented. In another embodiment, the PAPR reduction unit 1917 adds a phase shift that is different than 180 degrees (e.g., a 90 degree phase shift or any other suitable phase shift). As an example, in an embodiment utilizing 4× repetition, if a block of 12 constellation symbols to be included in an OFDM symbols is denoted as C and if simple block repetition is performed, the resulting sequence is [C C C C]. In some embodiments, the PAPR reduction unit 1917 introduces a sign flip (i.e., –C) or a 90 degree phase shift (i.e., j*C) for some of the repeated blocks. In some such embodiments, the resulting sequence is, for example, [C –C –C –C], [–C –C –C –C], [C –C C –C], [C C C –C], [C j*C, j*C, j*C], or any other combination of C, –C, j*C, and –j*C. In general, any suitable phase shift can be introduced in any repeated block in various embodiments and/or scenarios. In some embodiments, the PAPR reduction unit 1809 is omitted.

In some embodiments, the PHY processing unit 1900 generates OFDM symbols with 52 data tones according to the MCS0 specified in the IEEE 802.11n Standard or the IEEE 802.11ac Standard and the block coding 1916 utilizes a 4× repetition scheme. In some such embodiments, extra pilot tones are inserted to ensure that the resulting number of data and pilot tones in an OFDM symbol is equal to 56 as specified in the short range communication protocol. As an example, in an embodiment, six information bits are BCC encoded at the coding rate of 1/2 and the resulting 12 bits are mapped to 12 constellation symbols (BPSK). The 12 constellation symbols modulate 12 data tones which are then repeated four times the generated 48 data tones. Four pilot tones are added as specified in the IEEE 802.11n Standard and 4 extra pilot tones are added to generate 56 data and pilot tones.

Figure 19B:
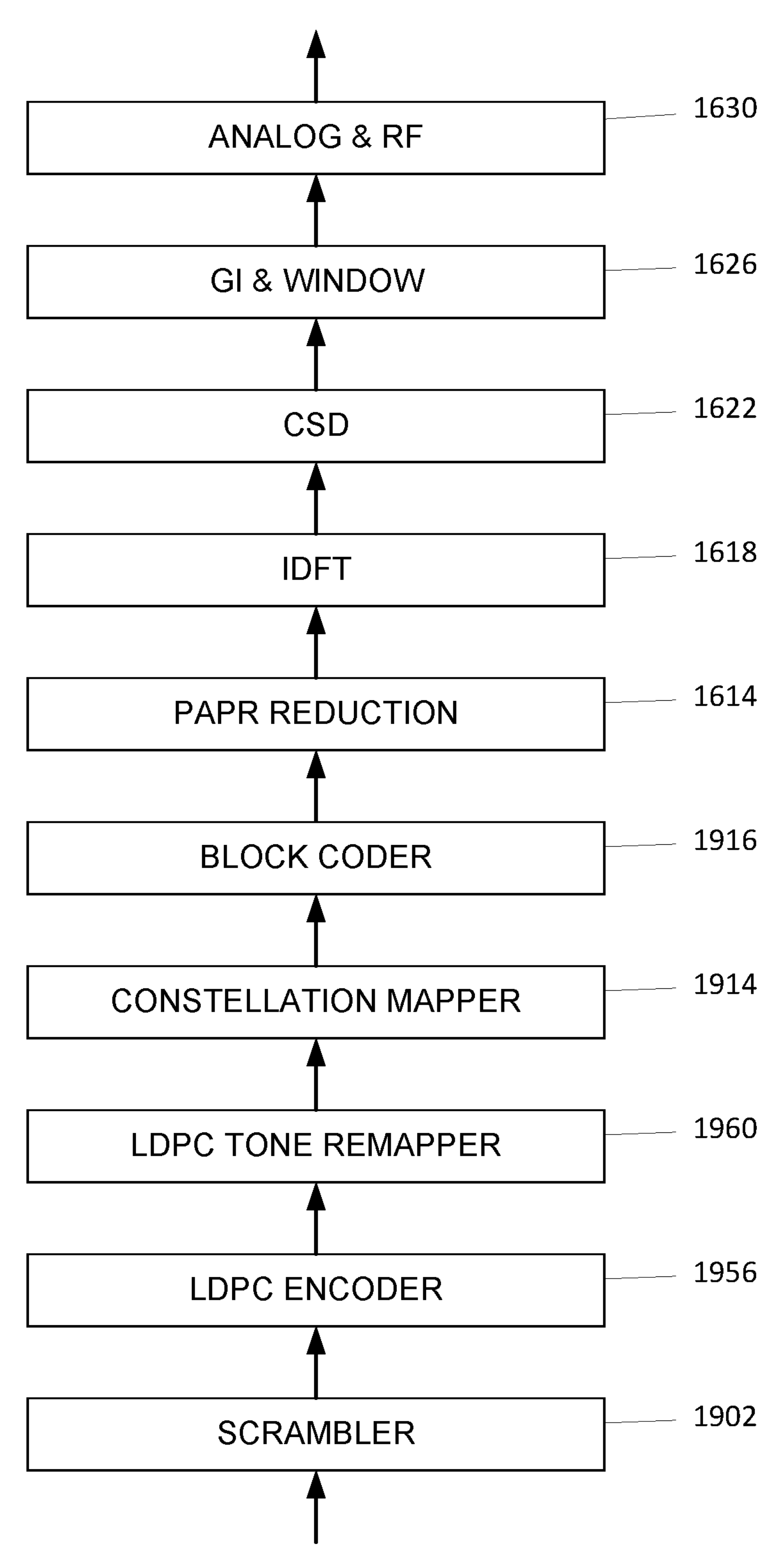
FIG. 19B is a block diagram of an example PHY processing unit for generating range extension mode data units, according to another embodiment.

FIG. 19B is a block diagram of an example PHY processing unit 1950 for generating range extension mode data units, according to another embodiment. In some embodiments, the PHY processing unit 1950 generates signal and/or data fields of range extension mode data units. Referring to FIG. 1, the AP 14 and the client station 25-1, in one embodiment, each include a PHY processing unit such as the PHY processing unit 1950.

The PHY processing unit 1950 is similar to the PHY processing unit 1900 of FIG. 19, except that in the PHY processing unit 1950, the FEC encoder 1906 is replaced by the LDPC encoder 1956. Accordingly, in this embodiment, LDPC encoded information bits are mapped to constellation symbols by the constellation mapper 1914 and the constellation symbols are then replicated or otherwise block encoded by the block coder 1916. In an embodiment, the LDPC encoder 1956 utilizes a block code corresponding to a coding rate of 1/2, or a block code corresponding to another suitable coding rate. In the illustrated embodiment, the PHY processing unit 1950 omits the interleaver 1910 because adjacent bits in an information stream are generally spread out by the LDPC code itself and, according to an embodiment, no further interleaving is needed. Additionally, in an embodiment, further frequency diversity is provided by the LDPC tone remapping unit 1960. According to an embodiment, the LDPC tone remapping unit 1960 reorders coded information bits or blocks of coded information bits according to a tone remapping function. The tone remapping function is generally defined such that consecutive coded information bits or blocks of information bits are mapped onto nonconsecutive tones in the OFDM symbol to facilitate data recovery at the receiver in cases in which consecutive OFDM tones are adversely affected during transmission. In some embodiments, the LDPC tone remapping unit 1960 is omitted.

Figures 20A, 20B, 20C, 20D:
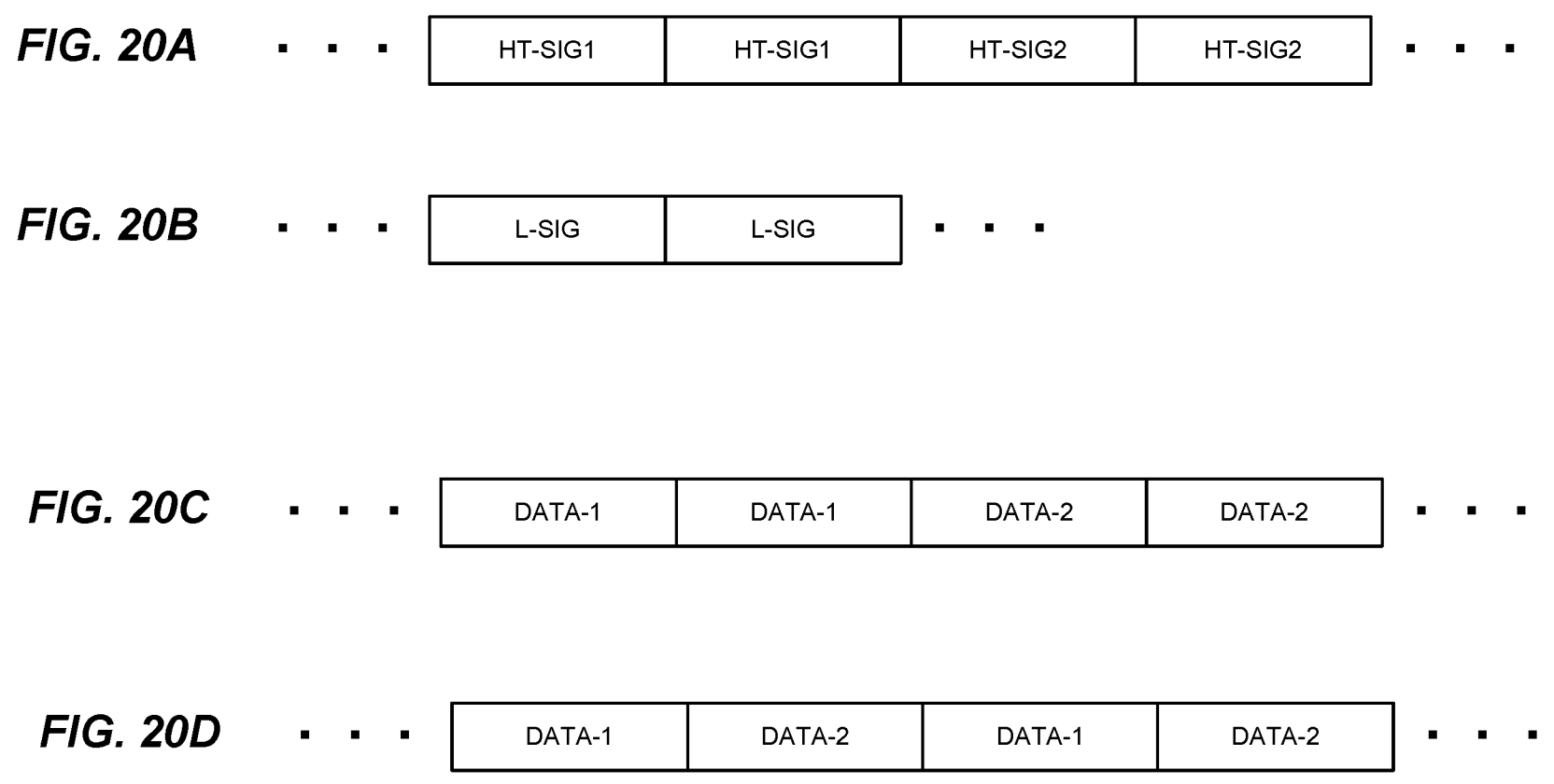

In the embodiments described above with regard to FIGS. 17-19, the range extension mode introduces redundancy by repeating bits and/or constellation symbols in frequency domain. Alternatively, in some embodiments, the range extension coding scheme includes OFDM symbol repetition of the signal and/or data fields of range extension mode data units that is performed in time domain. For example, FIG. 20A is a diagram showing a 2× repetition of each OFDM symbol of HT-SIG1 and HT-SIG2 fields in a preamble of a range extension mode data unit, according to an embodiment. Similarly, FIG. 20B is a diagram showing a 2× repetition of each OFDM symbol of the L-SIG field in a preamble of a range extension mode data unit, according to an embodiment. FIG. 20C is a diagram showing a time domain repetition scheme for OFDM symbols in the data portion of a control mode data unit, according to one embodiment. FIG. 20D is a diagram showing a repetition scheme for OFDM symbols in the data portion, according to another embodiment. As shown, in the embodiment of FIG. 20C OFDM symbol repetitions are output continuously, while in the embodiment of FIG. 20D OFDM symbol repetitions are interleaved. In general, OFDM symbol repetitions are interleaved according to any suitable interleaving scheme, in various embodiments and/or scenarios.

Figure 21:
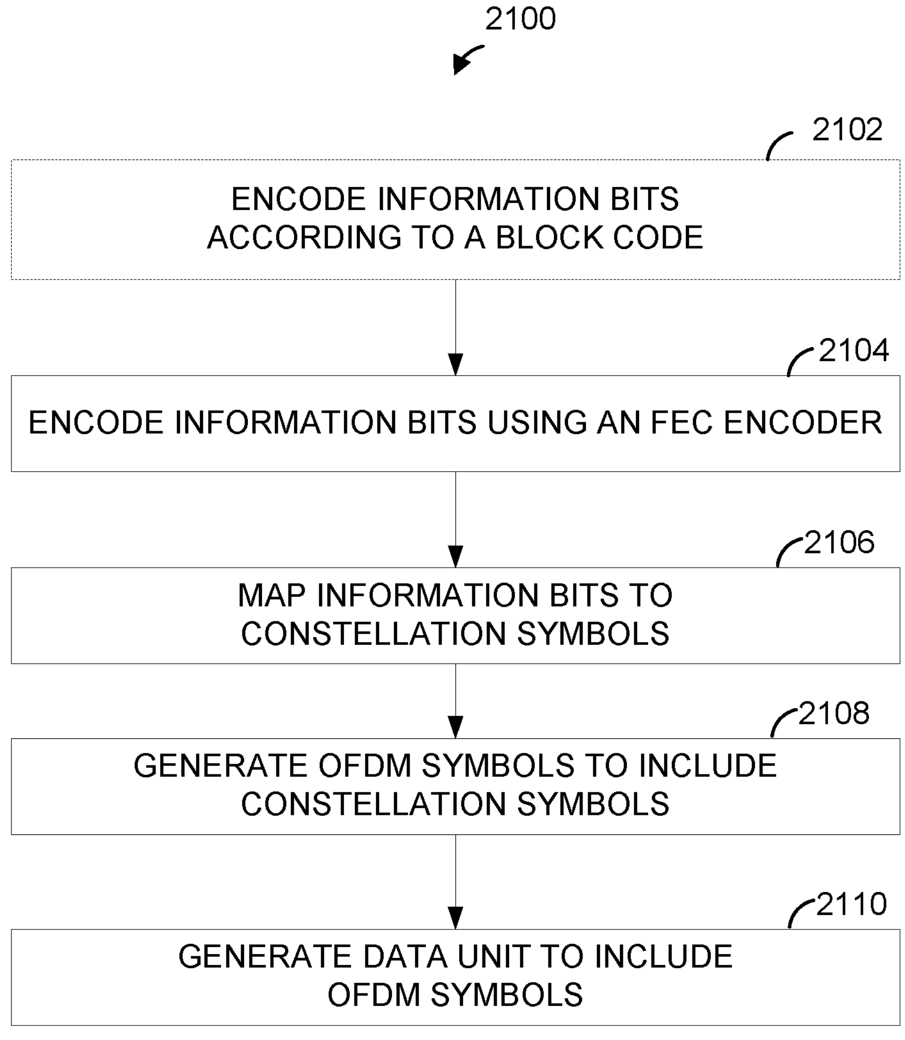
FIG. 21 is a flow diagram of an example method for generating a data unit, according to an embodiment.

FIG. 21 is a flow diagram of an example method 2100 for generating a data unit, according to an embodiment. With reference to FIG. 1, the method 2100 is implemented by the network interface 16, in an embodiment. For example, in one such embodiment, the PHY processing unit 20 is configured to implement the method 2100. According to another embodiment, the MAC processing 18 is also configured to implement at least a part of the method 2100. With continued reference to FIG. 1, in yet another embodiment, the method 2100 is implemented by the network interface 27 (e.g., the PHY processing unit 29 and/or the MAC processing unit 28). In other embodiments, the method 2100 is implemented by other suitable network interfaces.

At block 2102, information bits to be included in the data unit are encoded according to a block code. In one embodiment, information bits are encoded using a block level or a bit level repetition scheme described above with respect to the block coder 1704 of FIG. 17, for example. At block 2104, the information bits are encoded using an FEC encoder, such as the FEC encoder 1706 of FIG. 17A, or the LDPC encoder 1756 of FIG. 17B, for example. At block 2106, information bits are mapped to constellation symbols. At block 2108, a plurality of OFDM symbols is generated to include the constellation points. At block 2110, the data unit is generated to include the OFDM symbols.

In one embodiment, as illustrated in FIG. 21, information bits are encoded using a block encoder first (block 2102) and the block coded bits are then encoded using a FEC encoder (block 2104), such as described above with respect to FIG. 17A, for example. In another embodiment, the order of blocks 2102 and 2104 is interchanged. Accordingly, in this embodiment, information bits are FEC encoded first and the FEC encoded bits are encoded according to a block coding scheme, such as described above with respect to FIG. 18A, for example. In yet another embodiment, block 2102 is positioned after block 2106. In this embodiment, information bits are FEC encoded at block 2104, the FEC encoded bits are mapped to constellation symbols at block 2106, and the constellation symbols are then encoded according to a block coding or repetition scheme, such as described above with respect to FIG. 19A, for example, at block 2102.

In various embodiments, the range extension coding scheme uses a reduced size fast Fourier transform (FFT) technique that outputs a reduced number of constellation symbols which are repeated over an overall bandwidth to improve range and/or SNR performance. For example, in an embodiment, a constellation mapper maps a sequence of bits to a plurality of constellation symbols corresponding to 32 subcarriers (e.g., a 32-FFT mode) having 24 data tones. The 32 sub-carriers correspond to a 10 MHz sub-band of an overall 20 MHz bandwidth. In this example, the constellation symbols are repeated across the overall bandwidth of 20 MHz to provide redundancy of the constellation symbols. In various embodiments, the reduced size FFT technique is used in combination with the bit-wise and/or symbol replication techniques described above with regard to FIGS. 17-19.

In some embodiments where additional bandwidth is available, such as 40 MHz, 80 MHz, 160 MHz, 320 MHz, 640 MHz, etc., the 32 subcarriers are repeated across each 10 MHz sub-band of the overall bandwidth. For example, in another embodiment, a 32-FFT mode corresponds to a 5 MHz sub-band of an overall 20 MHz bandwidth. In this embodiment, the plurality of constellations are repeated 4× across the overall 20 MHz bandwidth (i.e., in each 5 MHz sub-band). Accordingly, a receiving device combines the multiple constellations to improve decoding reliability of the constellations. In some embodiments, the modulation of different 5 or 10 MHz sub-bands signals is rotated by different angles. For example, in one embodiment, a first sub-band is rotated 0-degrees, a second sub-band is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit, in at least some embodiments.

FIG. 22A is a diagram of a 20 MHz overall bandwidth having 2× repetitions of the range extension data unit having a 10 MHz sub-band, according to an embodiment. As shown in FIG. 22A, each sub-band of 10 MHz is rotated by a rotation r1 and r2, respectively. FIG. 22B is a diagram of a 40 MHz overall bandwidth having 4× repetitions of the range extension data unit having the 10 MHz sub-band, according to an embodiment. As shown in FIG. 22B, each sub-band of 10 MHz is rotated by a rotation r1, r2, r3, and r4, respectively. FIG. 22C is a diagram of an example tone plan 2230 for a 32-FFT mode that corresponds to a 10 MHz sub-band, according to an embodiment. The tone plan 2230 includes 32 total tones, having 24 data tones, 2 pilot tones at indices +7 and −7, 1 direct current tone, and 5 guard tones as shown in FIG. 22. In embodiments where the reduced size FFT technique is used, the corresponding tone plan is used for the HEW-LTF field, when present. In other embodiments where the reduced size FFT technique is used but the HEW-LTF field is not present, the L-LTF field 704 is modified to include additional ±1 signs for pilot tones to the corresponding indices of the modified tone plan. For example, in an embodiment, tones −29, −27, +27, and +29 are added to the tone plan for the L-LTF field. In a further embodiment, ±1 signs are removed from the L-LTF tone plan in tones −2, −1, 1, and 2 in the 20 MHz bandwidth. Similar changes are applied for overall bandwidths of 40 MHz, 80 MHz, 160 MHz, etc.

Figure 23:
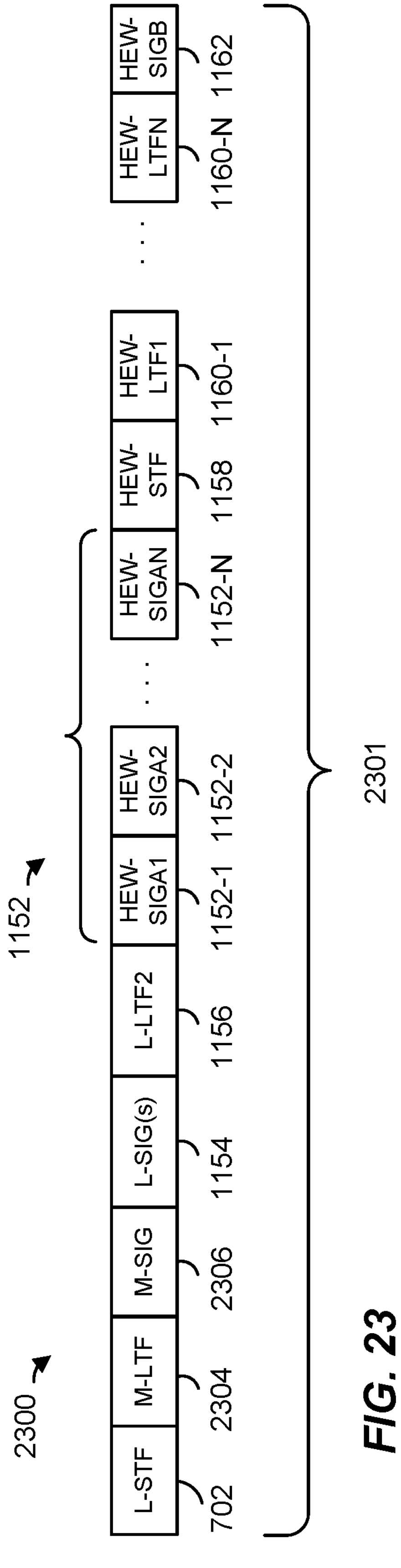
FIG. 23 is a diagram of an example data unit in which the range extension mode is used for a preamble of the data unit, according to an embodiment.

FIG. 23 is a diagram of an example data unit 2300 in which the range extension mode is used for a preamble 2301 of the data unit, according to an embodiment. In some embodiments, the preamble 2301 indicates both the regular mode and the range extension mode. In such an embodiment, another method to differentiate the regular mode from the range extension mode is used, such as those described above with regard to FIGS. 9, 10, and 11.

The data unit 2301 is generally similar to and includes like-numbered elements with the data unit 1150 of FIG. 11B, except that the preamble 2301 of the data unit 2300 is formatted differently from the preamble 1151 of the data unit 1101. In an embodiment, the preamble 2301 is formatted such that a receiving device that operates according to the HEW communication protocol is able to determine that the preamble 2301 is a range extension mode preamble rather than a regular mode preamble. In an embodiment, the preamble 2301 includes a modified long training field M-LTF 2304 and a modified signal field M-SIG 2306 in place of the L-LTF 704 and the L-SIG 706, respectively, as compared to the data unit 1151. In an embodiment, the preamble 2301 includes the L-STF 702, a double guard interval followed by two repetitions of a modified long training sequence as the M-LTF 2304, a normal guard interval, and the modified signal field M-SIG. In some embodiments, the preamble 2301 further includes one or more first HEW signal fields (HEW-SIGAs) 1152. In an embodiment, the preamble 2301 further includes one or more secondary L-SIG(s) 1154 that follow the M-SIG field 2306. The secondary L-SIG(s) 1154 are followed by a second L-LTF field (L-LTF2) 1156, in some embodiments. In other embodiments, the preamble 2301 omits the L-SIG (s) 1154 and/or the L-LTF2 1156. In some embodiments, the preamble 2301 also includes an HEW-STF 1158, one or more HEW-LTF fields 1160, and a second HEW signal field (HEW-SIGB) 1162. In other embodiments, the preamble 2301 omits the HEW-STF 1158, the HEW-LTF(s) 1160 and/or the HEW-SIGB 1162. In an embodiment, the data unit 2300 also includes a data portion 716 (not shown in FIG. 23). In some embodiments, the HEW signal fields (HEW-SIGAs) 1152 are modulated using a same range extension coding scheme as the data field 716.

In various embodiments, the M-LTF 2304 corresponds to the L-LTF 704 multiplied by a predetermined sequence (e.g., a polarization code). For example, using an index i, an i-th constellation symbol of the L-LTF 704 is multiplied by an i-th value (e.g., ±1) of the predetermined sequence to obtain the M-LTF 2304, as shown in Equation 1:

$$M\text{-}LTF_i = C_i * L\text{-}LTF_i \quad \text{(Equation 1)}$$

where C is the predetermined sequence. In some embodiments, the M-SIG 2306 corresponds to the L-SIG 706 multiplied by the predetermined sequence, as shown in Equation 2:

$$M\text{-}SIG_i = C_i * L\text{-}SIG_i \quad \text{(Equation 2)}$$

In some embodiments, a length (i.e., a number of values) of the predetermined sequence is equal to a sum of a number of data tones and a number of pilot tones per 20 MHz band in the IEEE 802.11ac protocol, for example 52 values (i.e., for 48 data tones and 4 pilot tones).

In an embodiment, the predetermined sequence and the modified long training sequence each have a length that is greater than or equal to the sum of the number of data tones and the number of pilot tones. As described above with regard to the tone plan 2230 for a 32-FFT mode that corresponds to a 10 MHz sub-band, if the HEW-STF and/or HEW-LTF fields do not exist in the range extension preamble, the receiver relies upon the L-LTF field for demodulation of subsequent fields. In an embodiment, a tone plan miss-match between the 20 MHz L-LTF and the 10 MHz 32-FFT mode is corrected by inserting +1 or −1 signs in the L-LTF for the missing tones (e.g., tones −29, −27, +27, and +29 for a total of 58 tones).

Figure 24:
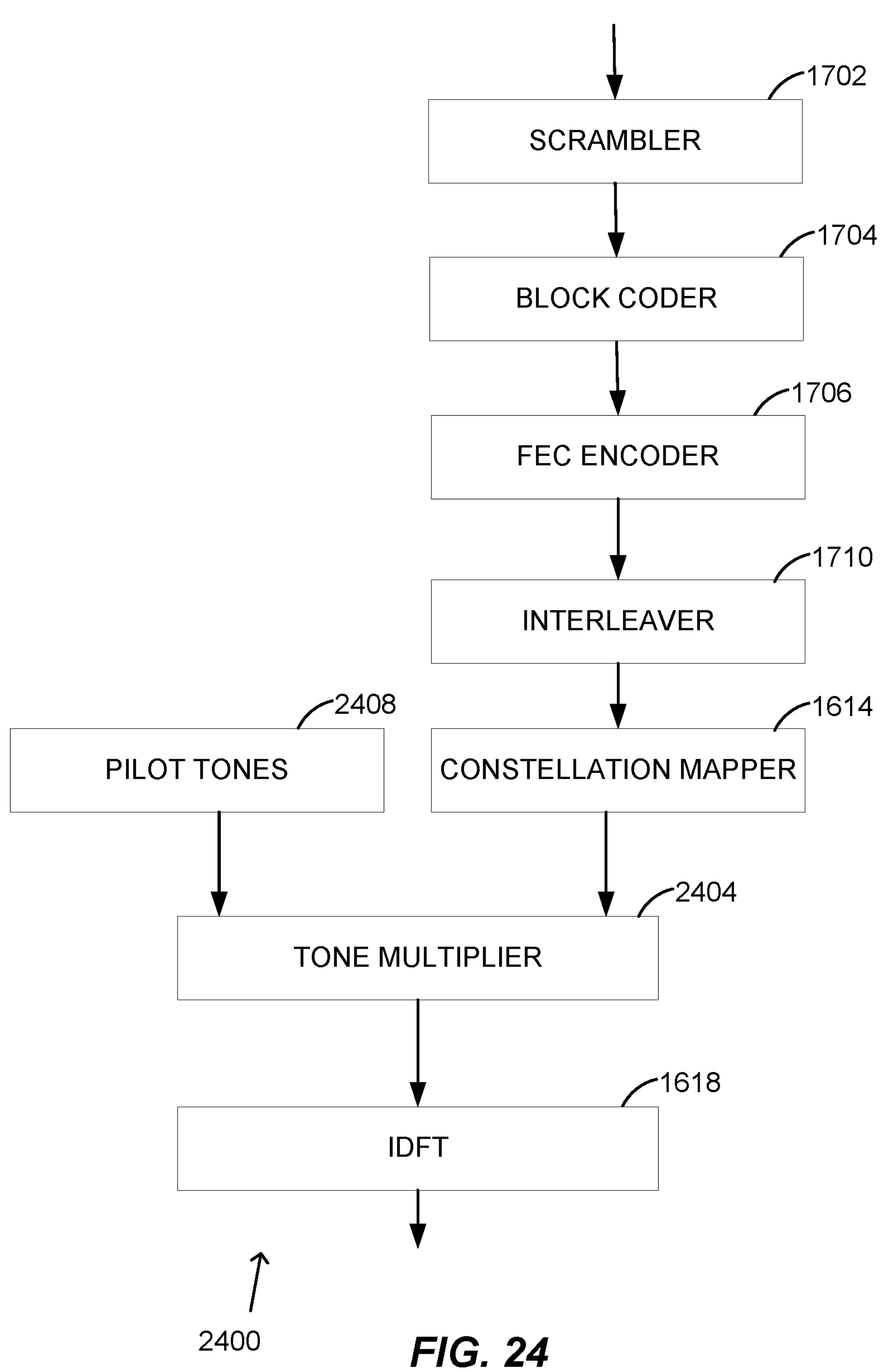
FIG. 24 is a block diagram of an example PHY processing unit for generating range extension mode data units, according to another embodiment.

FIG. 24 is a block diagram of an example PHY processing unit 2400 for generating range extension mode data units, according to another embodiment. In some embodiments, the PHY processing unit 2400 generates signal and/or training fields of range extension mode data units. Referring to FIG. 1, the AP 14 and the client station 25-1, in one embodiment, each include a PHY processing unit such as the PHY processing unit 2400.

The PHY processing unit 2400 is similar to the PHY processing unit 1700 of FIG. 17A, except that in the PHY processing unit 2400 a tone multiplier 2404 is located after the constellation mapper 1614. In some embodiments, the tone multiplier 2404 generates i) modified constellation symbols for the L-SIG field (i.e., M-SIG 2306) and ii) a modified long training sequence for the L-LTF field (i.e., M-LTF 2304) of a range extension mode data unit.

In some embodiments, the PHY processing unit 2400 is configured to generate a first long training sequence for the range extension mode preamble at least by multiplying the predetermined sequence with a second long training sequence of a second communication protocol. In an embodiment, for example, the tone multiplier 2404 multiplies the predetermined sequence by the L-LTF 704 to obtain the M-LTF 2304. The tone multiplier 2404 provides the M-LTF 2304 to the IDFT 1618 in place of the L-LTF 704 during the range extension mode, in an embodiment.

In an embodiment, the tone multiplier 2404 receives constellation symbols for data to be included in the L-SIG 706 from the constellation mapper 1614 and receives constellation symbols for pilot tones from a pilot tone generator 2408. Accordingly, the M-SIG 2306 output from the tone multiplier 2404 includes modified constellation symbols for data tones and pilot tones to be converted into a time-domain signal by the IDFT 1618, in an embodiment.

In some embodiments, a receiver device decodes the M-SIG 2306, for example, using channel estimates based on the M-LTF 2304. In this example, because both the L-LTF 704 and L-SIG 706 have been multiplied by the predetermined sequence, the legacy receiver device effectively removes the multiplication as part of a channel estimation process or auto-correlation process. In an embodiment, a receiving device determines whether a preamble corresponds to the range extension mode preamble 2400 or to the normal mode preamble 1101 by detecting whether the LTF field (e.g., either the M-LTF 2304 or the L-LTF 704) in the preamble is generated with (e.g., multiplied by) the predetermined sequence or without multiplying with the predetermined sequence based on auto-correlation of the L-LTF field with and without multiplication with the predetermined sequence. In an embodiment, the receiving device performs a first auto-correlation of the LTF with the L-LTF 704, performs a second auto-correlation of the LTF with the M-LTF 2304, and performs a comparison of the auto-correlation results. If auto-correlation with the M-LTF 2304 produces a greater result compared to the result of the auto-correlation with the L-LTF 704, then the receiving device determines that the preamble corresponds to the range extension mode preamble 2300, in an embodiment. On the other hand, if auto-correlation of the LTF with the L-LTF 704 produces a greater result compared to the result of auto-correlation with the M-LTF 2304, then the receiving device determines that the preamble corresponds to the regular mode preamble 1101, in an embodiment. The receiver device performs the auto-correlation in the frequency domain, in some embodiments, according to Equation 3:

$$\max_L \left| \sum_i y_i L_i y_{i+1}^* L_{i+1} \right| \quad \text{(Equation 3)}$$

where $y_i$ is a final received and averaged L-LTF sequence, $L_i$ is the transmitted L-LTF sequence belonging to IEEE 802.11a/n/ac or the modified long training sequence M-LTF. For example, $L_i$ is either $C_i$*L-$LTF_i$ for the range extension mode or L-$LTF_i$ for the regular mode. In some scenarios, cross correlation of successive tones generally removes channel effects and frequency domain match filtering finds the most likely transmitted sequence. In some embodiments, the receiver device uses channel estimation from the M-LTF to decode additional fields of the data unit (i.e., HEW-SIG and/or data fields). In some scenarios, the values of the predetermined sequence corresponding to pilot tones are all one, allowing phase tracking on the pilot tones.

In some embodiments, OFDM modulation with reduced tone spacing is used with a same size FFT to reduce the data rate in the range extension mode. For example, whereas the regular mode for a 20 MHz bandwidth OFDM data unit uses a 64-point fast Fourier transform (FFT), resulting in 64 OFDM tones, the range extension mode uses a reduced tone spacing by a factor of 2, resulting in 128 OFDM tones in the same bandwidth. In this case, tone spacing in the range extension mode OFDM symbols is reduced by a factor of two (½) compared to the regular mode OFDM symbols while using a same 64-point FFT, a 2× increased symbol duration, and 2× increased guard interval, where the symbols are then repeated in the remaining bandwidth. As another example, whereas the regular mode for a 20 MHz bandwidth OFDM data unit uses a 64-point fast Fourier transform (FFT) resulting in 64 OFDM tones, the range extension mode uses a ¼ reduced tone spacing for a 20 MHz OFDM data unit resulting in 256 OFDM tones in the same bandwidth. In this case, tone spacing in the range extension mode OFDM symbols is reduced by a factor of four (¼) compared to the regular mode OFDM symbols while using a 4× increased symbol duration and 4× increased guard interval. In such embodiments, long GI duration of, for example, 1.6 μs is used. However, the duration of the information portion of the range extension mode OFDM symbol is increased (e.g., from 3.2 μs to 6.4 μs), and the percentage of the GI portion duration to the total OFDM symbols duration remains the same, in an embodiment. Thus, in this case, loss of efficiency due to a longer GI symbol is avoided, in at least some embodiments. In various embodiments, the term "long guard interval" as used herein encompasses an increased duration of a guard interval as well as a decreased OFDM tone spacing that effectively increases duration of the guard interval. In other embodiments, tone spacing is reduced, guard intervals are increased, and symbol duration is increased according to factors of 6, 8, or other suitable values. In some embodiments, variations in tone spacing, guard intervals, and symbol duration are used in combination with block coding or symbol repetition, as described above.

The total signal bandwidth of data units for the range extension mode in some embodiments is 20 MHz. For example, increased signal bandwidth is not likely to further increase the range or improve SNR performance. In some embodiments, the range extension mode is configured to use an FFT size up to 512 points. In such an embodiment, if tone-spacing is reduced by a factor of 4 for the range extension mode, then a total bandwidth for the 512 FFT is 40 MHz, thus the range extension mode uses up to 40 MHz signal bandwidth.

In other embodiments, the range extension mode is configured for up to the largest available signal bandwidth (e.g., 160 MHz). In various embodiments, for example, a ½ tone spacing corresponds to a 64 FFT for a 10 MHz band, a 128 FFT for a 20 MHz band, a 256 FFT for a 40 MHz band, a 512 FFT for a 80 MHz band, and a 1024 FFT for a 160 MHz band. In some embodiments, the reduced tone spacing is used in combination with a smaller FFT size. In various embodiments, shorter guard intervals are used with reduced tone spacing, for example, a normal guard interval having a duration equal to 25% of a duration of an OFDM symbol and a short guard interval having a duration equal to ⅑th of an OFDM symbol.

Figure 25A:
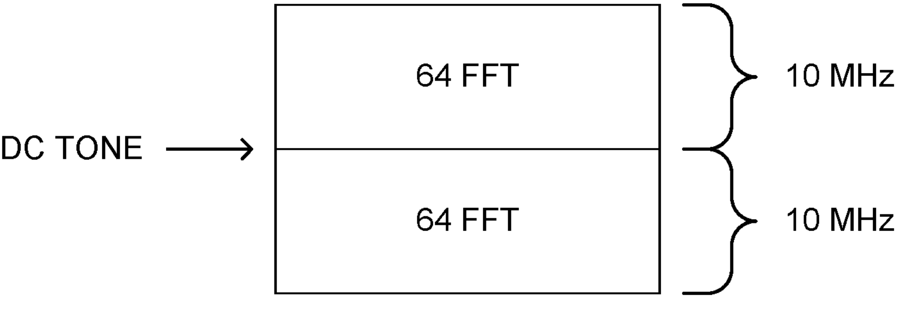
FIG. 25A is a diagram of an example 20 MHz total bandwidth having ½ tone spacing, according to an embodiment.

In some embodiments, the range extension mode uses a smaller tone spacing (i.e., ½, ¼, etc.). In such an embodiment, the same FFT size represents a smaller bandwidth, for example, ½ tone spacing corresponds to a 64 FFT over a 10 MHz band. In an embodiment, the tone plan within a same FFT size is the same for both the range extension mode and the regular mode, for example, a 64 FFT in the range extension mode uses a same tone plan as in a 64 FFT for 20 MHz in IEEE 802.11ac. FIG. 25A is a diagram of an example 20 MHz total bandwidth having ½ tone spacing, according to an embodiment. In this case, the indices for the original DC tones of a legacy tone plan for each 64 FFT are now in the middle of the 10 MHz sub-band, instead of in the middle of the total 20 MHz bandwidth, and the indices for the original guard tones are proximate to the true DC tone. In some embodiments where the band used for a range extension mode data unit is less than 20 MHz, a non-legacy tone plan includes additional data or pilot tones at the indices for the original DC tones, because the indices will not overlap with the "true DC tone," because the smallest signal bandwidth is 20 MHz for the range extension mode or regular mode. In some embodiments, the non-legacy tone plan includes additional data tones in place of guard tones at the edges of the legacy tone plan to keep a same number of populated tones.

Figure 25B:
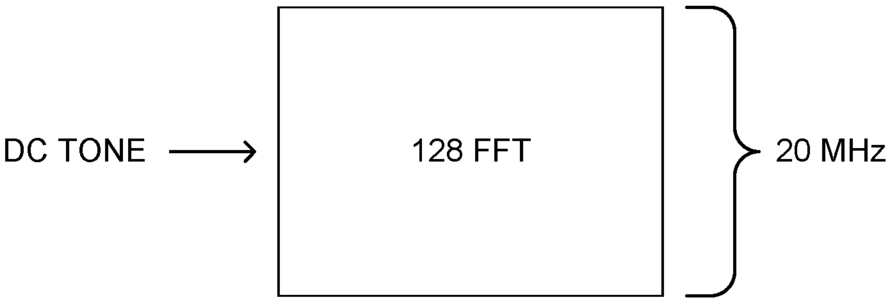
FIG. 25B is a diagram of an example 20 MHz total bandwidth having ½ tone spacing, according to an embodiment.

In other embodiments, when the tone spacing is reduced, the impact from a direct current offset and carrier frequency offset (CFO) becomes larger as compared to the regular mode. FIG. 25B is a diagram of an example 20 MHz total bandwidth having ½ tone spacing, according to an embodiment. In some embodiments, additional zero tones are defined proximate to the direct current tone of a band for a non-legacy tone plan of the range extension mode as compared to the legacy tone plan of the same FFT size in the regular mode. In various embodiments, the additional zero tones are defined only beyond a predetermined FFT size and/or tone spacing, for example, when the FFT size is greater than or equal to 128 with tone spacing reduced by ½, or when the FFT size is greater than or equal to 256 with tone spacing reduced by ¼. In some embodiments, an increased number of guard tones is used for a non-legacy tone plan for the range extension mode, for example, to maintain a same absolute guard space (e.g., absolute frequency space) at a band edge as compared to the legacy tone plan of the regular mode. In this case, a total number of data tones and pilot tones in the non-legacy tone plan is less than the legacy tone plan. In some examples, the same absolute guard space facilitates filter designs. In some embodiments, for example, where the total number of data tones for the non-legacy tone plan is different from a same FFT size of the regular mode, PHY parameters for the FEC interleaver and/or LDPC tone mapper are redefined for the number of data tones of the non-legacy tone plan.

Figures 26A, 26B, 26C:
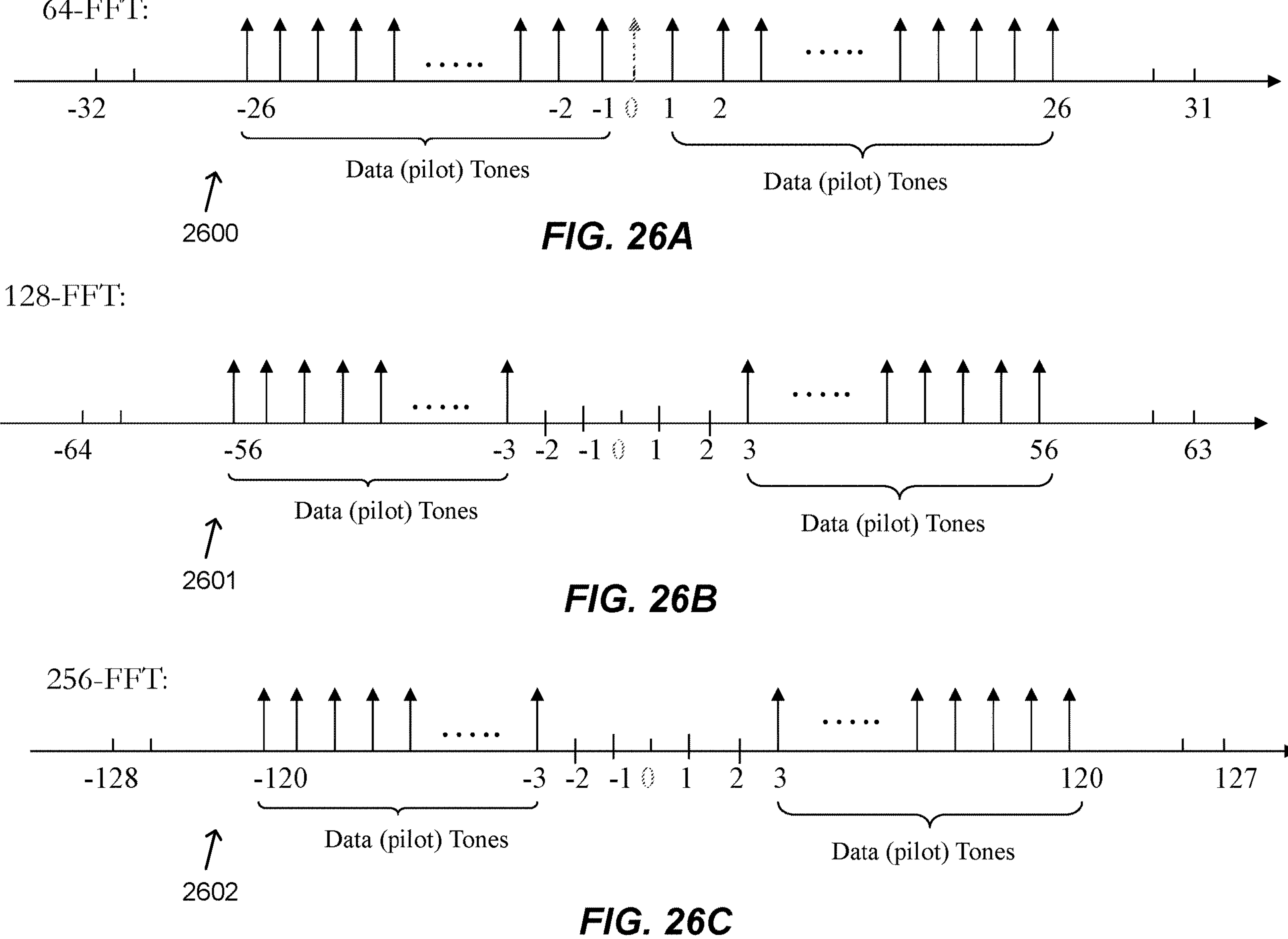
FIG. 26A is a diagram of a non-legacy tone plan for the range extension mode having a size 64 FFT and ½ tone spacing, according to an embodiment.
FIG. 26B is a diagram of a non-legacy tone plan for the range extension mode having a size 128 FFT and ½ tone spacing, according to an embodiment.
FIG. 26C is a diagram illustrating a non-legacy tone plan for the range extension mode having a size 256 FFT and ½ tone spacing, according to an embodiment.

FIG. 26A is a diagram of a non-legacy tone plan 2600 for the range extension mode having a size 64 FFT and ½ tone spacing, according to an embodiment. In the non-legacy tone plan 2600, additional guard tones are included (i.e., guard tones −28, −27, +27, +28) as compared to a legacy tone plan for the regular mode. In some embodiments, the 64 FFT populates the DC tone with either a pilot tone or data tone. FIG. 26B is a diagram of a non-legacy tone plan 2601 for the range extension mode having a size 128 FFT and ½ tone spacing, according to an embodiment. In the non-legacy tone plan 2601, additional guard tones (i.e., guard tones −58, −57, +57, +58) and additional DC tones (i.e., DC tones −2, −1, 0, 1, 2) are included as compared to a legacy tone plan for the regular mode. FIG. 26C is a diagram illustrating a non-legacy tone plan 2602 for the range extension mode having a size 256 FFT and ½ tone spacing, according to an embodiment. In the non-legacy tone plan 2602, additional guard tones (i.e., guard tones −122, −121, +121, +122) and additional DC tones (i.e., DC tones −2, −1, 0, 1, 2) are included as compared to a legacy tone plan for the regular mode. In other embodiments, additional guard tones and/or DC tones are added to the non-legacy tone plans for the range extension mode as compared to the regular mode.

Figure 27:
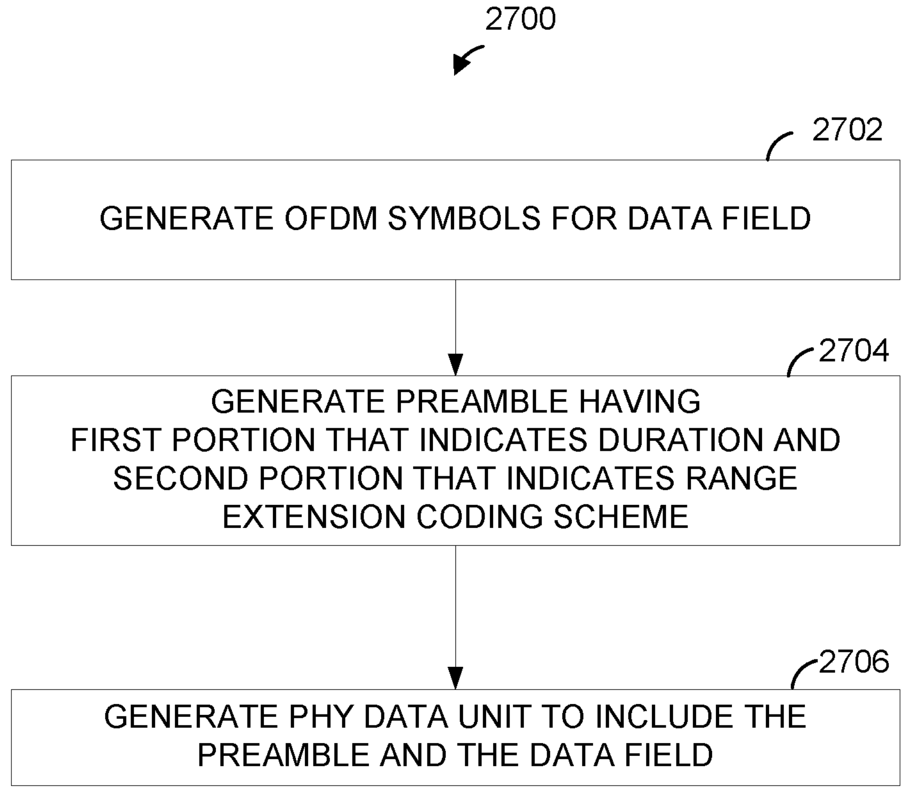
FIG. 27 is a flow diagram of an example method for generating a data unit, according to an embodiment.

FIG. 27 is a flow diagram of an example method 2700 for generating a data unit, according to an embodiment. With reference to FIG. 1, the method 2700 is implemented by the network interface 16, in an embodiment. For example, in one such embodiment, the PHY processing unit 20 is configured to implement the method 2700. According to another embodiment, the MAC processing 18 is also configured to implement at least a part of the method 2700. With continued reference to FIG. 1, in yet another embodiment, the method 2700 is implemented by the network interface 27 (e.g., the PHY processing unit 29 and/or the MAC processing unit 28). In other embodiments, the method 2700 is implemented by other suitable network interfaces.

At block 2702, first OFDM symbols for a data field are generated. In various embodiments, generating the OFDM symbols at block 2702 includes generating OFDM symbols of the data portion according to one of the range extension coding scheme that corresponds to the range extension mode or the regular coding scheme that corresponds to the regular mode. In an embodiment, the range extension coding scheme includes the range extension coding schemes described above with respect to FIG. 10 (e.g., reduced tone spacing). In another embodiment, the range extension coding scheme includes the range extension coding schemes described above with respect to FIGS. 17-20 (e.g., bit-wise repetition or symbol repetition). In yet another embodiment, the range extension coding scheme includes the range extension coding schemes described above with respect to FIG. 22 (e.g., data unit repetition). In yet another embodiment, the range extension coding scheme includes a suitable combination of the range extension coding schemes described above with respect to FIGS. 10, FIGS. 17-20, and FIG. 22.

In an embodiment, generating the OFDM symbols for the data portion of the PHY data unit according to the range extension coding scheme includes: encoding a plurality of information bits using a forward error correction (FEC) encoder (e.g., the FEC encoder 1706, 1806, or 1906) to obtain a plurality of encoded bits; mapping the plurality of encoded bits to a plurality of constellation symbols, for example, using the constellation mapper 1614 or 1914; generating the OFDM symbols to include the plurality of constellation symbols, for example, using the IDFT 1618 or 1818. In an embodiment, generating the OFDM symbols further includes performing one of: i) encoding the plurality of information bits according to a block coding scheme (e.g., using the block coder 1704), ii) encoding the plurality of encoded bits according to the block coding scheme (e.g., using the block coder 1808), or iii) encoding the plurality of constellation symbols according to the block coding scheme (e.g., using the block coder 1916). In another embodiment, generating the OFDM symbols for the data field includes generating the OFDM symbols for the data field to include a plurality of constellation symbols in a first bandwidth portion of a channel bandwidth and a copy of the plurality of constellation symbols in a second bandwidth portion of the channel bandwidth, for example, as described above with respect to FIG. 22. In a further embodiment, the copy of the plurality of constellation symbols is generated to include a predetermined phase shift.

At block 2704, a preamble of the data unit is generated. The preamble generated at block 2704 is generated to indicate whether at least the data portion of the data unit generated at block 2702 is generated using the range extension coding scheme or the regular coding scheme. In various embodiments and/or scenarios, one of the preambles 701 (FIGS. 9A, 10A), 751 (FIGS. 9B, 10B), 1101 (FIG. 11A), 1151 (FIG. 11B), or 1401 (FIG. 14A) is generated at block 1604. In other embodiments, other suitable preambles are generated at block 2704.

In an embodiment, the preamble is generated to have i) a first portion that indicates a duration of the PHY data unit and ii) a second portion that indicates whether at least some OFDM symbols of the data portion are generated according to the range extension coding scheme. In a further embodiment, the first portion of the preamble is formatted such that the first portion of the preamble is decodable by a receiver device that conforms to a second communication protocol (e.g., a legacy communication protocol), but does not conform to the first communication protocol (e.g., the HEW communication protocol), to determine the duration of the PHY data unit based on the first portion of the preamble.

In an embodiment, the preamble generated at block 2704 includes a CI indication set to indicate whether at least the data portion is generated using the range extension coding scheme or the regular coding scheme. In an embodiment, the CI indication comprises one bit. In an embodiment, a portion of the preamble, in addition to the data portion, is generated using the coding scheme indicated by the CI indication. In another embodiment, the preamble generated at block 2704 is formatted such that a receiving device can automatically detect (e.g., without decoding) whether the preamble corresponds to a regular mode preamble or to a range extension mode preamble. In an embodiment, detection of the range extension mode preamble signals to the receiving device that at least the data portion is generated using the range extension coding scheme.

In an embodiment, generating the preamble includes generating a second portion of the preamble including second OFDM symbols for i) a short training field according to the first communication protocol and ii) at least one copy of the short training field, and generating third OFDM symbols for i) a long training field according to the first communication protocol and ii) at least one copy of the long training field. In a further embodiment, the OFDM symbols for the data portion, the second OFDM symbols, and the third OFDM symbols have a same tone plan that is distinct from a tone plan for the first portion of the preamble.

In another embodiment, block 2704 includes generating a first signal field for the PHY data unit according to the second communication protocol (e.g., the legacy communication protocol) and generating a second signal field as a copy of the first signal field to indicate that at least some OFDM symbols of the data field are generated according to the range extension mode. In a further embodiment, the first signal field and the second signal field indicate that the duration of the PHY data unit is a predetermined duration and the second signal field is usable by a receiver device that conforms to the first communication protocol as a supplemental training field. In another embodiment, the first signal field and the second signal field are decodable in combination by a receiver device that conforms to the first communication protocol to increase a decoding reliability of the first signal field and the second signal field.

In an embodiment, the first portion of the preamble includes i) a legacy short training field that conforms to the second communication protocol, ii) a non-legacy long training field, and iii) a legacy signal field that conforms to the second communication protocol, and the second portion of the preamble does not include any training fields. In this embodiment, a first plurality of constellation symbols are generated for the legacy short training field using a legacy tone plan that conforms to the second communication protocol, a second plurality of constellation symbols are generated for the non-legacy long training field using a non-legacy tone plan; and the OFDM symbols for the data field include a third plurality of constellation symbols generated using the non-legacy tone plan.

In an embodiment, OFDM symbols are generated for the first portion of the preamble as a legacy preamble, using a normal guard interval, that conforms to the second communication protocol, and OFDM symbols are generated for the second portion of the preamble using a long guard interval. In a further embodiment, OFDM symbols for a non-legacy signal field and a non-legacy short training field of the second portion of the preamble are generated using the normal guard interval, and OFDM symbols for the second portion of the preamble are generated for a non-legacy long training field using the long guard interval. In another embodiment, OFDM symbols are generated for a legacy signal field of the first portion of the preamble using the normal guard interval, and OFDM symbols are generated for a non-legacy signal field of the second portion of the preamble using a long guard interval. In an embodiment, the second portion of the preamble is decodable by receiver devices that conform to the first communication protocol and the long guard interval of the second preamble signals to the receiver devices that conform to the first communication protocol that the PHY data unit conforms to the range extension mode. In yet another embodiment, OFDM symbols are generated for the second portion of the preamble, using the long guard interval, for i) a non-legacy signal field and ii) a copy of a first OFDM symbol for the non-legacy signal field. In an embodiment, OFDM symbols are generated for each field of a plurality of fields of the second portion of the preamble to include i) a double guard interval, ii) a first OFDM symbol for the field, and iii) a second OFDM symbol for the field that is a copy of the first OFDM symbol.

At block 2706, the data unit is generated to include the preamble generated at block 2704 and the data portion generated at block 2702. In an embodiment, the PHY data unit is generated to include a double guard interval according to the second communication protocol followed by the first portion of the signal field and the second portion of the signal field, without a guard interval between the first signal field and the second signal field.

In some embodiments, at least the first portion of the preamble is transmitted with a transmission power boost as compared to the data field to increase a decoding range of the first portion of the preamble.

In another embodiment, OFDM symbols for the data field are generated using a first tone spacing and a long guard interval, and OFDM symbols for the first portion of the preamble are generated using i) a second tone spacing that is different from the first tone spacing, and ii) a regular guard interval. In a further embodiment, the second tone spacing of the first portion of the preamble is i) a legacy tone spacing that conforms to the second communication protocol, and ii) an integer multiple of the first tone spacing of the data field, and the regular guard interval is a legacy guard interval that conforms to the second communication protocol. In another embodiment, OFDM symbols for the second portion of the preamble are generated including i) at least a first OFDM symbol using the legacy tone spacing and the legacy guard interval and ii) at least a second OFDM symbol using the first tone spacing and the long guard interval. In yet another embodiment, the OFDM symbols for the data field are generated using the first tone spacing to include a plurality of constellation symbols in a first bandwidth portion of a channel bandwidth and a copy of the plurality of constellation symbols in a second bandwidth portion of the channel bandwidth, and the first bandwidth portion and the second bandwidth portion have a same bandwidth. In a further embodiment, generating the OFDM symbols for the data field includes generating the copy of the plurality of constellation symbols to include a predetermined phase shift.

In an embodiment, generating the OFDM symbols for the data field includes generating the OFDM symbols for the data field using the first tone spacing, the long guard interval, and a long symbol duration. In a further embodiment, generating the OFDM symbols for the first portion of the preamble comprises generating OFDM symbols for the first portion of the preamble using the second tone spacing, the regular guard interval, and a regular symbol duration. In a further embodiment, the second tone spacing of the first portion of the preamble is i) a legacy tone spacing and ii) an integer n multiple of the first tone spacing of the data field, the regular guard interval is a legacy guard interval, and the long symbol duration is an integer n multiple of the regular symbol duration.

In another embodiment, generating the OFDM symbols for the data field of the PHY data unit according to the range extension mode includes: generating the OFDM symbols for the data field using a non-legacy tone spacing and a non-legacy tone plan that do not conform to the second communication protocol; and generating the preamble comprises generating OFDM symbols for the first portion of the preamble using a second tone spacing that is different from the non-legacy tone spacing and a legacy tone plan that is different from the non-legacy tone plan. In a further embodiment, the non-legacy tone plan includes at least one guard tone in place of a corresponding data tone of the legacy tone plan proximate to a direct current tone. In an embodiment, the non-legacy tone plan includes at least one data tone in place of a corresponding guard tone of the legacy tone plan such that the non-legacy tone plan and the legacy tone plan have a same number of data tones. In another embodiment, the non-legacy tone plan includes fewer data tones than the legacy tone plan and generating the OFDM symbols for the data field using the non-legacy tone spacing and the non-legacy tone plan includes encoding information bits for the OFDM symbols using an error correcting code based on a number of data tones of the non-legacy tone plan. In an embodiment, the error correcting code is a binary convolutional code. In another embodiment, the error correcting code is a low density parity check code.

FIG. 28 is a flow diagram of an example method 2800 for generating a data unit, according to an embodiment. With reference to FIG. 1, the method 2800 is implemented by the network interface 16, in an embodiment. For example, in one such embodiment, the PHY processing unit 20 is configured to implement the method 2800. According to another embodiment, the MAC processing 18 is also configured to implement at least a part of the method 2800. With continued reference to FIG. 1, in yet another embodiment, the method 2800 is implemented by the network interface 27 (e.g., the PHY processing unit 29 and/or the MAC processing unit 28). In other embodiments, the method 2800 is implemented by other suitable network interfaces.

At block 2802, a first plurality of orthogonal frequency division multiplexing (OFDM) symbols is generated for a first field of a preamble to be included in the PHY data unit, in an embodiment. In some embodiments, each OFDM symbol of the first plurality of OFDM symbols corresponds to a first long training sequence of the first communication protocol that is obtained at least by multiplying a predetermined sequence with a second long training sequence of a second communication protocol. At block 2804, a first plurality of information bits for a second field of the preamble are encoded to generate a first plurality of encoded bits, in an embodiment.

At block 2806, the first plurality of encoded bits are mapped to a first plurality of constellation symbols, in an embodiment. At block 2808, a first plurality of modified constellation symbols are generated, including multiplying the first plurality of constellation symbols by the predetermined sequence, in an embodiment. At block 2810, a second plurality of orthogonal frequency division multiplexing (OFDM) symbols are generated to include the first plurality of modified constellation symbols, in an embodiment. At block 2812, the preamble is generated to include the first plurality of OFDM symbols for the first field and the second plurality of OFDM symbols for the second field, in an embodiment. At block 2814, the PHY data unit is generated to include at least the preamble.

In some embodiments, the first plurality of information bits includes a first set of one or more information bits that indicate a duration of the PHY data unit, the preamble being formatted such that the preamble is decodable by a receiver device that conforms to the second communication protocol, but does not conform to the first communication protocol, to determine the duration of the PHY data unit based on the preamble. In an embodiment, an i-th value of the first long training sequence corresponds to an i-th value of the predetermined sequence multiplied with a corresponding i-th value of the second long training sequence where i is an index.

In an embodiment, a length of the first long training sequence is greater than or equal to a sum of a number of data tones and a number of pilot tones in an OFDM symbol specified by the second communication protocol. In some embodiments, generating the first plurality of modified constellation symbols includes multiplying the predetermined sequence by a plurality of pilot tone constellation symbols for the second communication protocol. In some embodiments, values of the predetermined sequence that correspond to the plurality of pilot tone constellation symbols have a value of 1. In an embodiment, values of the predetermined sequence have a value of +1 or −1.

In some embodiments, generating the first plurality of OFDM symbols includes generating the first plurality of OFDM symbols such that an auto-correlation output for the first field generated by a receiver that conforms to the first communication protocol will signal i) a first mode of the first communication protocol or ii) a second mode of the first communication protocol to enable automatic detection of the first mode or the second mode by the receiver device. In an embodiment, the first field includes the first long training sequence. In another embodiment, the first field includes the second long training sequence.

In an embodiment, the method 2800 further includes: encoding a second plurality of information bits for a data field of the PHY data unit to generate a second plurality of encoded bits; mapping the second plurality of encoded bits to a second plurality of constellation symbols; generating a second plurality of modified constellation symbols, including multiplying the predetermined sequence by the second plurality of constellation symbols; generating a third plurality of orthogonal frequency division multiplexing (OFDM) symbols to include the second plurality of modified constellation symbols; and generating the data field to include the third plurality of OFDM symbols, where generating the PHY data unit includes generating the PHY data unit to include at least the preamble and the data field.

Figure 29:
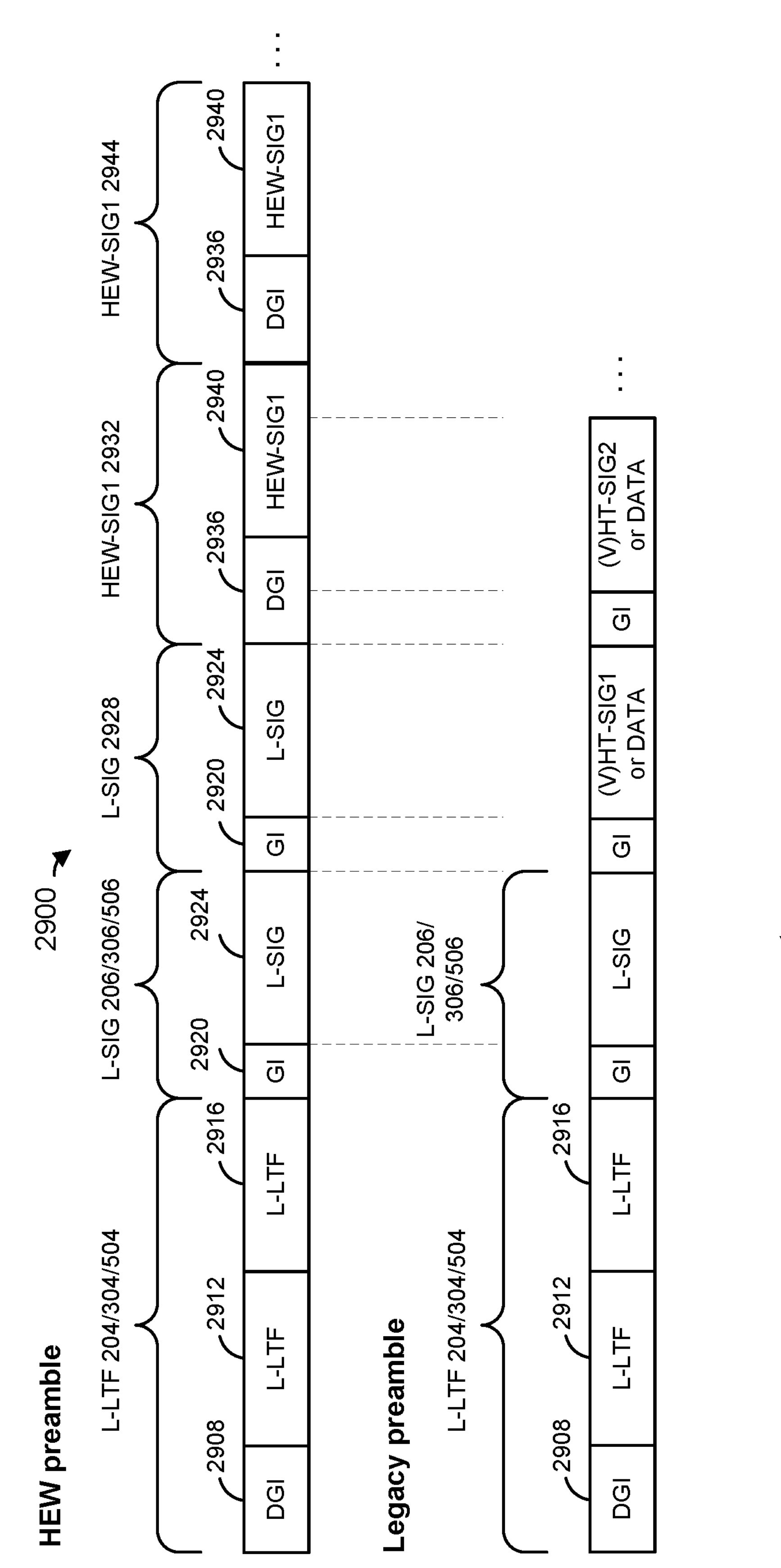
FIG. 29 is a diagram of a portion of an example PHY preamble that conforms to a first communication protocol, according to an embodiment, as compared to a portion of a preamble that conforms to a legacy protocol.

FIG. 29 is a diagram of a portion 2900 of an example PHY preamble that conforms to the HEW communication protocol, according to an embodiment, as compared to a portion 2904 of a preamble that conforms to a legacy protocol. In an embodiment, the network interface device 16 of the AP 14 is configured to generate and transmit a data unit including the PHY preamble 2900 to the client station 25-1 via orthogonal frequency domain multiplexing (OFDM) modulation, according to an embodiment. In an embodiment, the network interface device 27 of the client station 25-1 is configured to determine that a data unit including the preamble 2900 conforms to the first communication protocol using techniques discussed below.

In an embodiment, the network interface device 27 of the client station 25-1 is also configured to generate and transmit a data unit including the PHY preamble 2900 to the AP 14. In an embodiment, the network interface device 16 of the AP 14 is configured to determine that a data unit including the preamble 2900 conforms to the first communication protocol using techniques discussed below.

A data unit including the PHY preamble 2900 conforms to the first communication protocol and occupies a 20 MHz bandwidth, according to an embodiment. Data units that conform to the first communication protocol and including a preamble similar to the preamble 2900 may occupy other suitable bandwidth such as 40 MHz, 80 MHz, 160 MHz, 320 MHz, 640 MHz, for example, or other suitable bandwidths, in various other embodiments. The preamble 2900 is suitable for "mixed mode" situations, i.e., when the WLAN 10 includes a client station (e.g., the legacy client station 25-4) that conforms to a legacy communication protocol, but not the first communication protocol. The preamble 2900 is utilized in other situations as well, in some embodiments.

The preamble portion 2900 includes an L-LTF 204/304/504. In an embodiment, the L-LTF 204/304/504 includes a double guard interval 2908, a first L-LTF OFDM symbol 2912, and a second L-LTF OFDM symbol 2916. The preamble portion 2900 further includes an L-SIG 206/306/506, which includes a guard interval 2920 and an L-SIG OFDM symbol 2924, according to an embodiment. The L-LTF 204/304/504 and the L-SIG 206/306/506 are part of a first portion of the preamble 2900 that matches a corresponding first portion of the legacy preamble 2904 (e.g. a preamble that conforms to the IEEE 802.11a Standard, the IEEE 802.11g Standard, the IEEE 802.11n Standard, and/or the IEEE 802.11ac Standard), according to an embodiment. A legacy device is able to decode the L-SIG 206/306/506 and determine a length of a PHY data unit that includes the PHY preamble 2900. For example, the L-SIG 206/306/506 includes a length field set to a value that indicates a length of the PHY data unit that includes the PHY preamble 2900, in an embodiment.

The preamble 2900 includes a secondary L-SIG field 2928. In an embodiment, the L-SIG field 2928 is a duplicate of the L-SIG field 206/306/506. In an embodiment, a communication device configured to operate according to the first communication protocol is configured to detect repetition of the L-SIG field 206/306/506 in the preamble 2900, and based on the detected reception of the L-SIG field 206/306/506, determine that the preamble 2900 conforms to the first communication protocol. In an embodiment, upon detecting the repetition of the L-SIG fields 206/306/506, 2928, the receiving device uses duplication in the repeating L-SIG fields as additional training information to improve channel estimation, in an embodiment. In some embodiments, the receiving device first decodes the L-SIG 206/306/506, and then detects the repetition of the L-SIG fields 206/306/506, 2928 using the value of the length subfield in L-SIG 206/306/506. In another embodiment, the receiving device first detects the repetition of the L-SIG fields 206/306/506, 2928, and then combines the detected multiple L-SIG fields 206/306/506, 2928 to improve decoding reliability of the L-SIG fields 206/306/506, 2928 and/or uses the redundant information in the multiple L-SIG fields 206/306/506, 2928 to improve channel estimation.

In an embodiment, the preamble 2900 further includes a HEW-SIG1 field 2932, which includes a DGI 2936 and a HEW-SIG1 field OFDM symbol 2940. The preamble 2900 also includes a secondary HEW-SIG1 field 2944. In an embodiment, the HEW-SIG1 field 2944 is a duplicate of the HEW-SIG1 field 2932. In an embodiment, the receiving device conforming to the first communication protocol uses duplication in the repeating HEW-SIG1 fields 2932, 2944 as additional training information to improve channel estimation, in an embodiment. In another embodiment, the receiving device conforming to the first communication protocol combines the detected multiple HEW-SIG1 fields 2932, 2944 to improve decoding reliability of the HEW-SIG1 fields 2932, 2944 and/or uses the redundant information in the multiple HEW-SIG1 fields 2932, 2944 to improve channel estimation.

In an embodiment, the preamble portion 2900 is formatted such that a receiving device configured according to the first communication protocol is able to determine that the data unit including the preamble 2900 conforms to the first communication protocol. For example, in an embodiment, the LTF field 204/304/504 corresponds to the modified LTF field 2304 of FIG. 23, and the first legacy signal field 206/306/506 corresponds to the modified legacy signal field 2306 of FIG. 23, in an embodiment. In this embodiment, a receiving device that receives the data unit including the preamble 2900 is able to detect that the data unit conforms to the first communication protocol by performing a first cross-correlation of the LTF 204/304/504 using the long training sequence of the legacy communication protocol and a second cross-correlation of the LTF field 204/304/504 using the modified long training sequence of the first communication protocol, as described above with respect to FIG. 23, in an embodiment.

In an embodiment, the preamble portion 3201 of the data unit 3200 is additionally formatted such that a legacy communication device is able to determine that the data unit 3200 does not conform to the legacy communication protocol. For example, in an embodiment, the first L-SIG field 3202, the second L-SIG field 3204 and the HEW-SIG1 field 3208 is each modulated such that a receiving device will detect BPSK modulation in OFDM symbols at the corresponding location in the legacy data unit format 3220. For example, upon detecting BPSK modulation in OFDM symbols corresponding to the first L-SIG field 3202, the second L-SIG field 3204 and the HEW-SIG1 field 3206, the receiving device will stop processing the data unit 3200, and will refrain from accessing the medium for a duration determined based on the L-SIG field 3204, in an embodiment.

Figure 30:
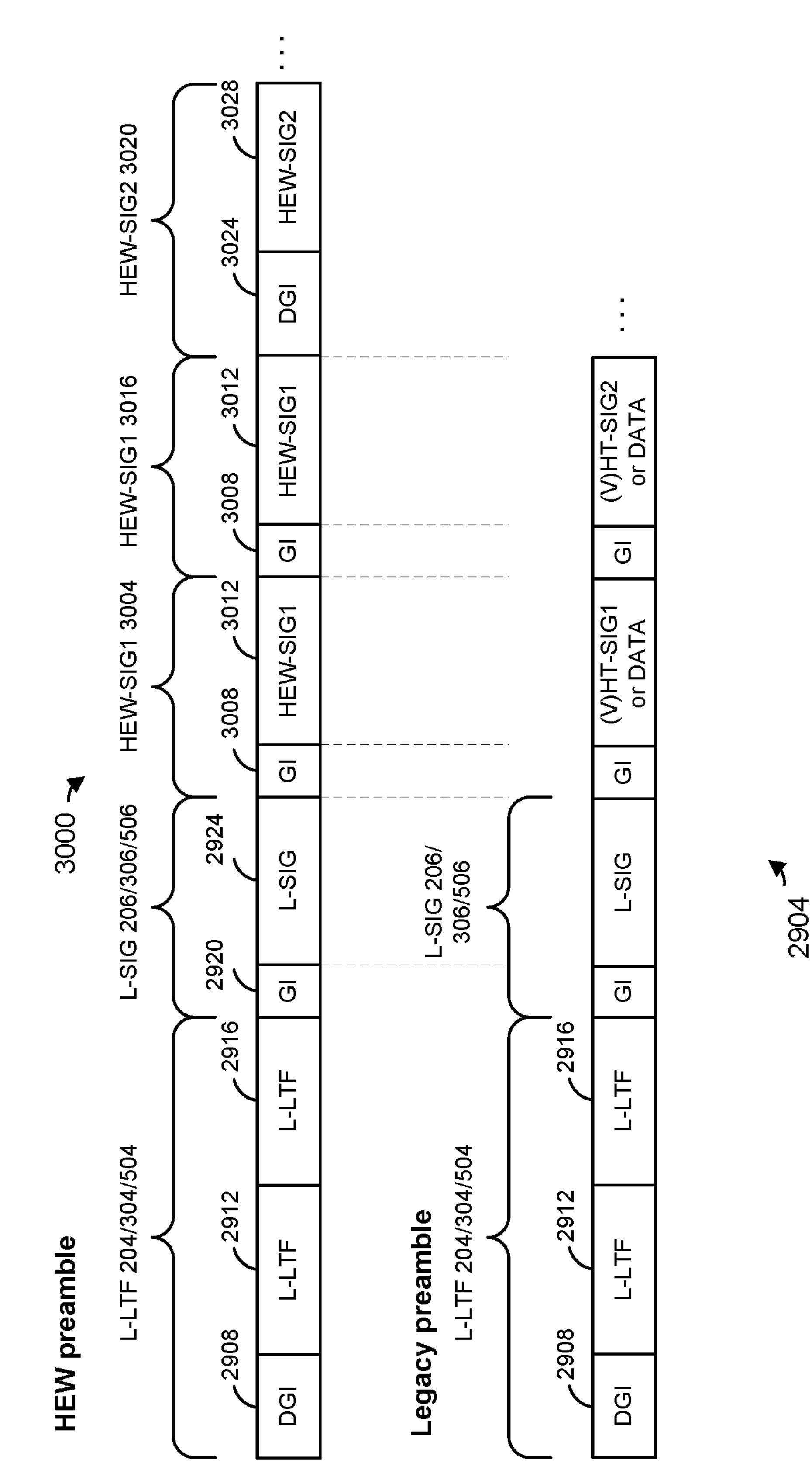
FIG. 30 is a diagram of a portion of another example PHY preamble that conforms to a first communication protocol, according to another embodiment, as compared to the portion of the preamble that conforms to a legacy protocol.

FIG. 30 is a diagram of a portion 3000 of an example PHY preamble that conforms to the first communication protocol, according to another embodiment, as compared to the portion 2904 of the preamble that conforms to the legacy protocol. The preamble 3000 is similar to the preamble 2900 of FIG. 29, and like-numbered elements are not discussed in detail for purposes of brevity. In an embodiment, the network interface device 16 of the AP 14 is configured to generate and transmit a data unit including the PHY preamble 3000 to the client station 25-1 via OFDM modulation, according to an embodiment. In an embodiment, the network interface device 27 of the client station 25-1 is configured to determine that a data unit including the preamble 3000 conforms to the first communication protocol using techniques discussed below.

In an embodiment, the network interface device 27 of the client station 25-1 is also configured to generate and transmit a data unit including the PHY preamble 3000 to the AP 14. In an embodiment, the network interface device 16 of the AP 14 is configured to determine that a data unit including the preamble 3000 conforms to the first communication protocol using techniques discussed below.

A data unit including the PHY preamble 3000 conforms to the first communication protocol and occupies a 20 MHz bandwidth, according to an embodiment. Data units that conform to the first communication protocol and including a preamble similar to the preamble 3000 may occupy other suitable bandwidth such as 40 MHz, 80 MHz, 160 MHz, 320 MHz, 640 MHz, for example, or other suitable bandwidths, in various other embodiments. The preamble 3000 is suitable for "mixed mode" situations, i.e., when the WLAN 10 includes a client station (e.g., the legacy client station 25-4) that conforms to a legacy communication protocol, but not the first communication protocol. The preamble 3000 is utilized in other situations as well, in some embodiments.

Unlike the preamble 2900, the preamble 3000 omits the secondary L-SIG 2928. Additionally, unlike the preamble 2900, HEW-SIG1 3004 includes a GI 3008, rather than a DGI. HEW-SIG1 3004 also includes a HEW-SIG1 OFDM symbol 3012. HEW-SIG1 3016 is a duplicate of HEW-SIG1 3004, in an embodiment. The preamble 3000 also includes a HEW-SIG2 3020, which includes a DGI 3024 and a HEW-SIG2 OFDM symbol 3028.

The L-LTF 204/304/504 and the L-SIG 206/306/506 are part of a first portion of the preamble 3000 that matches a corresponding first portion of the legacy preamble 2904 (e.g. a preamble that conforms to the IEEE 802.11a Standard, the IEEE 802.11g Standard, the IEEE 802.11n Standard, and/or the IEEE 802.11ac Standard), according to an embodiment. A legacy device is able to decode the L-SIG 206/306/506 and determine a length of a PHY data unit that includes the PHY preamble 3000. For example, the L-SIG 206/306/506 includes a length field set to a value that indicates a length of the PHY data unit that includes the PHY preamble 3000, in an embodiment.

In an embodiment, a communication device configured to operate according to the HEW protocol is configured to detect repetition of the HEW-SIG1 fields 3004, 3016 in the preamble 3000, and based on the detected repetition of the HEW-SIG1 fields 3004, 3016, determine that the preamble 3000 conforms to the HEW communication protocol.

In an embodiment, the receiving device conforming to the HEW protocol uses duplication in the repeating HEW-SIG1 fields 3004, 3016 as additional training information to improve channel estimation, in an embodiment. In another embodiment, the receiving device conforming to the HEW protocol combines the detected multiple 3004, 3016 to improve decoding reliability of the HEW-SIG1 fields 3004, 3016 and/or uses the redundant information in the multiple HEW-SIG1 fields 3004, 3016 to improve channel estimation.

FIG. 31 is a diagram of a portion 3100 of an example PHY preamble that conforms to the first communication protocol, according to another embodiment, as compared to the portion 2904 of the preamble that conforms to the legacy protocol. The preamble 3100 is similar to the preamble 2900 of FIG. 29 and the preamble 3000 of FIG. 30, and like-numbered elements are not discussed in detail for purposes of brevity.

In an embodiment, the network interface device 16 of the AP 14 is configured to generate and transmit a data unit including the PHY preamble 3100 to the client station 25-1 via OFDM modulation, according to an embodiment. In an embodiment, the network interface device 27 of the client station 25-1 is configured to determine that a data unit including the preamble 3100 conforms to the first communication protocol using techniques discussed below.

In an embodiment, the network interface device 27 of the client station 25-1 is also configured to generate and transmit a data unit including the PHY preamble 3100 to the AP 14. In an embodiment, the network interface device 16 of the AP 14 is configured to determine that a data unit including the preamble 3100 conforms to the first communication protocol using techniques discussed below.

A data unit including the PHY preamble 3100 conforms to the first communication protocol and occupies a 20 MHz bandwidth, according to an embodiment. Data units that conform to the first communication protocol and including a preamble similar to the preamble 3100 may occupy other suitable bandwidth such as 40 MHz, 80 MHz, 160 MHz, 320 MHz, 640 MHz, for example, or other suitable bandwidths, in various other embodiments. The preamble 3100 is suitable for "mixed mode" situations, i.e., when the WLAN 10 includes a client station (e.g., the legacy client station 25-4) that conforms to a legacy communication protocol, but not the first communication protocol. The preamble 3100 is utilized in other situations as well, in some embodiments.

Unlike the preamble 2900, HEW-SIG1 3004 includes a GI 3008, rather than a DGI. HEW-SIG1 3004 also includes a HEW-SIG1 OFDM symbol 3012. HEW-SIG1 3016 is a duplicate of HEW-SIG1 3004, in an embodiment. The preamble 3100 also includes a HEW-SIG2 3020, which includes a DGI 3024 and a HEW-SIG2 OFDM symbol 3028.

Unlike the preamble 3000, preamble 3100 includes the secondary L-SIG field 2928. In an embodiment, the L-SIG field 2928 is a duplicate of the L-SIG field 206/306/506.

The L-LTF 204/304/504 and the L-SIG 206/306/506 are part of a first portion of the preamble 3000 that matches a corresponding first portion of the legacy preamble 2904 (e.g. a preamble that conforms to the IEEE 802.11a Standard, the IEEE 802.11g Standard, the IEEE 802.11n Standard, and/or the IEEE 802.11ac Standard), according to an embodiment. A legacy device is able to decode the L-SIG 206/306/506 and determine a length of a PHY data unit that includes the PHY preamble 3000. For example, the L-SIG 206/306/506 includes a length field set to a value that indicates a length of the PHY data unit that includes the PHY preamble 3000, in an embodiment.

In an embodiment, a communication device configured to operate according to the HEW protocol is configured to detect repetition of the L-SIG field 206/306/506 in the preamble 2900, and based on the detected repetition of the L-SIG field 206/306/506, determine that the preamble 2900 conforms to the HEW communication protocol. In an embodiment, upon detecting the repetition of the L-SIG fields 206/306/506, 2928, the receiving device uses duplication in the repeating L-SIG fields as additional training information to improve channel estimation, in an embodiment. In some embodiments, the receiving device first decodes the L-SIG 206/306/506, and then detects the repetition of the L-SIG fields 206/306/506, 2928 using the value of the length subfield in L-SIG 206/306/506. In another embodiment, the receiving device first detects the repetition of the L-SIG fields 206/306/506, 2928, and then combines the detected multiple L-SIG fields 206/306/506, 2928 to improve decoding reliability of the L-SIG fields 206/306/506, 2928 and/or uses the redundant information in the multiple L-SIG fields 206/306/506, 2928 to improve channel estimation.

In an embodiment, a communication device configured to operate according to the HEW protocol is configured to detect repetition of the HEW-SIG1 fields 3004, 3016 in the preamble 3000, and based on the detected repetition of the HEW-SIG1 fields 3004, 3016, determine that the preamble 3000 conforms to the HEW communication protocol.

In an embodiment, the receiving device conforming to the HEW protocol uses duplication in the repeating HEW-SIG1 fields 3004, 3016 as additional training information to improve channel estimation, in an embodiment. In another embodiment, the receiving device conforming to the HEW protocol combines the detected multiple 3004, 3016 to improve decoding reliability of the HEW-SIG1 fields 3004, 3016 and/or uses the redundant information in the multiple HEW-SIG1 fields 3004, 3016 to improve channel estimation.

Figure 32:
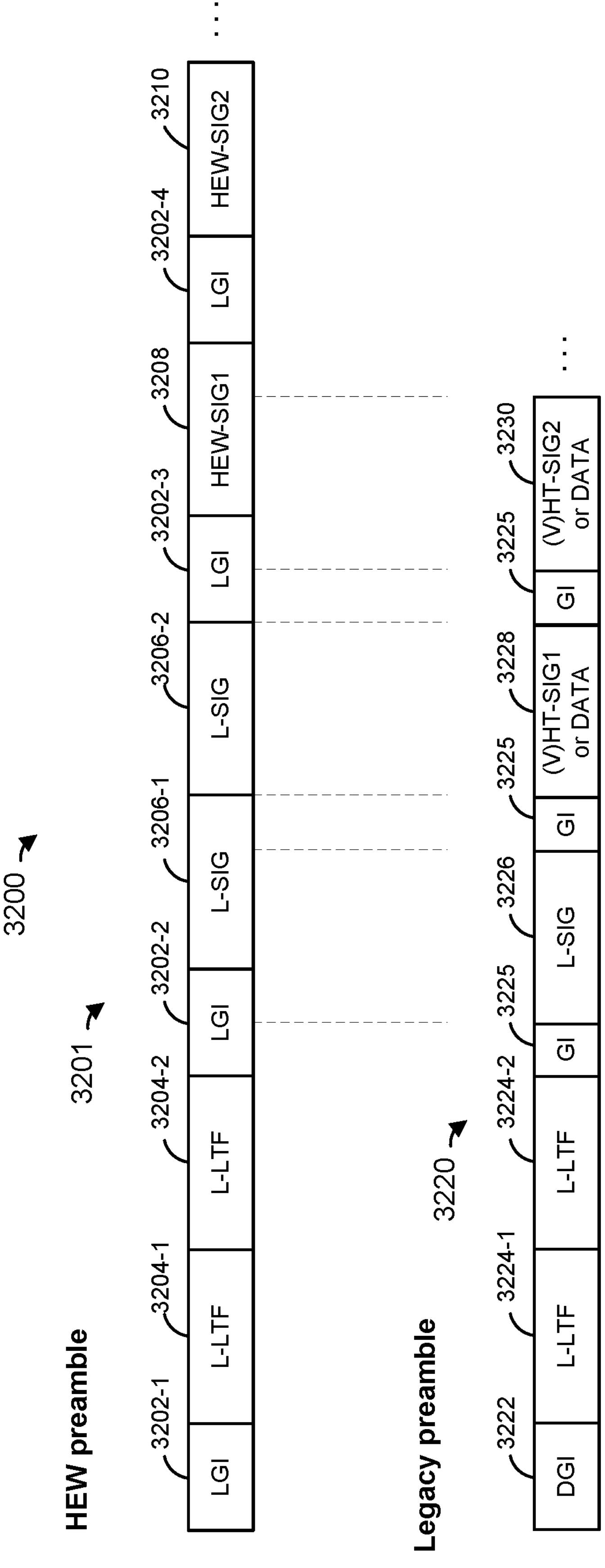
FIG. 32 is a diagram of a portion of another example PHY preamble that conforms to a first communication protocol, according to another embodiment, as compared to the portion of the preamble that conforms to a legacy protocol.

FIG. 32 is a diagram of a portion of a preamble 3200 of an OFDM data unit that the network interface device 16 of the AP 14 is configured to generate and transmit to the client station 25-1 via OFDM modulation, according to an embodiment. In an embodiment, the network interface device 27 of the client station 25-1 is configured to determine that a data unit including the preamble 3200 conforms to the first communication protocol using techniques discussed below.

In an embodiment, the network interface device 27 of the client station 25-1 is also configured to transmit a data unit including the preamble 3200 to the AP 14. In an embodiment, the network interface device 16 of the AP 14 is configured to determine that a data unit including the preamble 3200 conforms to the first communication protocol using techniques discussed below.

A data unit including the preamble 3200 conforms to the first communication protocol and occupies a 20 MHz bandwidth. Data units that conform to the first communication protocol having preambles similar to the preamble 3200 may occupy other suitable bandwidth such as 40 MHz, 80 MHz, 160 MHz, 320 MHz, 640 MHz, for example, or other suitable bandwidths, in other embodiments. The data unit including the preamble 3200 is suitable for "mixed mode" situations, i.e., when the WLAN 10 includes a client station (e.g., the legacy client station 25-4) that conforms to a legacy communication protocol, but not the first communication protocol. The data unit including the preamble 3200 is utilized in other situations as well, in some embodiments.

The preamble 3200 includes a preamble portion 3210 having a first long guard interval 3202, a long training field 3204 having a first portion 3204-1 and a second portion 3204-2, a second long guard interval 3206, a first L-SIG field 3206-1, a second L-SIG field 3206-2, a third long guard interval 3202, a first HEW signal field HEW-SIG1 3208, a fourth long guard interval 3202 and a second HEW signal field HEW-SIG2 3210. In an embodiment, the first L-SIG field 3602-1 corresponds to the L-SIG field 706 of the data unit 700, and second L-SIG field 3602-2 is a duplicate of the first L-SIG field 3602-1. In an embodiment, each long guard interval 3202 is a double guard interval that is twice as long as a regular guard interval defined by the legacy communication protocol. For example, whereas the regular guard interval defined by the legacy communication protocol is 0.8 us, the double guard interval is 1.6 us, in an embodiment. In another embodiment, each of the long guard intervals 3202 has another suitable value that is greater than the regular guard interval defined by the legacy communication protocol. For example, whereas the regular guard interval defined by the legacy communication protocol is 0.8 us, the long guard interval is 1.2 us, 2.4 us, 3.2 us, or another suitable value greater than 0.8 us, in various embodiments.

With continued reference to FIG. 32, a legacy data unit format 3220 is illustrated for reference. A data unit that conforms to the format 3220 includes a double guard interval 3222, a long training field 3224 having a first portion 3224-1 and a second portion 3224-2, a first regular guard interval 3225, an L-SIG field 3226, an OFDM symbol 3228 that corresponds to a signal field (HT-SIG1 field or VHT-SIG1 field, for example), or an OFDM symbol of a data portion, depending on the particular legacy protocol to which the data unit 3200 corresponds, a third regular guard interval 3225, and an OFDM symbol 3230 that corresponds to a signal field (HT-SIG2 field or VHT-SIG2 field, for example), or an OFDM symbol of the data portion, depending on the particular legacy protocol to which the format 3200 corresponds.

In an embodiment, the preamble portion 3201 of the data unit 3200 is formatted such that a receiving device configured according to the first communication protocol is able to determine that the data unit 3200 corresponds to the first communication protocol. For example, in an embodiment, the L-LTF field 3204 corresponds to the modified LTF field 2304 of FIG. 23, and the first legacy signal field 3206 corresponds to the modified legacy signal field 2306 of FIG. 23, in an embodiment. In this embodiment, a receiving device that receives the data unit 3200 is able to detect that the data unit 3200 conforms to the first communication protocol by performing a first cross-correlation of the long training field 3202 using the long training sequence of the legacy communication protocol and a second cross-correlation of the L-LTF field 3202 using the modified long training sequence of the first communication protocol, as described above with respect to FIG. 23, in an embodiment. Additionally or alternatively, in an embodiment, a receiving device that receives the data unit 3200 is able to detect that the data unit 3200 conforms to the first communication protocol by detecting presence of the second L-SIG field 3205 in the preamble portion 3201.

In an embodiment, the preamble portion 3201 of the preamble 3200 is additionally formatted such that a legacy communication device is able to determine that a data unit including the preamble 3200 does not conform to the legacy communication protocol. For example, in an embodiment, the first L-SIG field 3202, the second L-SIG field 3204 and the HEW-SIG1 field 3208 is each modulated such that a receiving device will detect BPSK modulation in OFDM symbols at the corresponding location in the legacy data unit format 3220. For example, upon detecting BPSK modulation in OFDM symbols corresponding to the first L-SIG field 3202, the second L-SIG field 3204 and the HEW-SIG1 field 3206, the receiving device will stop processing the data unit 3200, and will refrain from accessing the medium for a duration determined based on the L-SIG field 3204, in an embodiment. As illustrated in FIG. 32, the first L-SIG field 3204, in time domain, is not aligned with the corresponding OFDM symbol L-SIG 3224 in the legacy preamble 3220 due to the long guard interval that precedes the L-SIG field 3210, in an embodiment. On the other hand, the second L-SIG field 3212 is aligned with the corresponding OFDM symbol 3228 in the legacy preamble 3220. The HEW-SIG1 field is misaligned, in time domain, with the corresponding OFDM symbol 3230 in the legacy preamble, similar to the first L-SIG field 3208, in the illustrated embodiment.

In an embodiment, constellation points of the first L-SIG field 3206-1 and of the HEW-SIG1 field 3208 are pre-rotated such that the constellation points are seen as BPSK in the shifted FFT window used by a legacy communication device with the corresponding OFDM symbols of the legacy format 3220. In an embodiment, the constellation points of the first L-SIG field 3206-1 and of the HEW-SIG1 field 3208 are rotated by an amount determined by the length of the long guard interval by the duration of the long guard interval. For example, in an embodiment in which the long guard interval is twice as long as the regular guard interval define by the legacy communication protocol, constellation points of each of the first L-SIG field 3206-1 and of the HEW-SIG1 field 3208 are rotated by 90 degrees, as described above with respect to FIGS. 14B-14C. As a result, the first L-SIG field 3206-1 and of the HEW-SIG1 field 3208 is each modulated using reversed QBPSK (R-QBPSK) modulation, in this embodiment.

In an embodiment, the second L-SIG field 3206-2 is aligned with the corresponding OFDM symbol 3228 in the legacy format 3220 and, accordingly, the second L-SIG field 3206-2 is modulated using BPSK modulation. In this embodiment, a cyclic prefix of the second L-SIG field 3206-2 does not match a last portion of the first L-SIG field 3206-1, in an embodiment.

FIG. 33 is a diagram of a portion 3300 of a preamble of an OFDM data unit that the network interface device 16 of the AP 14 is configured to transmit to the client station 25-1 via OFDM modulation, according to an embodiment. In an embodiment, the network interface device 27 of the client station 25-1 is configured to determine that a data unit including the preamble 3300 conforms to the first communication protocol using techniques discussed below.

In an embodiment, the network interface device 27 of the client station 25-1 is also configured to transmit a data unit including the preamble 3300 to the AP 14. In an embodiment, the network interface device 16 of the AP 14 is configured to determine that a data unit including the preamble 3300 conforms to the first communication protocol using techniques discussed below.

The data unit including the preamble 3300 conforms to the first communication protocol and occupies a 20 MHz bandwidth. Data units that conform to the first communication protocol and having preambles similar to the preamble 3300 may occupy other suitable bandwidth such as 40 MHz, 80 MHz, 160 MHz, 320 MHz, 640 MHz, for example, or other suitable bandwidths, in other embodiments.

The preamble 3300 is similar to the preamble 3200 of FIG. 2, except that in a preamble portion 3301 of the preamble 3300, the second long guard interval 3202-2 is replaced by a regular guard interval 3302, and the second L-SIG field 3206-2 is omitted from the data unit 3300. Additionally, the preamble portion 3301 includes a first HEW-SIG1 field 3208-1 and a second HEW-SIG1 field 3208-2, as compared to a single HEW-SIG1 field 3208 of the preamble 3200. In an embodiment, the second HEW-SIG1 field 3208-2 is a duplicate of the first HEW-SIG1 field 3208-1.

In an embodiment, the L-SIG field 3206 and the second HEW-SIG1 field 3208-2 is each aligned with its corresponding OFDM symbol in the legacy format 3220. On the other hand, the first HEW-SIG1 field 3208-1 is misaligned with its corresponding OFDM symbol of the legacy format 3220. In an embodiment, constellation points of the first HEW-SIG field 3208-1 are pre-rotated (e.g., by 90 degrees) such that a receiving device will detect BPSK modulation in the shirted FFT window corresponding to the OFDM symbol 3228. In an embodiment, the second HEW-SIG1 field 3208-2 is modulated using BPSK modulation so that a receiving device can detect BPSK modulation of the corresponding OFDM symbol 3330 in the legacy format 3200. However, in this case, modulation of the second HEW-SIG1 field 3208-2 (BPSK) differs from modulation of the first HEW-SIG1 field 3208-1 (e.g., R-QBPSK), in an embodiment. As a result, the cyclic prefix of the second HEW-SIG1 field 3208-2 does not exactly match the corresponding last portion of the first HEW-SIG1 field 3208-1.

Alternatively, in another embodiment, the second HEW-SIG1 field 3208-2 is modulated with the same modulation as the first HEW-SIG1 field 3208-1 (e.g., R-QBPSK). In this embodiment, the cyclic prefix of the second signal field HEW-SIG1 field 3208-2 matches the last portion of the first signal field HEW-SIG1 field 3208-1, allowing a non-legacy device to more accurately detect that a data unit including the preamble 3300 corresponds to the first communication protocol based on detecting repetition of the HEW-SIG1 field in the data unit 3300. Further, in this embodiment, a legacy device will detect a shifted modulation (e.g., QPSK) in the corresponding OFDM symbol 3230, which may result in misdetection of the data unit 3200 as a data unit that conforms to the IEEE-802-11ac Standard. However, the legacy device will interpret the second HEW-SIG1 field 3208-2 as a VHT-SIG2 field, and will fail the CRC check of the VHT-SIG2 field. In an embodiment, according to the IEEE 802.11ac Standard, the legacy device will then discard the data unit having the preamble 3300 and will refrain from accessing the medium for the duration indicated in the L-SIG field 3206, in an embodiment. Various methods for ensuring that a legacy device detects a CRC error based on decoding the second HEW-SIG1 field 3208-2 are described in U.S. patent application Ser. No. 13/856,277, filed Apr. 4, 2013, which is hereby incorporated by reference in its entirety.

FIG. 34 is a diagram of a portion 3400 of a preamble of an OFDM data unit that the network interface device 16 of the AP 14 is configured to transmit to the client station 25-1 via OFDM modulation, according to an embodiment. In an embodiment, the network interface device 27 of the client station 25-1 is configured to determine that a data unit including the preamble 3400 conforms to the first communication protocol using techniques discussed below.

In an embodiment, the network interface device 27 of the client station 25-1 is also configured to transmit a data unit including the preamble 3400 to the AP 14. In an embodiment, the network interface device 16 of the AP 14 is configured to determine that a data unit including the preamble 3400 conforms to the first communication protocol using techniques discussed below.

The data unit including the preamble 3400 conforms to the first communication protocol and occupies a 20 MHz bandwidth. Data units that conform to the first communication protocol and having preambles similar to the preamble 3400 may occupy other suitable bandwidth such as 40 MHz, 80 MHz, 160 MHz, 320 MHz, 640 MHz, for example, or other suitable bandwidths, in other embodiments.

The preamble 3400 is similar to the preamble 3200 of FIG. 32, except that a preamble portion 3401 of the preamble 3400 includes long guard intervals between the OFDM symbols of the preamble portion 3401, and does not include duplication of the L-SIG field 3206, in an embodiment. Additionally, unlike in the preamble 3200, pre-rotation of constellation points in OFDM symbols of the preamble 3400 that are misaligned with corresponding OFDM symbols in the legacy format 3220, in the illustrated embodiment.

Figure 35:
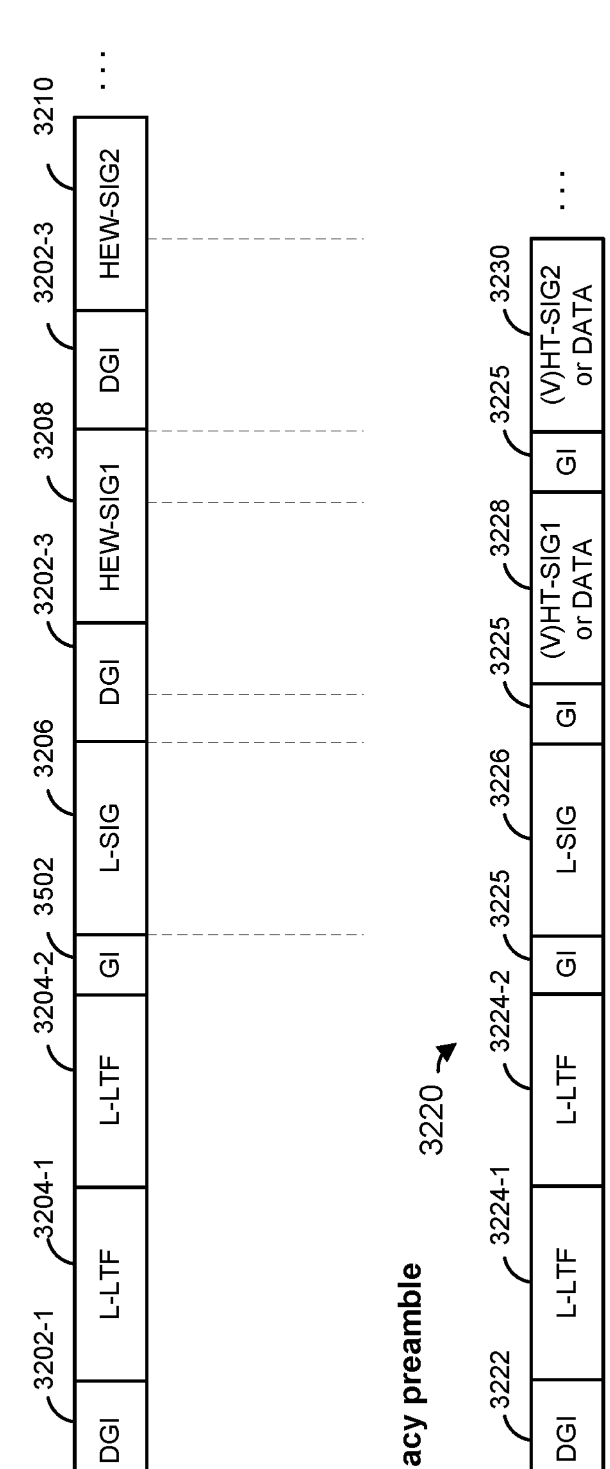
FIG. 35 is a diagram of a portion of another example PHY preamble that conforms to a first communication protocol, according to another embodiment, as compared to the portion of the preamble that conforms to a legacy protocol.

FIG. 35 is a diagram of a portion 3500 of a preamble of an OFDM data unit that the network interface device 16 of the AP 14 is configured to transmit to the client station 25-1 via orthogonal frequency domain multiplexing (OFDM) modulation, according to an embodiment. In an embodiment, the network interface device 27 of the client station 25-1 is configured to determine that a data unit including the preamble 3500 conforms to the first communication protocol using techniques discussed below.

In an embodiment, the network interface device 27 of the client station 25-1 is also configured to transmit a data unit including the preamble 3500 to the AP 14. In an embodiment, the network interface device 16 of the AP 14 is configured to determine that a data unit including the preamble 3500 conforms to the first communication protocol using techniques discussed below.

The data unit including the preamble 3500 conforms to the first communication protocol and occupies a 20 MHz bandwidth. Data units that conform to the first communication protocol and having preambles similar to the preamble 3500 may occupy other suitable bandwidth such as 40 MHz, 80 MHz, 160 MHz, 320 MHz, 640 MHz, for example, or other suitable bandwidths, in other embodiments. The preamble 3500 in the same as the preamble 3400 of FIG. 34, except that in the preamble 3500 the second long guard interval 3302-2 is replaced with a regular guard interval 3502. In this case, the L-SIG field 3206 is aligned with its corresponding OFDM symbol (the L-SIG field 3226) in the legacy format 3220, in an embodiment.

FIG. 36 is a diagram of a portion 3600 of an example PHY preamble that conforms to the first communication protocol, according to another embodiment, as compared to the portion 2904 of the preamble that conforms to the legacy protocol. The preamble 3600 is similar to the preamble 2900 of FIG. 29, and like-numbered elements are not discussed in detail for purposes of brevity.

In an embodiment, the network interface device 16 of the AP 14 is configured to generate and transmit a data unit including the PHY preamble 3600 to the client station 25-1 via OFDM modulation, according to an embodiment. In an embodiment, the network interface device 27 of the client station 25-1 is configured to determine that a data unit including the preamble 3600 conforms to the first communication protocol using techniques discussed below.

In an embodiment, the network interface device 27 of the client station 25-1 is also configured to generate and transmit a data unit including the PHY preamble 3600 to the AP 14. In an embodiment, the network interface device 16 of the AP 14 is configured to determine that a data unit including the preamble 3600 conforms to the first communication protocol using techniques discussed below.

A data unit including the PHY preamble 3600 conforms to the first communication protocol and occupies a 20 MHz bandwidth, according to an embodiment. Data units that conform to the first communication protocol and including a preamble similar to the preamble 3600 may occupy other suitable bandwidth such as 40 MHz, 80 MHz, 160 MHz, 320 MHz, 640 MHz, for example, or other suitable bandwidths, in various other embodiments. The preamble 3600 is suitable for "mixed mode" situations, i.e., when the WLAN 10 includes a client station (e.g., the legacy client station 25-4) that conforms to a legacy communication protocol, but not the first communication protocol. The preamble 3600 is utilized in other situations as well, in some embodiments.

The HEW-SIG field 3604, in time domain, is not aligned with a corresponding OFDM symbol (V)HT-SIG1 field 3608 in the legacy preamble 2904 due to the long guard interval 2936 that precedes the HEW-SIG1 OFDM symbol 2940, in an embodiment.

In an embodiment, the constellation points of the HEW-SIG1 OFDM symbol 2940 are rotated by an amount determined by the length of the long guard interval 2936 by the duration of the long guard interval 2936. For example, in an embodiment in which the long guard interval is twice as long as the regular guard interval define by the legacy communication protocol, constellation points of the HEW-SIG1 OFDM symbol 2940 are rotated by 90 degrees, as described above with respect to FIGS. 14B-14C. As a result, the HEW-SIG1 field 3604 is modulated using reversed QBPSK (R-QBPSK) modulation, in an embodiment.

Figure 37:
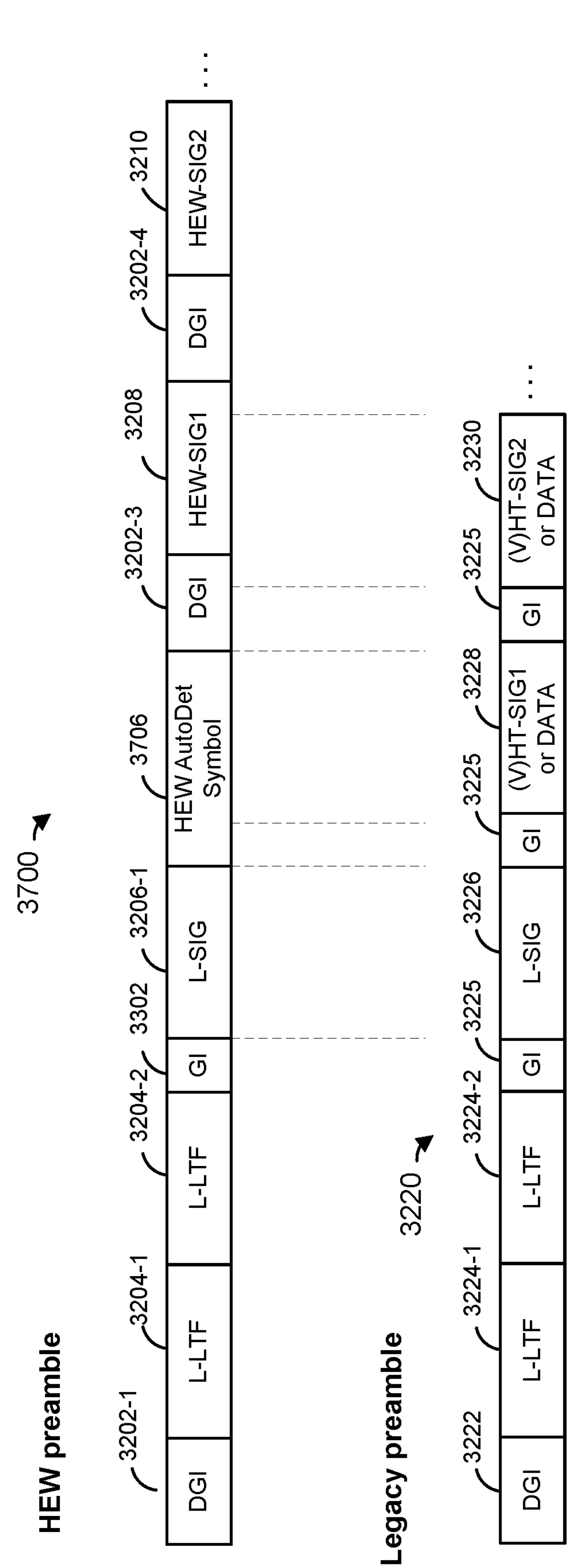
FIG. 37 is a diagram of a portion of another example PHY preamble that conforms to a first communication protocol, according to another embodiment, as compared to the portion of the preamble that conforms to a legacy protocol.

FIG. 37 is a diagram of a portion 3700 of a preamble of an OFDM data unit that the network interface device 16 of the AP 14 is configured to generate and transmit to the client station 25-1 via orthogonal frequency domain multiplexing (OFDM) modulation, according to an embodiment. In an embodiment, the network interface device 27 of the client station 25-1 is configured to determine that a data unit including the preamble 3700 conforms to the first communication protocol using techniques discussed below.

In an embodiment, the network interface device 27 of the client station 25-1 is also configured to generate and transmit a data unit including the preamble 3700 to the AP 14. In an embodiment, the network interface device 16 of the AP 14 is configured to determine that a data unit including the preamble 3700 conforms to the first communication protocol using techniques discussed below.

The data unit including the preamble 3700 conforms to the first communication protocol and occupies a 20 MHz bandwidth. Data units that conform to the first communication protocol and including preambles similar to the preamble 3700 may occupy other suitable bandwidth such as 40 MHz, 80 MHz, 160 MHz, 320 MHz, 640 MHz, for example, or other suitable bandwidths, in other embodiments.

The preamble 3700 is similar to the preamble 3300 of FIG. 33, except that the preamble 3700 omits the second (duplicate) HEW-SIG1 field 3208-2, and includes an auto-detection OFDM symbol 3706. In an embodiment, a receiving device is able to detect that a data unit including the preamble 3700 conforms to the first communication protocol based on detecting the auto-detection OFDM symbol 3706 in the data unit 3700. The auto-detection symbol 3706 immediately follows the L-SIG field 3206, in the illustrated embodiment. The auto-detection symbol 3706 aligned with its corresponding OFDM symbol in the legacy data unit format 3220, and is modulated using BPSK modulation, at least with respect to non-zero tones of a tone of the corresponding OFDM symbol in the legacy format 3220, in an embodiment. In an embodiment, a long guard interval 3710 is used with the HEW-SIG1 field 3208 of the preamble 3700. In an embodiment, the HEW-SIG1 field 3208 of the preamble 3700 is misaligned with the corresponding OFDM symbol in the legacy format 3220. In an embodiment, constellation points of the HEW-SIG1 field 3208 are pre-rotated (e.g., by 90 degrees) so that a legacy receiving device will detect BPSK modulation using the FFT window of the corresponding OFDM symbol in the legacy format 3220.

Figures 38A, 38B, 38C, 38D:
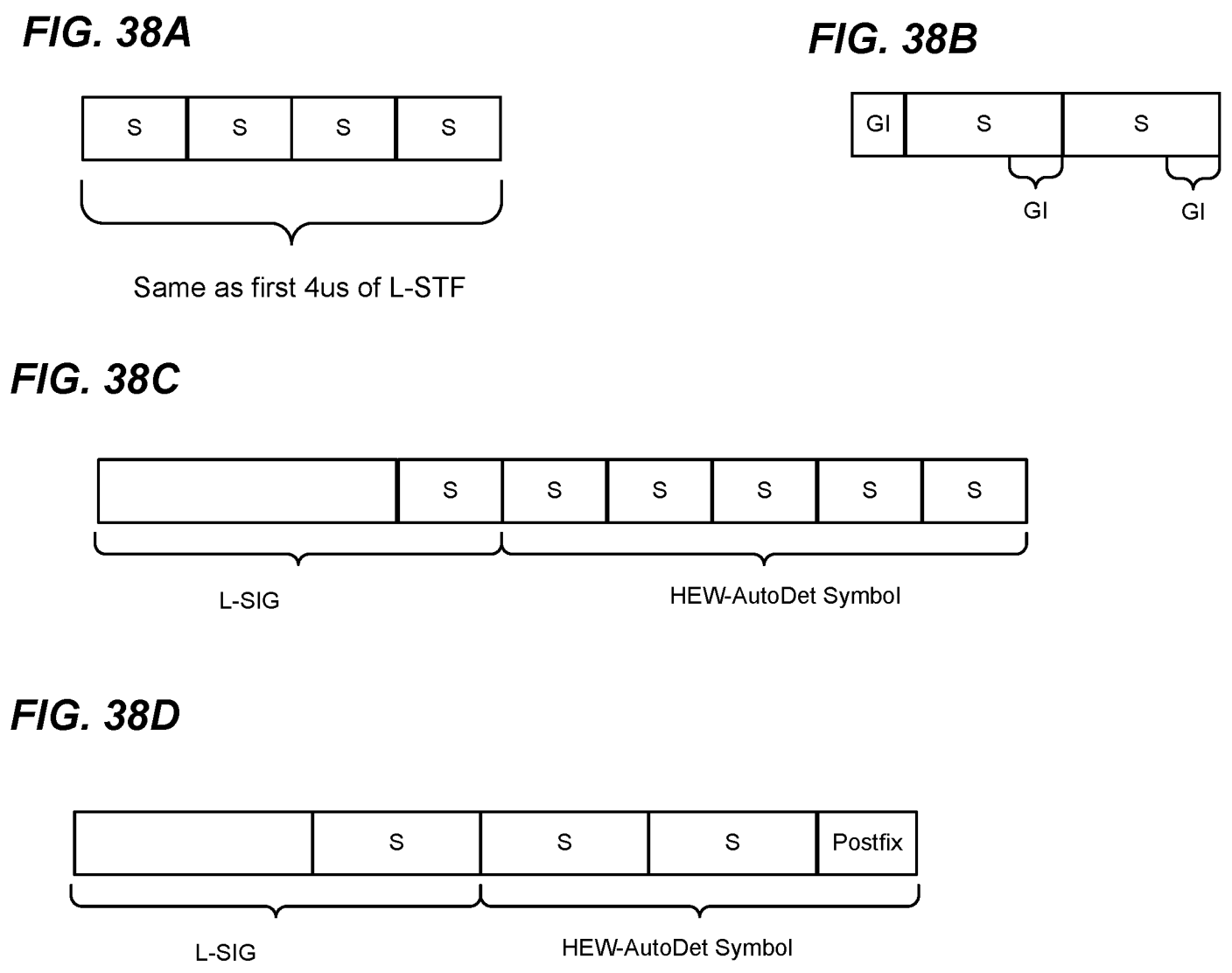

FIGS. 38A-38D are diagrams illustrating the auto-detection OFDM symbol 3706 of the data unit 3700, according to several example embodiments. Turning first to FIG. 38A, in an embodiment, the auto-detection OFDM symbol 3706 includes five repetitions of the L-LTF sequence defined by the legacy communication protocols. In this embodiment, a non-legacy receiving device is able to detect that the data unit 3700 conforms to the first communication protocol by re-using start of packet detection algorithm used for detecting the start of the data unit 3700 based on an L-STF field included in the beginning of the data unit 3700. Turning now to FIG. 38B, in an embodiment, the auto-detection OFDM symbol 3706 includes two repetitions of a suitable predetermined sequence that is longer (corresponds to more OFDM tones) compared to the L-STF sequence defined by the legacy communication protocol. For example, the predetermined sequence includes values corresponding to every other OFDM tone (e.g., OFDM tones having indices in the set [+/−2, +/4, +/−6, etc.]) within each 20 MHz band of the data unit 3700, in an embodiment. Turning now to FIG. 38C, in an embodiment, the auto-detection OFDM symbol 3706 includes five repetitions of a last portion (e.g., last 0.8 us) of the L-SIG field 3206. Turning now to FIG. 38C, in an embodiment, the auto-detection OFDM symbol 3706 includes two repetitions of a larger portion (e.g., 1.6 us) of the L-SIG field 3206, followed by a postfix portion that includes a sub-portion of the larger portion (e.g., 0.8 us) of the L-SIG field 3206.

In other embodiments, the auto-detection OFDM symbol 3706 includes any other suitable predetermined sequence that can be used at a receiving device to auto-detect that the data unit including the preamble 3700 conforms to the first communication protocol. For example, the auto-detection OFDM symbol 3706 includes a pre-determined Barker code sequence, a pre-determined Golay code sequence, or any other suitable pre-determined sequence, in various embodiments. A receiving device detects that the data unit including the preamble 3700 conforms to the first communication protocol by detecting a high correlation of the auto-detection OFDM symbol 3706 with the predetermined sequence, in an embodiment.

FIG. 39 is a diagram of a portion 3900 of an example PHY preamble that conforms to the first communication protocol, according to another embodiment, as compared to the portion 2904 of the preamble that conforms to the legacy protocol. The preamble 3900 is similar to the preamble 2900 of FIG. 29, and like-numbered elements are not discussed in detail for purposes of brevity.

In an embodiment, the network interface device 16 of the AP 14 is configured to generate and transmit a data unit including the PHY preamble 3900 to the client station 25-1 via OFDM modulation, according to an embodiment. In an embodiment, the network interface device 27 of the client station 25-1 is configured to determine that a data unit including the preamble 3900 conforms to the first communication protocol using techniques discussed below.

In an embodiment, the network interface device 27 of the client station 25-1 is also configured to generate and transmit a data unit including the PHY preamble 3900 to the AP 14. In an embodiment, the network interface device 16 of the AP 14 is configured to determine that a data unit including the preamble 3900 conforms to the first communication protocol using techniques discussed below.

A data unit including the PHY preamble 3900 conforms to the first communication protocol and occupies a 20 MHz bandwidth, according to an embodiment. Data units that conform to the first communication protocol and including a preamble similar to the preamble 3900 may occupy other suitable bandwidth such as 40 MHz, 80 MHz, 160 MHz, 320 MHz, 640 MHz, for example, or other suitable bandwidths, in various other embodiments. The preamble 3900 is suitable for "mixed mode" situations, i.e., when the WLAN 10 includes a client station (e.g., the legacy client station 25-4) that conforms to a legacy communication protocol, but not the first communication protocol. The preamble 3900 is utilized in other situations as well, in some embodiments.

The L-SIG 206/36/506, the L-SIG 2928, and the HEW-SIG1 2932 are modulated using BPSK, whereas the HEW-SIG1 2944 is modulated using rotated BPSK (e.g., Q-BPSK), according to an embodiment.

Figures 40A, 40B:
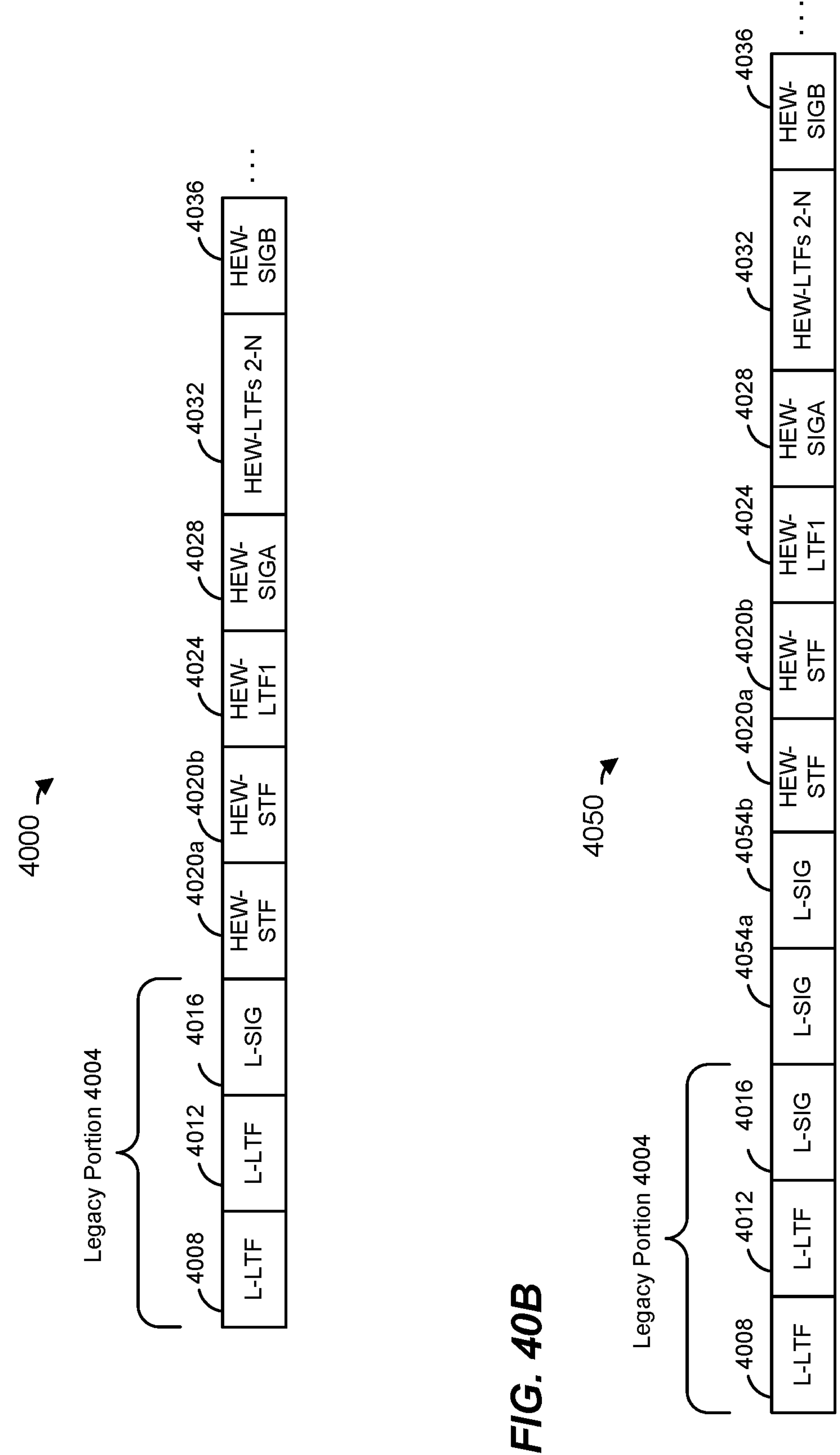
FIG. 40A is a diagram of a portion of another example PHY preamble that conforms to a first communication protocol, according to another embodiment.
FIG. 40B is a diagram of a portion of another example PHY preamble that conforms to a first communication protocol, according to another embodiment.

FIG. 40A is a diagram of a portion 4000 of another example PHY preamble that conforms to the first communication protocol, according to another embodiment.

In an embodiment, the network interface device 16 of the AP 14 is configured to generate and transmit a data unit including the PHY preamble 4000 to the client station 25-1 via OFDM modulation, according to an embodiment. In an embodiment, the network interface device 27 of the client station 25-1 is configured to determine that a data unit including the preamble 4000 conforms to the first communication protocol using techniques discussed below.

In an embodiment, the network interface device 27 of the client station 25-1 is also configured to generate and transmit a data unit including the PHY preamble 4000 to the AP 14. In an embodiment, the network interface device 16 of the AP 14 is configured to determine that a data unit including the preamble 4000 conforms to the first communication protocol using techniques discussed below.

A data unit including the PHY preamble 4000 conforms to the first communication protocol and occupies a 20 MHz bandwidth, according to an embodiment. Data units that conform to the first communication protocol and including a preamble similar to the preamble 4000 may occupy other suitable bandwidth such as 40 MHz, 80 MHz, 160 MHz, 320 MHz, 640 MHz, for example, or other suitable bandwidths, in various other embodiments. The preamble 4000 is suitable for "mixed mode" situations, i.e., when the WLAN 10 includes a client station (e.g., the legacy client station 25-4) that conforms to a legacy communication protocol, but not the first communication protocol. The preamble 4000 is utilized in other situations as well, in some embodiments.

The preamble portion 4000 includes a legacy portion 4004 having a first L-LTF OFDM symbol 4008, a second L-LTF OFDM symbol 4012, and an L-SIG OFDM symbol 4016. In an embodiment, a double guard interval (not shown) is included prior to the L-LTF OFDM symbol 4008, and a guard interval is included between the L-LTF OFDM symbol 4012 and the L-SIG OFDM symbol 4016. A legacy device is able to decode the L-SIG 4016 and determine a length of a PHY data unit that includes the PHY preamble 4000, according to an embodiment. For example, the L-SIG 4016 includes a length field set to a value that indicates a length of the PHY data unit that includes the PHY preamble 4000, in an embodiment.

In an embodiment, the L-LTF field 4012 corresponds to the modified LTF field 2304 of FIG. 23, and the L-SIG 4016 corresponds to the modified legacy signal field 2306 of FIG. 23, in an embodiment. In this embodiment, a receiving device conforming to the first communication protocol is able to detect that a data unit that includes the preamble 4000 conforms to the first communication protocol by performing a first cross-correlation of the L-LTF 4008 using the long training sequence of the legacy communication protocol and a second cross-correlation of the L-LTF field 4012 using the modified long training sequence of the first communication protocol, as described above with respect to FIG. 23, in an embodiment.

The PHY preamble 4000 includes one or more HEW-STF OFDM symbols 4020, a HEW-LTF1 OFDM symbol 4024, a HEW-SIGA OFDM symbol 4028, one or more HEW-LTFs OFDM symbols 4032, and a HEW-SIGB OFDM symbol 4036. In an embodiment, a DGI is included between L-SIG 4016 and HEW-STF 4020*a*. In an embodiment, respective DGIs are included between the HEW-STF OFDM symbol 4020*b* and the HEW-LTF1 OFDM symbol 4024, the HEW-LTF1 OFDM symbol 4024 and the HEW-SIGA OFDM symbol 4028, the HEW-SIGA OFDM symbol 4028 and the one or more HEW-LTFs OFDM symbols 4032, and the one or more HEW-LTFs OFDM symbols 4032 and HEW-SIGB OFDM symbol 4036.

FIG. 40B is a diagram of a portion 4050 of another example PHY preamble that conforms to the first communication protocol, according to another embodiment. The preamble portion 4050 is similar to the preamble portion 4000 and like-numbered elements are not discussed in detail for purposes of brevity.

In an embodiment, the network interface device 16 of the AP 14 is configured to generate and transmit a data unit including the PHY preamble 4050 to the client station 25-1 via OFDM modulation, according to an embodiment. In an embodiment, the network interface device 27 of the client station 25-1 is configured to determine that a data unit including the preamble 4050 conforms to the first communication protocol using techniques discussed below.

In an embodiment, the network interface device 27 of the client station 25-1 is also configured to generate and transmit a data unit including the PHY preamble 4050 to the AP 14. In an embodiment, the network interface device 16 of the AP 14 is configured to determine that a data unit including the preamble 4050 conforms to the first communication protocol using techniques discussed below.

A data unit including the PHY preamble 4050 conforms to the first communication protocol and occupies a 20 MHz bandwidth, according to an embodiment. Data units that conform to the first communication protocol and including a preamble similar to the preamble 4050 may occupy other suitable bandwidth such as 40 MHz, 80 MHz, 160 MHz, 320 MHz, 640 MHz, for example, or other suitable bandwidths, in various other embodiments. The preamble 4050 is suitable for "mixed mode" situations, i.e., when the WLAN 10 includes a client station (e.g., the legacy client station 25-4) that conforms to a legacy communication protocol, but not the first communication protocol. The preamble 4050 is utilized in other situations as well, in some embodiments.

A legacy device is able to decode the L-SIG 4016 and determine a length of a PHY data unit that includes the PHY preamble 4050, according to an embodiment. For example, the L-SIG 4016 includes a length field set to a value that indicates a length of the PHY data unit that includes the PHY preamble 4050, in an embodiment.

The preamble 4050 also includes one or more secondary L-SIGs 4054. In an embodiment, the one or more secondary L-SIGs 4054 are duplicates of the L-SIG 4016.

In an embodiment, the L-LTF field 4012 corresponds to the modified LTF field 2304 of FIG. 23, and the L-SIG 4016 corresponds to the modified legacy signal field 2306 of FIG. 23, in an embodiment. In this embodiment, a receiving device conforming to the first communication protocol is able to detect that a data unit that includes the preamble 4050 conforms to the first communication protocol by performing a first cross-correlation of the L-LTF 4008 using the long training sequence of the legacy communication protocol and a second cross-correlation of the L-LTF field 4012 using the modified long training sequence of the first communication protocol, as described above with respect to FIG. 23, in an embodiment.

Additionally or alternatively, in an embodiment, a receiving device that receives a data unit including the preamble 4050 is able to detect that the data unit conforms to the first communication protocol by detecting presence of the one or more secondary L-SIG fields 4054 in the preamble portion 4050.

In an embodiment, a DGI is included between L-SIG 4054*b* and HEW-STF 4020*a*. In an embodiment, respective DGIs are included between the HEW-STF OFDM symbol 4020*b* and the HEW-LTF1 OFDM symbol 4024, the HEW-LTF1 OFDM symbol 4024 and the HEW-SIGA OFDM symbol 4028, the HEW-SIGA OFDM symbol 4028 and the one or more HEW-LTFs OFDM symbols 4032, and the one or more HEW-LTFs OFDM symbols 4032 and HEW-SIGB OFDM symbol 4036.

Figure 41:
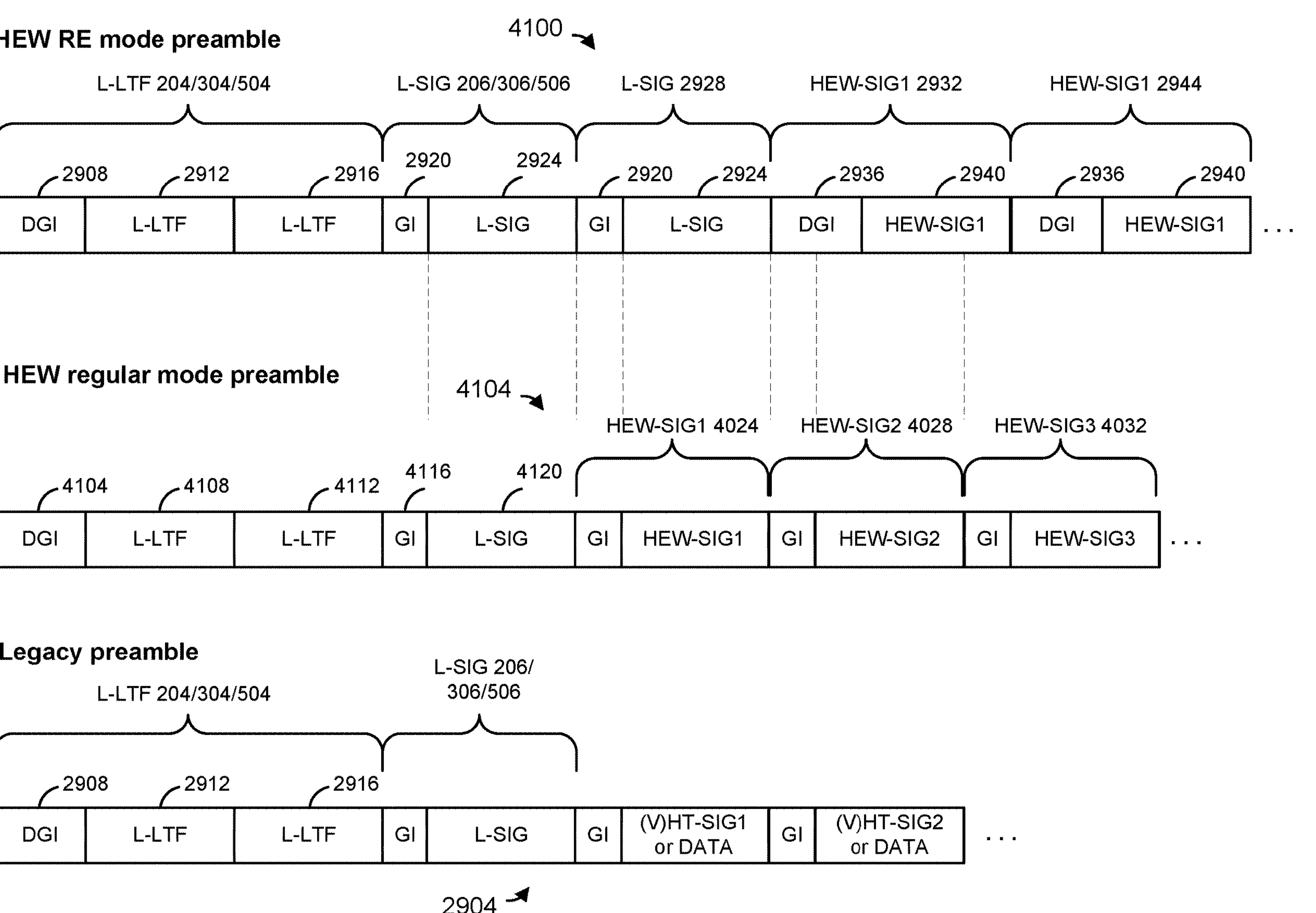
FIG. 41 is a diagram of a portion of another example PHY preamble that conforms to a range extension mode of a first communication protocol, and a diagram of a portion of another example PHY preamble that conforms to a regular mode of the first communication protocol, as compared to the portion of the preamble that conforms to the legacy protocol, according to an embodiment.

In some embodiments, techniques such as described above can be utilized to detect data units that conform to the first communication protocol and to detect to which one of multiple modes (defined by the first communication protocol) data units correspond. For example, FIG. 41 is a diagram of a portion 4100 of an example PHY preamble that conforms to the first communication protocol, according to another embodiment, as compared to the portion 2904 of the preamble that conforms to the legacy protocol. Additionally, the PHY preamble 4100 also corresponds to a range extension mode of the first communication protocol. FIG. 41 also includes a diagram of a portion 4104 of an example PHY preamble that conforms to the first communication protocol, according to another embodiment, as compared to the portion 2904 of the preamble that conforms to the legacy protocol. Additionally, the PHY preamble 4104 also corresponds to a regular mode of the first communication protocol.

In an embodiment, the network interface device 16 of the AP 14 is configured to generate and transmit data unit including the PHY preamble 4100 or the PHY preamble 4104 to the client station 25-1 via OFDM modulation, according to an embodiment. In an embodiment, the network interface device 27 of the client station 25-1 is configured to determine that a data unit including the preamble 4100 or the preamble 4104 conforms to the first communication protocol using techniques discussed below. In an embodiment, the network interface device 27 of the client station 25-1 is configured to determine that a data unit including the preamble 4100 conforms to the range extension mode and that a data unit including the preamble 4104 conforms to the regular mode using techniques discussed below.

In an embodiment, the network interface device 27 of the client station 25-1 is also configured to generate and transmit data units including the PHY preamble 4100 or the PHY preamble 4104 to the AP 14. In an embodiment, the network interface device 16 of the AP 14 is configured to determine that a data unit including the PHY preamble 4100 or the PHY preamble 4104 conforms to the first communication protocol using techniques discussed below. In an embodiment, the network interface device 16 of the AP 14 is configured to determine that a data unit including the preamble 4100 conforms to the range extension mode and that a data unit including the preamble 4104 conforms to the regular mode using techniques discussed below.

A data unit including the PHY preamble 4100 conforms to the first communication protocol and occupies a 20 MHz bandwidth, according to an embodiment. Data units that conform to the first communication protocol and including a preamble similar to the preamble 4100 may occupy other suitable bandwidth such as 40 MHz, 80 MHz, 160 MHz, 320 MHz, 640 MHz, for example, or other suitable bandwidths, in various other embodiments. A data unit including the PHY preamble 4104 conforms to the first communication protocol and occupies a 20 MHz bandwidth, according to an embodiment. Data units that conform to the first communication protocol and including a preamble similar to the preamble 4104 may occupy other suitable bandwidth such as 40 MHz, 80 MHz, 160 MHz, 320 MHz, 640 MHz, for example, or other suitable bandwidths, in various other embodiments.

The preamble 4100 is similar to the preamble 2900 of FIG. 29, and like-numbered elements are not discussed in detail for purposes of brevity. A legacy device is able to decode the L-SIG 206/306/506 and determine a length of a PHY data unit that includes the PHY preamble 4100. For example, the L-SIG 206/306/506 includes a length field set to a value that indicates a length of the PHY data unit that includes the PHY preamble 4100, in an embodiment.

In an embodiment, a communication device configured to operate according to the HEW protocol is configured to detect repetition of the L-SIG field 206/306/506 in the preamble 4100, and based on the detected repetition of the L-SIG field 206/306/506, determine that the preamble 4100 conforms to the first communication protocol. Additionally, a communication device configured to operate according to the first communication protocol is configured to, based on the detected repetition of the L-SIG field 206/306/506, determine that the preamble 4100 conforms to the range extension mode of the first communication protocol.

The preamble 4104 includes a DGI 4104, an L-LTF 4108, an L-LTF 4112, a GI 4116, and an L-SIG 4120. In an embodiment, the L-LTF field 4112 corresponds to the modified LTF field 2304 of FIG. 23, and the L-SIG 4120 corresponds to the modified legacy signal field 2306 of FIG. 23, in an embodiment. In this embodiment, a receiving device conforming to the first communication protocol is able to detect that a data unit that includes the preamble 4104 conforms to the first communication protocol by performing a first cross-correlation of the L-LTF 4108 using the long training sequence of the legacy communication protocol and a second cross-correlation of the L-LTF field 4112 using the modified long training sequence of the first communication protocol, as described above with respect to FIG. 23, in an embodiment. In a similar manner, a receiving device conforming to the first communication protocol is able to detect that a data unit that includes the preamble 4104 conforms to the regular mode of the first communication protocol.

In another embodiment, the L-LTF field 2916 corresponds to the modified LTF field 2304 of FIG. 23, and the L-SIG 2924 corresponds to the modified legacy signal field 2306 of FIG. 23, in an embodiment. In this embodiment, a receiving device conforming to the HEW protocol is able to detect that a data unit that includes the preamble 4100 conforms to the HEW communication protocol by performing a first cross-correlation of the L-LTF 2912 using the long training sequence of the legacy communication protocol and a second cross-correlation of the L-LTF field 2916 using the modified long training sequence of the first communication protocol, as described above with respect to FIG. 23, in an embodiment.

Figure 42:
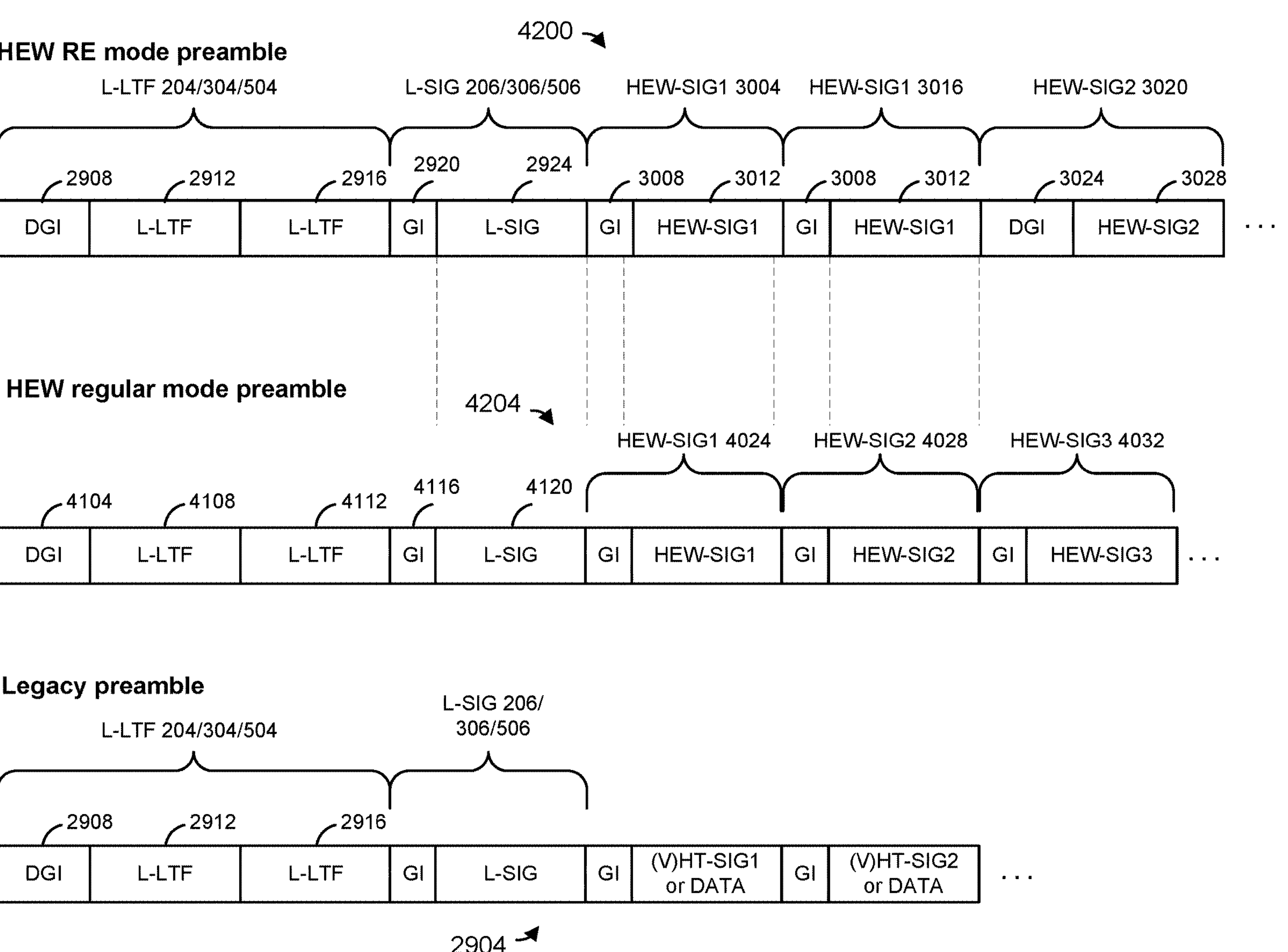
FIG. 42 is a diagram of a portion of another example PHY preamble that conforms to a range extension mode of a first communication protocol, and a diagram of a portion of another example PHY preamble that conforms to a regular mode of the first communication protocol, as compared to the portion of the preamble that conforms to the legacy protocol, according to an embodiment.

FIG. 42 is a diagram of a portion 4200 of an example PHY preamble that conforms to the first communication protocol, according to another embodiment, as compared to the portion 2904 of the preamble that conforms to the legacy protocol. Additionally, the PHY preamble 4200 also corresponds to a range extension mode of the first communication protocol. FIG. 42 also includes a diagram of a portion 4204 of an example PHY preamble that conforms to the first communication protocol, according to another embodiment, as compared to the portion 2904 of the preamble that conforms to the legacy protocol. Additionally, the PHY preamble 4204 also corresponds to a regular mode of the first communication protocol.

In an embodiment, the network interface device 16 of the AP 14 is configured to generate and transmit data unit including the PHY preamble 4200 or the PHY preamble 4204 to the client station 25-1 via OFDM modulation, according to an embodiment. In an embodiment, the network interface device 27 of the client station 25-1 is configured to determine that a data unit including the preamble 4200 or the preamble 4204 conforms to the first communication protocol using techniques discussed below. In an embodiment, the network interface device 27 of the client station 25-1 is configured to determine that a data unit including the preamble 4200 conforms to the range extension mode and that a data unit including the preamble 4204 conforms to the regular mode using techniques discussed below.

In an embodiment, the network interface device 27 of the client station 25-1 is also configured to generate and transmit data units including the PHY preamble 4200 or the PHY preamble 4204 to the AP 14. In an embodiment, the network interface device 16 of the AP 14 is configured to determine that a data unit including the PHY preamble 4200 or the PHY preamble 4204 conforms to the first communication protocol using techniques discussed below. In an embodiment, the network interface device 16 of the AP 14 is configured to determine that a data unit including the preamble 4200 conforms to the range extension mode and that a data unit including the preamble 4204 conforms to the regular mode using techniques discussed below.

A data unit including the PHY preamble 4200 conforms to the first communication protocol and occupies a 20 MHz bandwidth, according to an embodiment. Data units that conform to the first communication protocol and including a preamble similar to the preamble 4200 may occupy other suitable bandwidth such as 40 MHz, 80 MHz, 160 MHz, 320 MHz, 640 MHz, for example, or other suitable bandwidths, in various other embodiments. A data unit including the PHY preamble 4204 conforms to the first communication protocol and occupies a 20 MHz bandwidth, according to an embodiment. Data units that conform to the first communication protocol and including a preamble similar to the preamble 4204 may occupy other suitable bandwidth such as 40 MHz, 80 MHz, 160 MHz, 320 MHz, 640 MHz, for example, or other suitable bandwidths, in various other embodiments.

The preamble 4200 is similar to the preamble 3000 of FIG. 30, and like-numbered elements are not discussed in detail for purposes of brevity. A legacy device is able to decode the L-SIG 206/306/506 and determine a length of a PHY data unit that includes the PHY preamble 4200. For example, the L-SIG 206/306/506 includes a length field set to a value that indicates a length of the PHY data unit that includes the PHY preamble 4200, in an embodiment.

In an embodiment, a communication device configured to operate according to the first communication protocol is configured to detect repetition of the HEW-SIG1 fields 3004, 3016 in the preamble 4200, and based on the detected repetition of the HEW-SIG1 fields 3004, 3016, determine that the preamble 4200 conforms to the first communication protocol. Additionally, a communication device configured to operate according to the first communication protocol is configured to, based on the detected repetition of the HEW-SIG1 fields 3004, 3016, determine that the preamble 4200 conforms to the range extension mode of the first communication protocol.

The preamble 4204 is similar to the preamble 4104 of FIG. 41, and like-numbered elements are not discussed in detail for purposes of brevity. In an embodiment, the L-LTF field 4112 corresponds to the modified LTF field 2304 of FIG. 23, and the L-SIG 4120 corresponds to the modified legacy signal field 2306 of FIG. 23, in an embodiment. In this embodiment, a receiving device conforming to the first communication protocol is able to detect that a data unit that includes the preamble 4104 conforms to the first communication protocol by performing a first cross-correlation of the L-LTF 4108 using the long training sequence of the legacy communication protocol and a second cross-correlation of the L-LTF field 4112 using the modified long training sequence of the first communication protocol, as described above with respect to FIG. 23, in an embodiment. In a similar manner, a receiving device conforming to the first communication protocol is able to detect that a data unit that includes the preamble 4104 conforms to the regular mode of the first communication protocol.

In another embodiment, the L-LTF field 2916 corresponds to the modified LTF field 2304 of FIG. 23, and the L-SIG 2924 corresponds to the modified legacy signal field 2306 of FIG. 23, in an embodiment. In this embodiment, a receiving device conforming to the first communication protocol is able to detect that a data unit that includes the preamble 4200 conforms to the HEW communication protocol by performing a first cross-correlation of the L-LTF 2912 using the long training sequence of the legacy communication protocol and a second cross-correlation of the L-LTF field 2916 using the modified long training sequence of the first communication protocol, as described above with respect to FIG. 23, in an embodiment.

Figure 43:
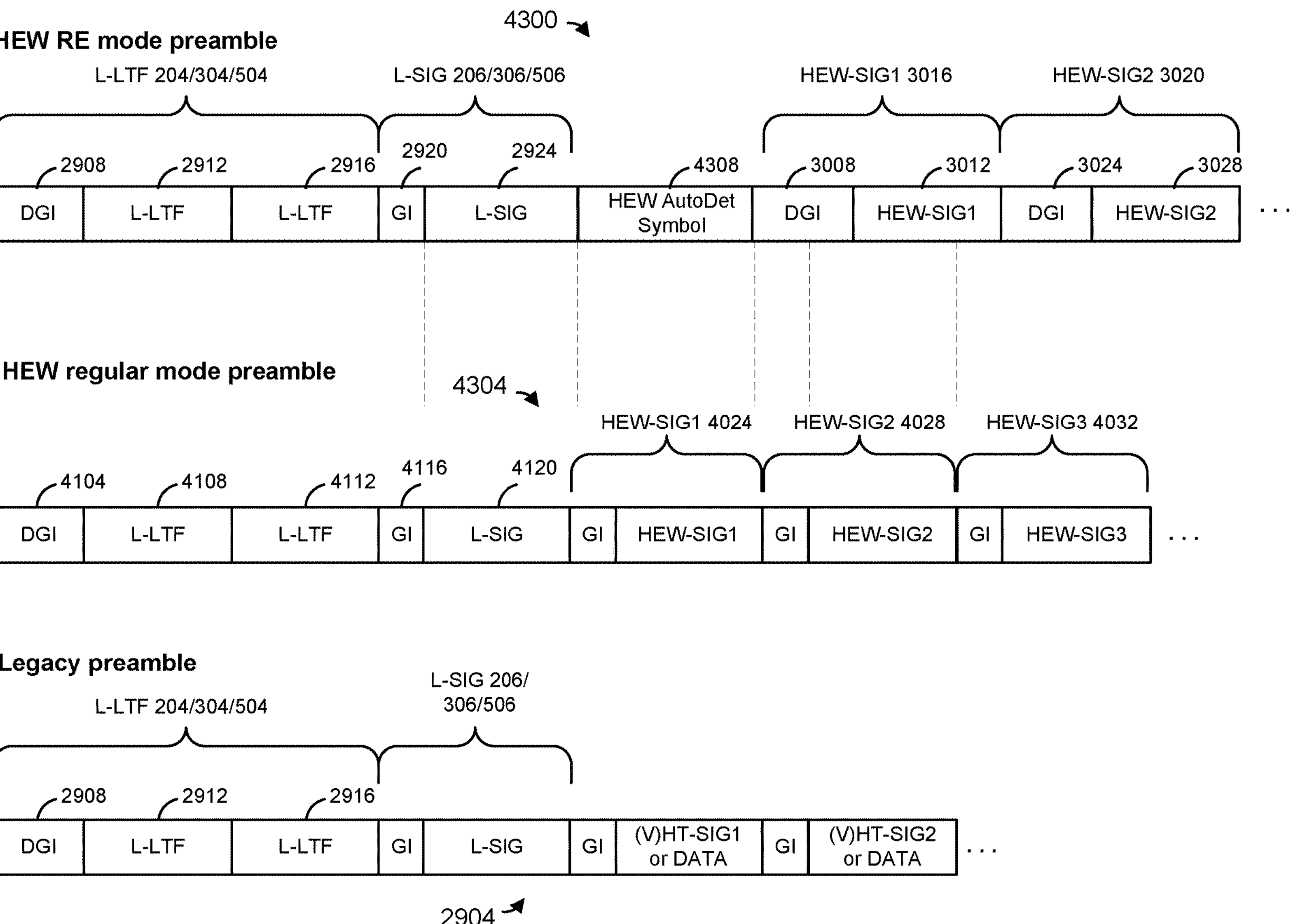
FIG. 43 is a diagram of a portion of another example PHY preamble that conforms to a range extension mode of a first communication protocol, and a diagram of a portion of another example PHY preamble that conforms to a regular mode of the first communication protocol, as compared to the portion of the preamble that conforms to the legacy protocol, according to an embodiment.

FIG. 43 is a diagram of a portion 4300 of an example PHY preamble that conforms to the first communication protocol, according to another embodiment, as compared to the portion 2904 of the preamble that conforms to the legacy protocol. Additionally, the PHY preamble 4300 also corresponds to a range extension mode of the first communication protocol. FIG. 43 also includes a diagram of a portion 4304 of an example PHY preamble that conforms to the first communication protocol, according to another embodiment, as compared to the portion 2904 of the preamble that conforms to the legacy protocol. Additionally, the PHY preamble 4304 also corresponds to a regular mode of the first communication protocol.

In an embodiment, the network interface device 16 of the AP 14 is configured to generate and transmit data unit including the PHY preamble 4300 or the PHY preamble 4304 to the client station 25-1 via OFDM modulation, according to an embodiment. In an embodiment, the network interface device 27 of the client station 25-1 is configured to determine that a data unit including the preamble 4300 or the preamble 4304 conforms to the first communication protocol using techniques discussed below. In an embodiment, the network interface device 27 of the client station 25-1 is configured to determine that a data unit including the preamble 4300 conforms to the range extension mode and that a data unit including the preamble 4304 conforms to the regular mode using techniques discussed below.

In an embodiment, the network interface device 27 of the client station 25-1 is also configured to generate and transmit data units including the PHY preamble 4300 or the PHY preamble 4304 to the AP 14. In an embodiment, the network interface device 16 of the AP 14 is configured to determine that a data unit including the PHY preamble 4300 or the PHY preamble 4304 conforms to the first communication protocol using techniques discussed below. In an embodiment, the network interface device 16 of the AP 14 is configured to determine that a data unit including the preamble 4300 conforms to the range extension mode and that a data unit including the preamble 4304 conforms to the regular mode using techniques discussed below.

A data unit including the PHY preamble 4300 conforms to the first communication protocol and occupies a 20 MHz bandwidth, according to an embodiment. Data units that conform to the first communication protocol and including a preamble similar to the preamble 4300 may occupy other suitable bandwidth such as 40 MHz, 80 MHz, 160 MHz, 320 MHz, 640 MHz, for example, or other suitable bandwidths, in various other embodiments. A data unit including the PHY preamble 4304 conforms to the first communication protocol and occupies a 20 MHz bandwidth, according to an embodiment. Data units that conform to the first communication protocol and including a preamble similar to the preamble 4304 may occupy other suitable bandwidth such as 40 MHz, 80 MHz, 160 MHz, 320 MHz, 640 MHz, for example, or other suitable bandwidths, in various other embodiments.

The preamble 4300 is similar to the preamble 2900 of FIG. 29, and like-numbered elements are not discussed in detail for purposes of brevity. A legacy device is able to decode the L-SIG 206/306/506 and determine a length of a PHY data unit that includes the PHY preamble 4300. For example, the L-SIG 206/306/506 includes a length field set to a value that indicates a length of the PHY data unit that includes the PHY preamble 4300, in an embodiment.

The data unit 4300 is similar to the data unit 2900 of FIG. 29, except that the data unit 4300 omits the second (duplicate) L-SIG field 2928, and includes an auto-detection OFDM symbol 4308. In an embodiment, a receiving device conforming to the first communication protocol is able to detect that a data unit that includes the preamble 4300 conforms to the first communication protocol based on detecting the auto-detection OFDM symbol 4308 in the preamble 4300. The auto-detection symbol 4308 immediately follows the L-SIG field 206/306/506, in the illustrated embodiment. The auto-detection symbol 4308 aligned with its corresponding OFDM symbol in the legacy data unit format 2904, and is modulated using BPSK modulation, in an embodiment. In an embodiment, a receiving device conforming to the first communication protocol is able to detect that a data unit that includes the preamble 4300 conforms to the first communication protocol based on detecting the auto-detection OFDM symbol 4308 in the preamble 4300 as discussed with respect to FIG. 37.

The preamble 4304 is similar to the preamble 4104 of FIG. 41, and like-numbered elements are not discussed in detail for purposes of brevity. In an embodiment, the L-LTF field 4112 corresponds to the modified LTF field 2304 of FIG. 23, and the L-SIG 4120 corresponds to the modified legacy signal field 2306 of FIG. 23, in an embodiment. In this embodiment, a receiving device conforming to the first communication protocol is able to detect that a data unit that includes the preamble 4304 conforms to the first communication protocol by performing a first cross-correlation of the L-LTF 4108 using the long training sequence of the legacy communication protocol and a second cross-correlation of the L-LTF field 4112 using the modified long training sequence of the first communication protocol, as described above with respect to FIG. 23, in an embodiment. In a similar manner, a receiving device conforming to the first communication protocol is able to detect that a data unit that includes the preamble 4304 conforms to the regular mode of the first communication protocol.

In another embodiment, the L-LTF field 2916 corresponds to the modified LTF field 2304 of FIG. 23, and the L-SIG 2924 corresponds to the modified legacy signal field 2306 of FIG. 23, in an embodiment. In this embodiment, a receiving device conforming to the HEW protocol is able to detect that a data unit that includes the preamble 4300 conforms to the first communication protocol by performing a first cross-correlation of the L-LTF 2912 using the long training sequence of the legacy communication protocol and a second cross-correlation of the L-LTF field 2916 using the modified long training sequence of the first communication protocol, as described above with respect to FIG. 23, in an embodiment.

In various other embodiments, techniques such as described above with respect to FIGS. 9A-28 are combined with techniques such as described above with respect to FIGS. 29-40B utilized to enable a receiver conforming to the first communication protocol to determine i) that a data unit conforms to the first communication protocol, and ii) determine to which of various different modes of first communication protocol (e.g., range extension mode, regular mode, etc.) the data unit conforms.

In some embodiments in which a SIG field is duplicated (e.g., L-SIG, HEW-SIG1, etc.), time varying tone mapping is utilized. For example, in an embodiment, a half bandwidth cyclic shift tone mapper is used. In an embodiment, tones on a first SIG OFDM symbol (time t1) correspond to:

$$SIG_k(t_1) = s_{k(t1)} = s_k \quad \text{(Equation 4)}$$

where $SIG_k$ is the k-th tone of the SIG OFDM symbol, and $s_k$ is the k-th BPSK symbol to be mapped to SIG OFDM symbol. In an embodiment, tones on a second (duplicated) SIG OFDM symbol (time $t_2$) correspond to:

$$SIG_k(t_2) = s_{k(t2)} = s_{(k+N/2)modN} \quad \text{(Equation 5)}$$

where N is the number of tones in the SIG OFDM symbol. Thus, in an embodiment, BPSK symbols s are mapped to tones sequentially in the first SIG OFDM symbol, whereas the same BPSK symbols s are cyclically shifted over half of the tones in the second SIG OFDM symbol. In other embodiments, another suitable time varying tone mapping is utilized for achieving time diversity across the different SIG OFDM symbols.

In an embodiment, time diversity across the different SIG OFDM symbols is implemented using different interleavers for the same coded bits over the two OFDM symbols. In other embodiments, other suitable techniques for implementing time diversity across the different SIG OFDM symbols are utilized.

In some embodiments in which a preamble conforms to the first communication protocol, the L-SIG field in the preamble conforming to the first communication protocol corresponds to the L-SIG in a legacy preamble multiplied by a sequence $c_k$:

$$L\text{-}SIG_k^{(HEW)} = c_k \cdot L\text{-}SIG_k^{(HEW)} \quad \text{(Equation 6)}$$

where k is a tone index. In an embodiment, the sequence $c_k$ is a sequence with values of ±1.

In some embodiments, one or more further L-SIG fields are included in preambles that conform to the first communication protocol.

In some embodiments, a HEW-SIG field includes data unit duration information, such as a number of bytes in the data unit, a number of OFDM symbols in the data unit, etc.

In some embodiments, a HEW-SIG field that corresponds with a SIG field in an legacy preamble (e.g., SIGA) is configured so that including a duplicate of the HEW-SIG field in the preamble will cause a legacy device (e.g., an IEEE 802.11ac receiver) to generate a SIGA CRC error with 100% possibility. For example, in various embodiments, bits in the HEW-SIG field are scrambled, include a 1-bit field that is set to ensure that the SIGA CRC will be in error, etc. In another embodiment, a HEW-SIG field is designed to include bits that correspond to invalid modes in the legacy protocol.

In an embodiment, a method is for generating a physical layer (PHY) data unit for transmission via a communication channel, the PHY data unit conforming to a first communication protocol. The method comprises generating, at a first communication device, a PHY preamble for the PHY data unit, including: generating a signal field, including the signal field and a duplicate of the signal field in the PHY preamble, and formatting the PHY preamble such that a first portion of the PHY preamble is decodable by a second communication device that conforms to a second communication protocol, but does not conform to the first communication protocol, to determine a duration of the PHY data unit based on the first portion of the PHY preamble. The method also comprises generating, at the first communication device, the PHY data unit to include the PHY preamble and a PHY payload.

In various other embodiments, the method further includes one of or any suitable combination of two or more of the following features.

The signal field is a legacy signal field that is decodable by the second communication device; the legacy signal field is included in the first portion of the PHY preamble; and the legacy signal field includes information that indicates the duration of the PHY data unit.

Generating the PHY preamble for the PHY data unit further includes: generating a further signal field that conforms the second communication protocol, and including the further signal field in a second portion of the PHY preamble.

The second portion of the PHY preamble is not decodable by the second communication device.

Generating the PHY preamble for the PHY data unit further includes: including a duplicate of the further signal field in the second portion of the PHY preamble.

Generating the PHY preamble for the PHY data unit further includes: including a duplicate of the further signal field in the second portion of the PHY preamble.

The signal field is a first signal field; and generating the PHY preamble for the PHY data unit further includes: generating a second signal field that is decodable by the second communication device, wherein the second signal field includes information that indicates the duration of the PHY data unit, including the second signal field in the first portion of the PHY preamble, and including the first signal field in a second portion of the PHY preamble.

The second portion of the PHY preamble is not decodable by the second communication device.

The PHY preamble for the PHY data unit is generated to include a respective first guard interval between orthogonal frequency domain (OFDM) symbols in the first portion of the PHY preamble; and the method further includes generating, at the first communication device, the PHY payload to include a respective second guard interval between OFDM symbols in the PHY payload, wherein each second guard interval has a duration longer than each first guard interval.

The PHY preamble for the PHY data unit is generated to include a respective second guard interval between OFDM symbols in a second portion of the PHY preamble.

In another embodiment, a first communication device comprises a network interface device having one or more integrated circuits configured to: generate a physical layer (PHY) preamble for the PHY data unit that conforms to a first communication protocol, including: generating a signal field, including the signal field and a duplicate of the signal field in the PHY preamble, and formatting the PHY preamble such that a first portion of the PHY preamble is decodable by a second communication device that conforms to a second communication protocol, but does not conform to the first communication protocol, to determine a duration of the PHY data unit based on the first portion of the PHY preamble. The one or more integrated circuits are also configured to generate the PHY data unit to include the PHY preamble and a PHY payload.

In various other embodiments, the first communication device further includes one of or any suitable combination of two or more of the following features.

The signal field is a legacy signal field that is decodable by the second communication device; the one or more integrated circuits are configured to include the legacy signal field in the first portion of the PHY preamble; and the legacy signal field includes information that indicates the duration of the PHY data unit.

The one or more integrated circuits are configured to: generate a further signal field that conforms the second communication protocol, and include the further signal field in a second portion of the PHY preamble.

The second portion of the PHY preamble is not decodable by the second communication device.

The one or more integrated circuits are configured to: include a duplicate of the further signal field in the second portion of the PHY preamble.

The one or more integrated circuits are configured to: include a duplicate of the further signal field in the second portion of the PHY preamble.

The signal field is a first signal field; and the one or more integrated circuits are configured to generate a second signal field that is decodable by the second communication device, wherein the second signal field includes information that indicates the duration of the PHY data unit, include the second signal field in the first portion of the PHY preamble, and include the first signal field in a second portion of the PHY preamble.

The second portion of the PHY preamble is not decodable by the second communication device.

The one or more integrated circuits are configured to: generate the PHY preamble for the PHY data unit to include a respective first guard interval between orthogonal frequency domain (OFDM) symbols in the first portion of the PHY preamble; and generate the PHY payload to include a respective second guard interval between OFDM symbols in the PHY payload, wherein each second guard interval has a duration longer than each first guard interval.

The one or more integrated circuits are configured to generate the PHY preamble to include a respective second guard interval between OFDM symbols in a second portion of the PHY preamble.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any non-transitory, tangible computer readable medium or media such as a magnetic disk, an optical disk, a random access memory (RAM), a read-only memory (ROM), a flash memory, a magnetic tape, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a physical layer (PHY) data unit that conforms to a first communication protocol, the method comprising:

generating, at a first communication device, a PHY preamble of the PHY data unit to include:

a first orthogonal frequency division multiplexing (OFDM) symbol corresponding to a legacy signal field, the legacy signal field including i) a length subfield, and ii) a rate subfield, wherein the length subfield and the rate subfield indicate a duration of the PHY data unit, and wherein the legacy signal field is formatted to be decodable by legacy second communication devices that operate according to a legacy second communication protocol, a second OFDM symbol corresponding to a duplicate of the legacy signal field, the second OFDM symbol following the first OFDM symbol in time, and a plurality of additional OFDM symbols corresponding to a non-legacy signal field;

in response to determining that the PHY data unit is to be generated according to a non-range extension PHY mode defined by the first communication protocol, generating, at the first communication device, the plurality of additional OFDM symbols to use a first modulation pattern; and in response to determining that the PHY data unit is to be generated according to a range extension PHY mode defined by the first communication protocol, generating, at the first communication device, the plurality of additional OFDM symbols to use a second modulation pattern to signal that the PHY data unit is generated according to the range extension PHY mode;

generating, at the first communication device, a PHY data portion of the PHY data unit; and transmitting, by the first communication device, the PHY data unit via a wireless communication channel.

2. The method of claim 1, wherein:

generating the PHY preamble to include the plurality of additional OFDM symbols corresponding to the non-legacy signal field comprises:

generating the PHY preamble to include a third OFDM symbol that follows the second OFDM symbol in time, and generating the PHY preamble to include a fourth OFDM symbol that follows the third OFDM symbol in time; and generating the plurality of additional OFDM symbols to use the second modulation pattern comprises:

generating the third OFDM symbol using binary phase shift keying (BPSK) modulation, and generating the fourth OFDM symbol using quadrature binary phase shift keying (Q-BPSK) modulation to signal that the PHY data unit is generated according to the range extension PHY mode.

3. The method of claim 1, wherein generating the PHY preamble further comprises generating the plurality of additional OFDM symbols to include:

information corresponding to the non-legacy signal field; and a repetition of the information corresponding to the non-legacy signal field.

4. The method of claim 1, wherein generating the PHY preamble further includes:

generating at least a portion of the PHY preamble with a transmission power boost as compared to the PHY data portion to increase a decoding range of the at least the portion of the PHY preamble.

5. The method of claim 1, wherein:

generating the PHY preamble comprises generating OFDM symbols for a portion of the PHY preamble using a first tone spacing; and generating the PHY data portion comprises generating OFDM symbols for the PHY data portion using a second tone spacing that is different than the first tone spacing.

6. A first communication device, comprising:

a wireless network interface device having one or more integrated circuit (IC) devices configured to:

generate a PHY preamble of the PHY data unit to include:

a first orthogonal frequency division multiplexing (OFDM) symbol corresponding to a legacy signal field, the legacy signal field including i) a length subfield, and ii) a rate subfield, wherein the length subfield and the rate subfield indicate a duration of the PHY data unit, and wherein the legacy signal field is formatted to be decodable by legacy second communication devices that operate according to a legacy second communication protocol, a second OFDM symbol corresponding to a duplicate of the legacy signal field, the second OFDM symbol following the first OFDM symbol in time, and a plurality of additional OFDM symbols corresponding to a non-legacy signal field;

wherein the one or more IC devices are further configured to:

in response to determining that the PHY data unit is to be generated according to a non-range extension PHY mode defined by the first communication protocol, generate the plurality of additional OFDM symbols to use a first modulation pattern, and in response to determining that the PHY data unit is to be generated according to a range extension PHY mode defined by the first communication protocol, generate the plurality of additional OFDM symbols to use a second modulation pattern to signal that the PHY data unit is generated according to the range extension PHY mode, generate a PHY data portion of the PHY data unit, and control the wireless network interface device to transmit the PHY data unit via a wireless communication channel.

7. The first communication device of claim 6, wherein the one or more IC devices are further configured to:

as part of generating the PHY preamble to include the plurality of additional OFDM symbols corresponding to the non-legacy signal field:

generate the PHY preamble to include a third OFDM symbol that follows the second OFDM symbol in time, and generate the PHY preamble to include a fourth OFDM symbol that follows the third OFDM symbol in time; and as part of generating the plurality of additional OFDM symbols to use the second modulation pattern:

generate the third OFDM symbol using binary phase shift keying (BPSK) modulation, and generate the fourth OFDM symbol using quadrature binary phase shift keying (Q-BPSK) modulation to signal that the PHY data unit is generated according to the range extension PHY mode.

8. The first communication device of claim 6, wherein the one or more IC devices are further configured to generate the plurality of additional OFDM symbols to include:

information corresponding to the non-legacy signal field; and a repetition of the information corresponding to the non-legacy signal field.

9. The first communication device of claim 6, wherein the one or more IC devices are further configured to:

generate at least a portion of the PHY preamble with a transmission power boost as compared to the PHY data portion to increase a decoding range of the at least the portion of the PHY preamble.

10. The first communication device of claim 6, wherein the one or more IC devices are further configured to:

generate OFDM symbols for a portion of the PHY preamble using a first tone spacing; and generate OFDM symbols for the PHY data portion using a second tone spacing that is different than the first tone spacing.

11. The first communication device of claim 6, wherein the wireless network interface device comprises one or more transceivers implemented on the one or more IC devices.

12. The first communication device of claim 11, further comprising:

one or more antennas coupled to the one or more transceivers.

13. A method for wireless communication, the method comprising:

receiving, at a first communication device, a physical layer (PHY) data unit via a wireless communication channel, the PHY data unit conforming to a first communication protocol, the PHY data unit including a PHY preamble having:

a first orthogonal frequency division multiplexing (OFDM) symbol corresponding to a legacy signal field, the legacy signal field including i) a length subfield, and ii) a rate subfield, wherein the length subfield and the rate subfield indicate a duration of the PHY data unit, and wherein the legacy signal field is formatted to be decodable by legacy second communication devices that operate according to a legacy second communication protocol, a second OFDM symbol corresponding to a duplicate of the legacy signal field, the second OFDM symbol following the first OFDM symbol in time, and a plurality of additional OFDM symbols corresponding to a non-legacy signal field;

determining, at the first communication device, whether the plurality of additional OFDM symbols have a second modulation pattern versus a first modulation pattern different than the second modulation pattern;

determining, at the first communication device, that the PHY data unit is formatted according to a range extension PHY mode based on determining that the plurality of additional OFDM symbols have the second modulation pattern, the range extension PHY mode defined by the first communication protocol; and processing, at the first communication device, the PHY data unit based on the formatting according to the range extension PHY mode.

14. The method of claim 13, wherein:

the plurality of additional OFDM symbols corresponding to the non-legacy signal field includes i) a third OFDM symbol that follows the second OFDM symbol in time, and ii) a fourth OFDM symbol that follows the third OFDM symbol in time; and the second modulation pattern comprises i) the third OFDM symbol modulated using binary phase shift keying (BPSK) modulation, and ii) the fourth OFDM symbol modulated using quadrature binary phase shift keying (Q-BPSK) modulation.

15. The method of claim 13, further comprising at least one of:

decoding, at the first communication device, information in the legacy signal field using the first OFDM symbol and the second OFDM symbol; and using, at the first communication device, the first OFDM symbol and the second OFDM symbol to generate an estimate of the wireless communication channel.

16. The method of claim 13, wherein the formatting according to the range extension PHY mode specifies that the plurality of additional OFDM symbols include:

information corresponding to the non-legacy signal field; and a repetition of the information corresponding to the non-legacy signal field.

17. The method of claim 13, further comprising:

using, at the first communication device, i) the information corresponding to the non-legacy signal field, and ii) the repetition of the information corresponding to the non-legacy signal field to decode the non-legacy signal field.

18. The method of claim 13, wherein:

OFDM symbols in a portion of the PHY preamble have a first tone spacing; and

OFDM symbols in a PHY data portion of the PHY data unit have a second tone spacing that is different than the first tone spacing.

19. A first communication device, comprising:

a wireless network interface device having one or more integrated circuit (IC) devices configured to:

receive a physical layer (PHY) data unit via a wireless communication channel, the PHY data unit conforming to a first communication protocol, the PHY data unit including a PHY preamble having:

a first orthogonal frequency division multiplexing (OFDM) symbol corresponding to a legacy signal field, the legacy signal field including i) a length subfield, and ii) a rate subfield, wherein the length subfield and the rate subfield indicate a duration of the PHY data unit, and wherein the legacy signal field is formatted to be decodable by legacy second communication devices that operate according to a legacy second communication protocol, a second OFDM symbol corresponding to a duplicate of the legacy signal field, the second OFDM symbol following the first OFDM symbol in time, and a plurality of additional OFDM symbols corresponding to a non-legacy signal field;

wherein the one or more IC devices are further configured to:

determine whether the plurality of additional OFDM symbols have a second modulation pattern versus a first modulation pattern different than the second modulation pattern, determine that the PHY data unit is formatted according to a range extension PHY mode based on determining that the plurality of additional OFDM symbols have the second modulation pattern, the range extension PHY mode defined by the first communication protocol, and process the PHY data unit based on the formatting according to the range extension PHY mode.

20. The first communication device of claim 19, wherein:

the plurality of additional OFDM symbols corresponding to the non-legacy signal field includes i) a third OFDM symbol that follows the second OFDM symbol in time, and ii) a fourth OFDM symbol that follows the third OFDM symbol in time; and the second modulation pattern comprises i) the third OFDM symbol modulated using binary phase shift keying (BPSK) modulation, and ii) the fourth OFDM symbol modulated using quadrature binary phase shift keying (Q-BPSK) modulation.

21. The first communication device of claim 19, wherein the one or more IC devices are further configured to at least one of:

decode information in the legacy signal field using the first OFDM symbol and the second OFDM symbol; and use the first OFDM symbol and the second OFDM symbol to generate an estimate of the wireless communication channel.

22. The first communication device of claim 19, wherein the formatting according to the range extension PHY mode specifies that the plurality of additional OFDM symbols include:

information corresponding to the non-legacy signal field; and a repetition of the information corresponding to the non-legacy signal field.

23. The first communication device of claim 19, wherein the one or more IC devices are further configured to:

use i) the information corresponding to the non-legacy signal field, and ii) the repetition of the information corresponding to the non-legacy signal field to decode the non-legacy signal field.

24. The first communication device of claim 19, wherein:

OFDM symbols in a portion of the PHY preamble have a first tone spacing; and

OFDM symbols in a PHY data portion of the PHY data unit have a second tone spacing that is different than the first tone spacing.

25. The first communication device of claim 19, wherein the wireless network interface device comprises one or more transceivers implemented on the one or more IC devices.

26. The first communication device of claim 25, further comprising:

one or more antennas coupled to the one or more transceivers.

* * * * *